United States Patent
Fukuroda et al.

[11] Patent Number: 5,904,609
[45] Date of Patent: May 18, 1999

[54] POLISHING APPARATUS AND POLISHING METHOD

[75] Inventors: Atsushi Fukuroda; Yoshihiro Arimoto; Ko Nakamura, all of Kawasaki, Japan

[73] Assignee: Fujitsu Limited, Kawasaki, Japan

[21] Appl. No.: 08/637,433

[22] Filed: Apr. 25, 1996

[30] Foreign Application Priority Data

Apr. 26, 1995 [JP] Japan .................................. 7-102574
Sep. 29, 1995 [JP] Japan .................................. 7-252999

[51] Int. Cl.⁶ ..................................................... B24B 49/00
[52] U.S. Cl. .............................. 451/8; 451/41; 451/285; 451/287
[58] Field of Search ........................... 451/49, 285, 287, 451/288, 290

[56] References Cited

U.S. PATENT DOCUMENTS 5,222,329  6/1993  Yu .
5,245,794  9/1993  Salugsugan .

FOREIGN PATENT DOCUMENTS 58-75012   5/1983   Japan .
6-45299    2/1994   Japan .
6-252112   9/1994   Japan .
6-315850  11/1994   Japan .
6-320416  11/1994   Japan .
6-342778  12/1994   Japan .
7-40234    2/1995   Japan .
7-135190   5/1995   Japan .

*Primary Examiner*—Eileen P. Morgan
*Attorney, Agent, or Firm*—Armstrong, Westerman, Hattori, McLeland & Naughton

[57] ABSTRACT

A polishing apparatus comprises a first surface plate for supporting a polishing object, a driving mechanism for rotating the first surface plate, a second surface plate arranged so as to oppose to the first surface plate, an abrasive cloth stuck to the second surface plate, a vibration detector attached to the first surface plate or the second surface plate for detecting vibration in polishing, a controlling portion for controlling polishing operation of the first surface plate and the second surface plate, and signal analyzing unit for analyzing vibration intensity detected by the a vibration detector through frequency analysis, integrating the vibration intensity relative to time, and transmitting a polishing stop signal to stop polishing operation of the first surface plate and the second surface plate to the controlling portion when variation in a resultant integral value relative to time is less than a first reference value or when the resultant integral value is less than a second reference value.

25 Claims, 36 Drawing Sheets

FIG.2A
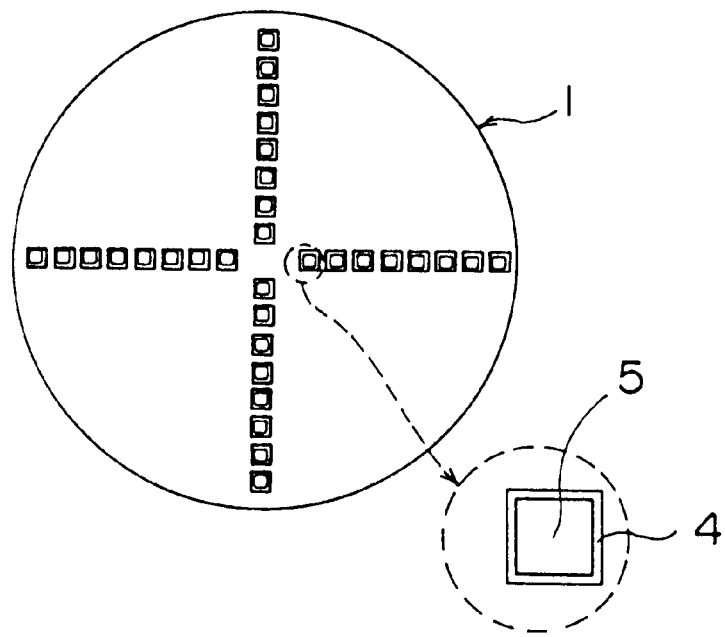
FIG. 2A-1
FIG.2B
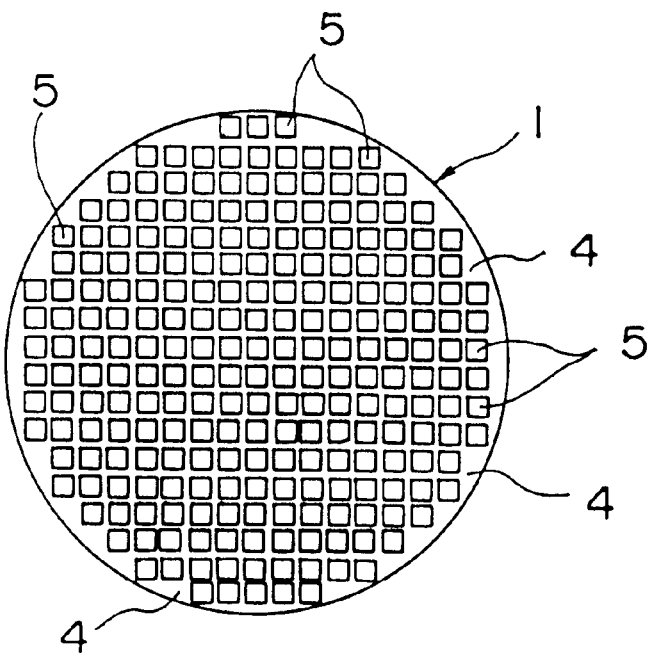

$r_1 + r_2 = r$
$r_2 = R(t)$

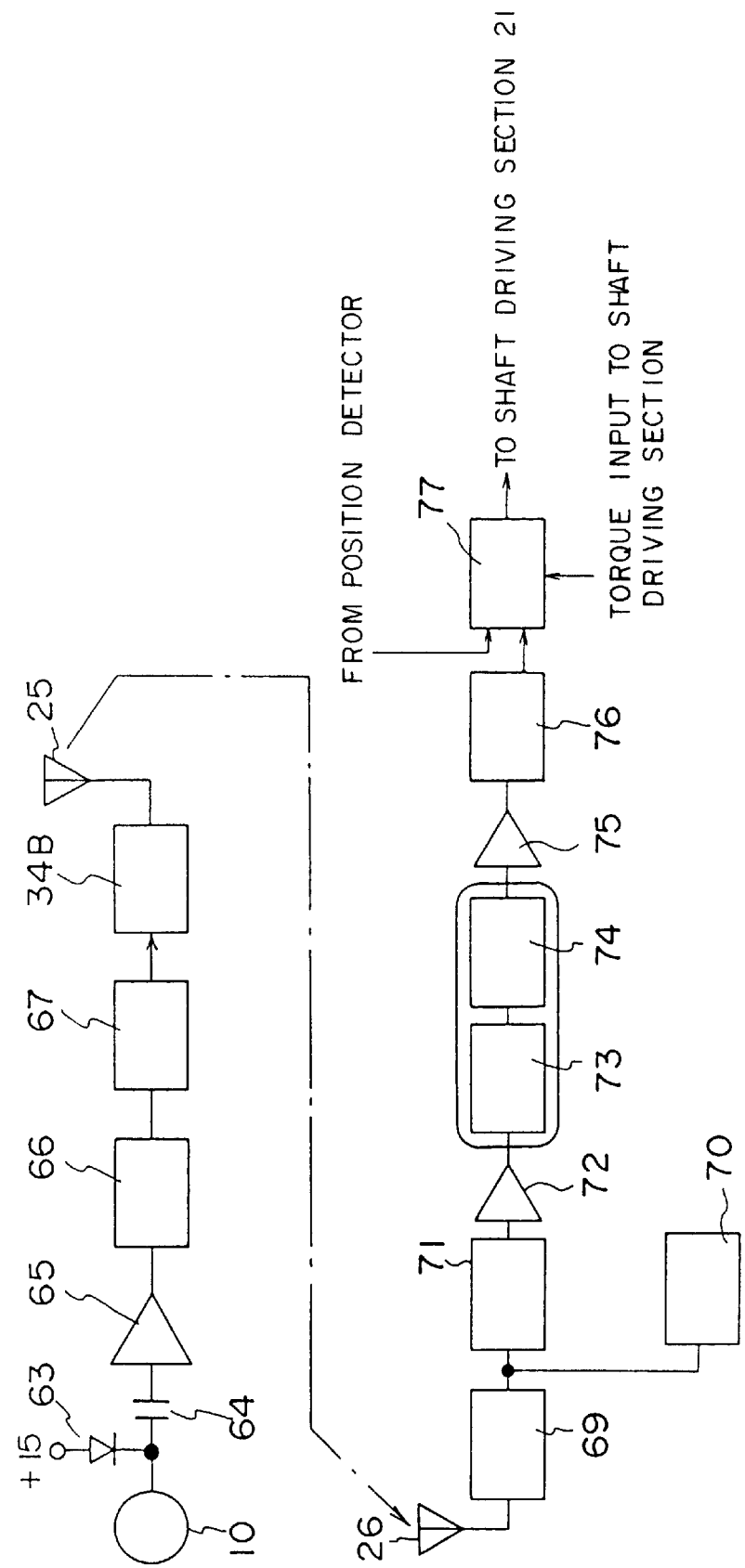

$$r = \sqrt{((r_4+r_0)-r_0\cos\theta t)^2+(r_0\sin\theta t)^2}$$

POLISHING APPARATUS AND POLISHING METHOD

BACKGROUND OF THE INVENTION

1. Field of the Invention

The present invention relates to a polishing apparatus and a polishing method and, more particularly, a polishing apparatus and a polishing method for use in planalization of insulating film, conductive film, etc. constituting a semiconductor device.

2. Description of the Prior Art

An integration density of semiconductor devices such as a semiconductor memory device is increasing with the years, and a multilayer structure of interconnection in their internal circuits is in progress more and more. Interlayer insulating films formed on the interconnection may be planalized by means of a Chemical Mechanical Polishing (referred to as "CMP" hereinafter) technique to permit such multilayer structure of interconnection. The CMP technique makes much account of end-point detection and automation of polishing in light of time and cost.

However, since polishing rate cannot be kept constant from various causes such as degradation of the abrasive cloth, it has been difficult to determine end of polishing strictly even if a polishing time is controlled. For this reason, up to now such working steps have been repeated until a planalized surface can be implemented that polishing is carried out for a short time and is then interrupted once to examine polished state of the object. The above working steps are not practical because these steps take much time and labor.

As a method of an end-point detection of the CMP, there has been up to this time a method wherein variation in torque of a motor for rotating a surface plate (to be also called as "head" hereinafter) is first detected and then frictional resistance of polished surface of the object is monitored based on the detected variation. But the method have little sensitivity since it can detect no high frequency component and thus it can detect only positional and time averages of a sliding friction caused between the polished surface of the object and the head. In addition, the method cannot be applied in some cases because of the structure of the head. For instance, in an air-back system in which the head and its enclosure are coupled to each other via an elastic material, it is difficult to transfer influence of friction caused by the polished surface to the rotation axis, so that detection sensitivity is extremely decreased. Therefore, the air-back system has not been adequate to practical use.

There has been another method in which the end-point of polishing is detected by measuring the polishing object through an optical thicknessmeter. But the end-point cannot be detected by the method in real time. Moreover, in case both a silicon nitride film and an $SiO_2$ film have to be polished concurrently, a polished film thickness cannot be measured precisely through the optical thicknessmeter.

Hence, there have been proposed an end-point detection of polishing based on variations in a rotating torque of the motor and vibration of the surface plate in Patent Application Publications (KOKAIs) 6-320416 and 6-45299. However, in these Publications (KOKAIs), the end-point cannot be detected when the polished surface has been planalized simply, but it can be detected when different material is exposed to the polished surface with progress of polishing thereby to cause a change in frictional resistance of the polished surface and also a change in vibration.

There has been recited a method of measuring distortion of the surface plate due to friction between the polished surface and the abrasive cloth through a distortion sensor in Patent Application Publication (KOKAI) 6-320416.

However, since vibration caused by polishing is weak in a polishing apparatus in which a distortion sensor is put, mechanical vibrations (sound) such as motor vibration in the polishing apparatus are picked up by the distortion sensor as a background noise. Thus, sufficient sensitivity cannot be attained by the polishing apparatus. As a result, it become difficult to detect precisely polishing condition of the polished surface in an entire area or detect the end-point of polishing, and therefore additional polishing is required after fundamental polishing being completed.

If distortion of the head caused by friction between the polished surface and the abrasive cloth is to be measured by the distortion sensor, the distortion does not appear so obviously as to be picked up by the distortion sensor. Further, change in unevenness of the wafer surface cannot be detected by the distortion sensor in the actual circumstances even if vibration of the polishing apparatus itself is reduced by a filter, for the distortion sensor has no sensitivity to high vibration frequency.

In the conventional polishing apparatus, because no objective index concerning setting and replace timing of the abrasive cloth has been established, these workings are often executed wastefully.

In addition, if the polished surface has been scratched by dust (foreign materials) once in polishing, such scratch cannot be detected until the polishing object is taken out after the polishing to observe or check the polished surface through a microscope. No countermeasure has been taken against the dust which is produced and entered in the course of polishing the surface by virtue of the CMP. The polished surface has been merely estimated indirectly by observing scratches formed on the polished surface through the microscope.

Meanwhile, in the prior art, polishing condition has been estimated after completing the polishing. Therefore, even if the dust is entered into the polished surface in an initial stage of polishing the lot (usually 25 wafers) to begin scratching of the polished surface of the polishing object, mixture of the dust has not been able to be found until polishing of the concerned lot is terminated. For this reason, the objects to be polished after the dust acting to scratch the polished surface is entered have been scratched as a matter of course, so that the objects of polishing such as a semiconductor wafer are wasted. In addition, a part of the polished surface has been broken off as the dust from the scratched surface to thus increase the dust still more.

Moreover, location of the dust on the polished surface cannot be identified even if the dust exists in polishing the surface, and therefore in some cases the abrasive cloth must be exchanged as a whole to remove the dust. In such cases, it takes much time and labor to exchange the abrasive cloth.

Furthermore, in the foregoing Patent Application Publications (KOKAIs), to transmit the detection signal of the surface plate vibration from the surface plate to the amplifier has been recited. In the event that it is intended to transmit the signal via a radio system, the radio signal is interrupted temporarily by the shaft of the motor for rotating the surface plate.

In the meanwhile, an amount of polishing is dependent on profiles of patterns and in addition it changes widely according to polishing conditions such as applied pressure, number of revolution, flow rate of abrasive liquid, and surface conditions of the abrasive cloth. Accordingly, if an amount of polishing is controlled according to an elapsed time, trial-polishing would be carried out once lot by lot so as to confirm the polishing rate. However, a plenty of time and labor are required for such trial-polishing. Further, in the case that several kinds of lots including different patterns therein are polished, a time required for the trial-polishing is increased in the whole polishing time to thus reduce a throughput.

SUMMARY OF THE INVENTION

It is an object of the present invention to provide a polishing apparatus and a polishing method capabling of detecting variations in polishing precisely in real time by detecting vibration in polishing with high sensitivity to shorten a polishing time, facilitating confirmation of existence of dusts, transmitting vibration of a surface plate via a radio system properly, and improving a detecting capability of proper vibration in polishing used to check polishing conditions.

According to an aspect of the present invention, since polishing is stopped by a signal analyzing means which analyzes vibration intensity detected by said vibration detectors through frequency analysis, integrates relative to time said vibration intensity from which vibration component (e.g., proper vibration component of the polishing apparatus) caused by causes other than polishing, and transmits a polishing stop signal to stop polishing operation when variation in a resultant integral value relative to time is less than a first reference value or when said resultant integral value is less than a second reference value, an end-point of polishing can be easily detected.

In the signal analyzing means, since a signal for indicating degradation of said abrasive cloth is output when either a time from start of polishing to stop of polishing is shorter than a preset time or variation of said resultant integral value relative to time is decreased in excess of a designated value, either end of polishing or degradation of said abrasive cloth can be easily determined and an optimum polishing operation can be implemented.

Since it has been confirmed experimentally that polishing is not being carried out uniformly if a decreasing factor of vibration intensity in particular vibration frequency is larger than that of vibration intensity in other vibration frequency, polishing conditions are modified by detecting such attenuation of vibration intensity to provide uniform polishing, thereby resulting in optimum polishing.

In a polishing apparatus having a structure wherein a first surface plate for supporting the polishing object and a rotation force transmitting mechanism are connected via an elastic substance, since a vibration detector is attached to the first surface plate, proper vibration of the rotation force transmitting mechanism may be absorbed by the elastic substance, and an S/N ratio can be improved when vibration of the polishing object is detected. Thereby, an end-point of polishing can be grasped quickly and precisely.

Since a mechanism for inducing vibration in polishing is formed in the abrasive cloth, vibration intensity of the vibration generated in polishing is enhanced, and a vibration frequency bandwidth to be detectable by the vibration detector is broadened. Thus, fine control of the polishing conditions and the end-point detection in polishing is facilitated.

In this case, if cavities are formed in the abrasive cloth and the surface plate, induced vibration in polishing is amplified, so that change in vibration intensity of vibration can be grasped readily.

By calculating an attenuation amount of vibration by the vibration detector in polishing as a RMS value, and measuring change in the RMS value every time interval, a time point when integral value of the change or change amount for a predetermined time interval becomes zero or more may be used as the end-point detection of polishing.

In this case, if the first surface plate takes moving operation on the abrasive cloth in addition rotation operation, an AC component is too large to determine the end-point of polishing. In such event, if the detection signal is corrected by dividing the RMS value by a function including location information of the first surface plate, the end-point of polishing can be detected quickly and accurately.

According to another aspect of the present invention, in case an output of the vibration detector for detecting vibration in polishing is transmitted to the outside by radio, a stable transmission-reception can be accomplished even when the antenna is rotated or swung since a transmitting antenna and a receiving antenna are arranged in a coaxial manner.

In order to supply power to the vibration detector and the transmitting portion attached to the surface plate, since an annular conductor is provided around a shaft for rotating the surface plate and power is then supplied through a brush being contacted to the annular conductor, situations, for example, time and labor for exchange of a battery, operation stop because of an electric power shortage, etc. can be avoided. A commercially available slip ring may be utilized as the annular conductor.

According to still another aspect of the present invention, since an automatic frequency control mechanism is employed when plural polishing are carried out concurrently and polishing information are transmitted and received by radio, a stable receiving state can be kept even if a transmitting frequency is fluctuated due to temperature change.

According to yet still anther aspect of the present invention, after detecting abnormality of vibration intensity detected by the vibration detector attached to the surface plate in polishing, if a detecting time of abnormality of vibration intensity is shorter than a rotating period of the surface plate, a signal indicating presence of the dust is output from a signal analyzing portion. Therefore, polished surfaces of the succeeding polishing object can be prevented beforehand from being scratched by the dust.

In case abnormality of vibration intensity is generated longer than the rotating period of the surface plate, the surface of the polishing object is damaged by causes other than the scratch. Therefore, polishing is immediately ceased and abnormal operation of the polishing apparatus due to causes other than the dust can be readily detected.

According to further aspect of the present invention, in a structure wherein an air-back type upper surface plate which is protected from vibration of the enclosure which has an inner airtight cavity is provided, a vibration detector for detecting circumferential vibration is provided on the upper surface plate, and end of polishing, etc. are determined according to change in vibration intensity signal or vibration spectrum signal output from the vibration detector. Thereby, by detecting change in vibration intensity or vibration spectrum in the rotating direction of the air-back type upper surface plate, determination as to change in polishing conditions can be facilitated.

In case the signal from the vibration detector is output to the controller via a bandpass filter, vibration component depending upon proper frequency vibration in the polishing apparatus may be removed so as to mate with the polishing apparatus and polishing conditions, so that only the vibration generated by actual polishing can be selected.

In case vibration signal detected by the vibration detector is transmitted to a controller by radio, an amplitude range of the vibration signal may be expanded by a logarithmic amplifier and then transmitted by radio, and the vibration signal is restored by an inverse logarithmic amplifier after reception, thereby improving the S/N ratio.

In case an output signal from the vibration detector is small, the output signal can be amplified by connecting a plurality of the vibration detectors. In addition, since unnecessary vibration components not to be detected by these detectors are increased, noises due to unnecessary vibration components can be reduced by selecting directions and arrangements of these detectors such that such unnecessary components are canceled mutually and necessary components are added, thereby improving an S/N ratio.

According to still further aspect of the present invention, in case vibration of the polishing object supporting plate which changes with the progress of polishing is detected by a vibration detector, inputting of background noise such as motor sound into the vibration detector can be suppressed to thus improve an S/N ratio since sound-proof material is arranged around the vibration detector.

In case vibration of the polishing object supporting plate which changes with the progress of polishing is detected by a vibration detector, an S/N ratio can be improved because vibration frequency to be detected is converted into a maximum sensitivity frequency of the vibration detector.

In case vibration of the polishing object supporting plate which changes with the progress of polishing is detected by a vibration detector, detected vibration being input into the vibration detector can be amplified by resonance and thus improve an S/N ratio since a vibration plate having a proper vibration frequency identical to vibration frequency to be detected is interposed between the polishing object supporting plate and the vibration detector.

In case vibration of the polishing object supporting plate which changes with the progress of polishing is detected by a vibration detector, vibration transmitting efficiency from the polishing object to the vibration detector can be enhanced to thus improve an S/N ratio since a vibration transmitting substance contacting to both the vibration detector and the polishing object is formed through the polishing object supporting plate.

In case vibration of the polishing object supporting plate which changes with the progress of polishing is detected by a vibration detector, background noise can be suppressed significantly to thus improve an S/N ratio since energy supply for driving the polishing object supporting plate is halted temporarily in detecting.

In case vibration of the polishing object supporting plate which changes with the progress of polishing is detected by a vibration detector, an S/N ratio can be improved since vibration frequency to be detected is differentiated from vibration frequency of the background noise and it is set to be identical to a proper vibration frequency of the polishing object supporting plate.

In case vibration of the polishing object supporting plate which changes with the progress of polishing is detected by a vibration detector, inputting of background noise into the vibration detector can be eliminated to thus improve an S/N ratio since a vibration plate being vibrated in opposite phase to the background noise is interposed between the polishing object supporting plate and the vibration detector.

In case vibration of the polishing object supporting plate which changes with the progress of polishing is detected by a vibration detector, time and labor for exchanging the detectors because of failure of the vibration detectors can be reduced since a plurality of vibration detectors are provided on the polishing object supporting plate to be selected.

According to yet still further aspect of the present invention, since a displacement detector for detecting location of the polishing object supporting plate in polishing is provided, friction force between the abrasive cloth and the polishing object is changed with the progress of polishing to thus displace location of the polishing object supporting plate, so that an end-point of polishing, etc. can be detected according to a change amount of the displacement. In this case, since a change amount of location of the polishing object supporting plate is different in the vibration frequency bandwidth from background noise, a detection with an excellent S/N ratio can be attained without influence of vibration of the motor.

In the present invention, since various approaches for amplifying proper vibration in polishing, improving an S/N ratio, etc., it becomes easy to determine an end-point of polishing of wafer without different material for detecting the end-point of polishing, and the like.

BRIEF DESCRIPTION OF THE DRAWINGS

FIGS. 2A and 2B are plan views showing grooves of an abrasive cloth being applied to the polishing apparatus according to the first embodiment of the present invention;

FIG. 40 is a block diagram showing a signal system in the polishing apparatus according to the twelfth embodiment of the present invention;

DESCRIPTION OF THE PREFERRED EMBODIMENTS

Preferred embodiments of the present invention will be explained with reference to accompanying drawings hereinafter.

(First Embodiment)

Figures 1, 1A:
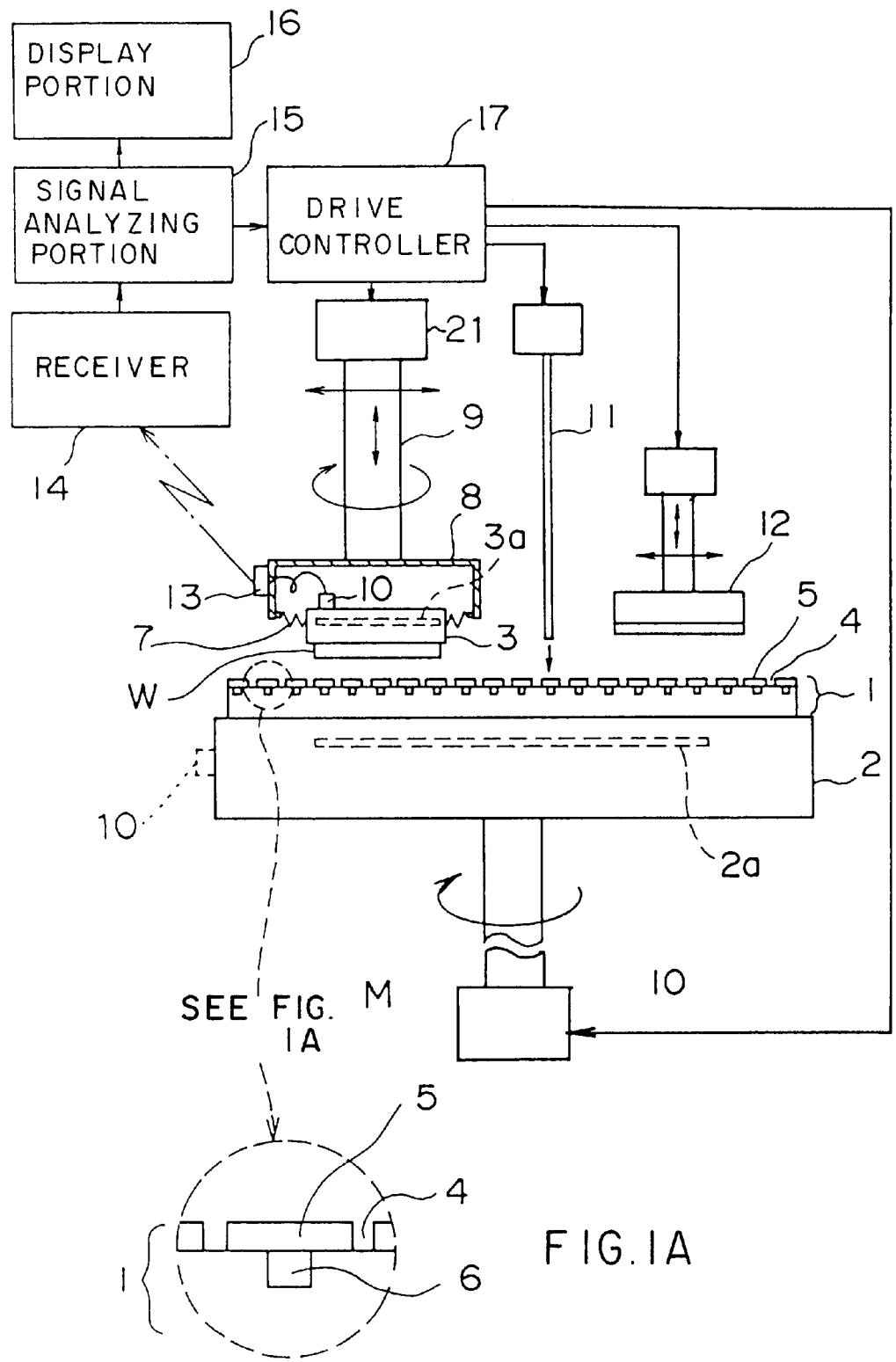
FIG. 1 is a schematic view showing a configuration of a polishing apparatus according to a first embodiment of the present invention.

FIG. 1 shows pertinent portions of a configuration of a polishing apparatus according to a first embodiment of the present invention.

The polishing apparatus comprises a circular-disk type lower surface plate 2 being driven by a motor M, and a circular-disk type upper surface plate 3 for supporting an polishing object W via an adsorption pad (not shown). Resonance portions 2a, 3a respectively consisting of one cavity or more are formed respectively in the lower surface plate 2 and the upper surface plate 3. An abrasive cloth 1 which being opposed and contacted to an polishing object W is stuck on the lower surface plate 2.

The abrasive cloth 1 is formed of cellular urethane to have a two-layered structure, for example.

As shown in FIGS. 2A and 2B, first grooves 4 of an about 2 mm depth are formed on an upper layer portion of the abrasive cloth 1 at a plurality of areas. A plurality of rectangular areas surrounded by the first grooves 4 are formed respectively to have a width of 20 mm square, for example, and they may act as resonance portions 5 for inducing vibration at the time of polishing while contacting the polishing object W. Second grooves (cavities) 6 superposed on the resonance portions 5 are formed in the lower layer of the abrasive cloth 1 so as to resonate with vibration of the resonance portions 5.

Although forming areas of the first grooves 4 are not restricted particularly, they are shown in FIGS. 2A and 2B by way of example. In FIG. 2A, the first grooves 4 have respectively a rectangular plan shape and a plurality of the first grooves 4 are formed in the cruciform direction. In FIG. 2B, a plurality of the first grooves 4 are formed linearly in vertical and horizontal directions.

Figure 3:
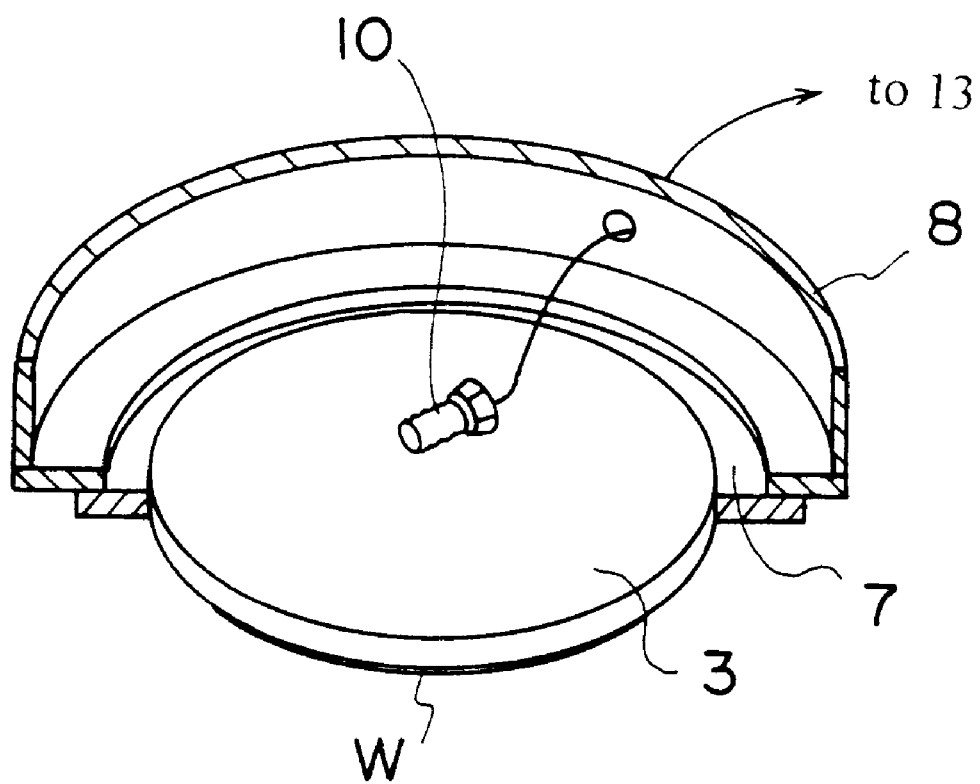
FIG. 3 is a perspective view, partially in section, showing a head used in the polishing apparatus according to the first embodiment of the present invention.

As shown in FIG. 3, the upper surface plate 3 is supported by an enclosure 8 of the internal cavity via an elastic substance 7 such as rubber, spring, etc. to make different movements from those of the enclosure 8. An upper portion of the enclosure 8 is fixed to a lower end of a shaft 9 which being rotated and moved upwardly and downwardly by a shaft driving portion 21. The enclosure 8, the upper surface plate 3 and the elastic substance 7 are called as a "head" as a whole. The internal pressure in an internal space of the head is kept up to push the upper surface plate 3 to the abrasive cloth 1.

A vibration detecting device (to be also called as "accelerator device" hereinafter) 10 is attached to an upper or side portion of the upper surface plate 3. An output end of the vibration detecting device 10 is connected to a transmitter 13 attached to the enclosure 8. For example, a piezoelectric acceleration sensor may be used as the vibration detecting device 10.

The head having such a structure that a space surrounded by the enclosure 8, the upper surface plate 3 and the elastic substance 7 is kept up at predetermined pressure is called as an air-back type head. In the air-back type head, a downward pressure is applied to the upper surface plate 3 to be restored to its original position if the upper surface plate 3 is displaced upwardly whereas an upward pressure is applied to the upper surface plate 3 to be restored to its original position if the upper surface plate 3 is displaced downwardly, and then the downward or upward pressure is maintained. The downward or upward pressure is supplied from the outside through the cavity in the shaft 9.

The transmitter 13 transmits vibration information as for vibration frequency and vibration intensity supplied from the vibration detecting device 10 to a receiver 14 by radio signals. A signal analyzing portion 15 analyzes vibration information received from the receiver 14, and subtracts proper vibration components produced by various causes other than polishing (e.g., proper vibration components of the polishing apparatus) from resultant power spectrum between vibration frequency and vibration intensity. A display portion 16 displays the result of subtraction. A drive controller 17 moves, drives and stops the shaft 9 and the dresser 12, or controls a supply amount of polishing liquid supplied via a nozzle 11.

The surface of the abrasive cloth 1 is set by the dresser 12. Vertical movement and rotational movement of the dresser 12 is controlled by the drive controller 17.

The number of rotation of a motor M for rotating the lower surface plate 2 is also controlled by the drive controller 17.

For purposes of illustration, there are wafer formed of silicon, germanium, and compound semiconductor, etc., and conductive film, insulating film, metal film, those being formed on the wafer, as a polishing object W to be polished by the above polishing apparatus.

A plurality of micropores may be formed in the abrasive cloth 1 in place of the first and second grooves.

Subsequently, an operation of the polishing apparatus will be explained taking polishing of the semiconductor wafer as an example.

First the semiconductor wafer W is stuck on the under surface of the upper surface plate 3 as the polishing object W, then the lower surface plate 2 is rotated according to the signal supplied from the drive controller 17. The shaft 9 is rotated and brought down according to the signal supplied from the drive controller 17 to push the semiconductor wafer W to the abrasive cloth 1. The polishing liquid is supplied to the abrasive cloth 1 via the nozzle 11 during polishing.

After polishing being commenced, vibration of the semiconductor wafer W due to friction between the semiconductor wafer W and the abrasive cloth 1 causes vibration of the vibration portions 5 formed in the abrasive cloth 1. The vibration of the vibration portions 5 is amplified by resonance in the second groove 6 and resonance portions 2a, 3a formed respectively in the lower surface plate 2 and the upper surface plate 3, and then transmitted to the vibration detecting device 10.

As vibrations being input to the vibration detecting device 10, a vibration component propagated from a shaft driving portion 21 for driving the shaft 9 is present in addition to the vibration component caused by friction. Proper vibration of the shaft driving portion 21 acts as a noise for the vibration detecting device 10 for detecting frictional vibration. However, since the vibration detecting device 10 is attached to the upper surface plate 3, proper vibration of the shaft driving portion 21 propagated to the shaft 9 and the enclosure 8 is attenuated by virtue of vibration adsorption of the elastic substance 7. As a result, since proper vibration of the shaft driving portion 21 propagated to the upper surface plate 3 is weakened, the noise which is input to the vibration detecting device 10 can be reduced.

Vibration information such as vibration frequency and vibration intensity detected by the vibration detecting device 10 are sent to the display portion 16 via the transmitter 13, the receiver 14, and the signal analyzing portion 15 and then displayed on the display portion 16. A power spectrum of vibration shown in FIG. 4, for instance, is displayed on the display portion 16. The power spectrum can be derived by subtracting a proper vibration component produced by causes other than polishing by means of the signal analyzing portion 15.

In the state where unevenness still remains on the whole polished surface in an initial state of polishing, it can be seen that enhanced vibration intensity appears over the wide vibration frequency bandwidth from low frequency to high frequency. When a part of the polished surface is planalized locally with progress of polishing, not only vibration intensity is reduced over all vibration frequency ranges, but also attenuation of the vibration intensity in the low vibration frequency such as about 500 Hz becomes remarkable. Attenuation in the low frequency range is a peculiar phenomenon which is caused by the fact that a part of the polished surface has been polished to be flat. On the contrary, if the entire polished surface has been polished uniformly, vibration intensity in a high frequency range about 1000 Hz has been reduced. If a part of the polished surface is planalized, the number of rotation of the upper surface plate 3 and the lower surface plate 2 and the pressure supplied to the upper surface plate 3 are controlled by the drive controller 17, and therefore the variation in polishing can be reduced.

Figure 4A:
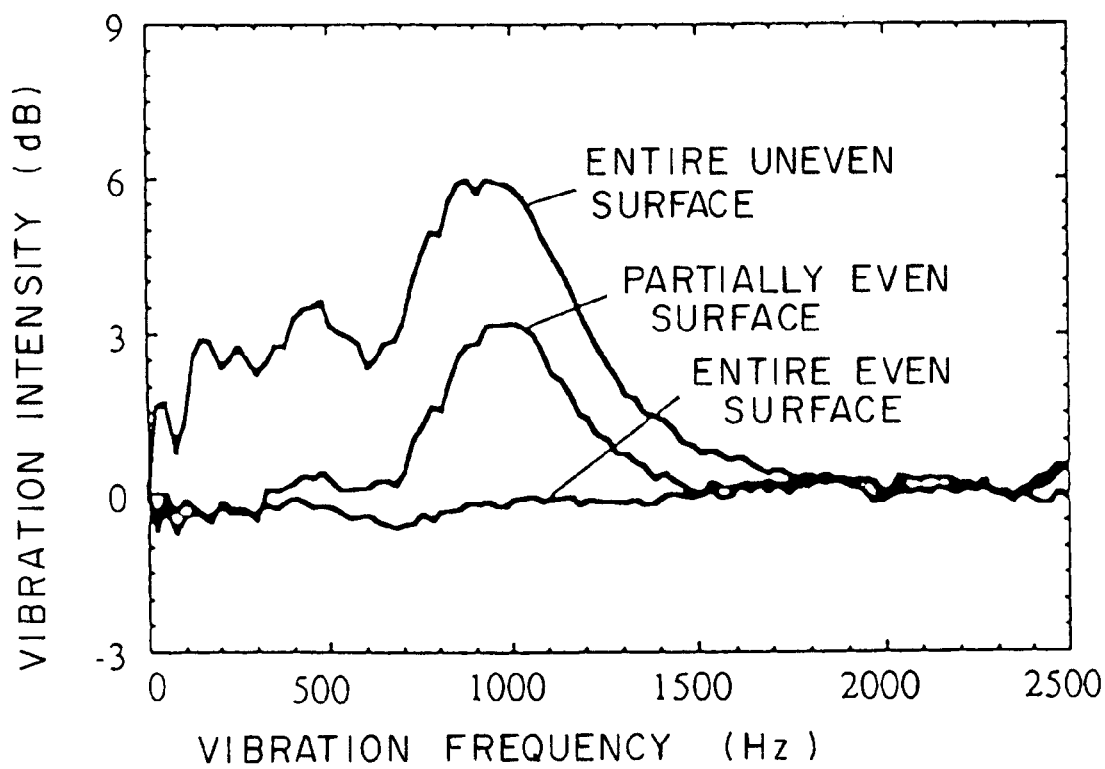
FIG. 4A is a graph illustrating spectrum indicating relations between vibration frequency and vibration intensity which are detected by a vibration detecting device in the course of polishing by means of the polishing apparatus according to the first embodiment of the present invention.

No vibration is produced when the entire polished surface has been planalized uniformly, and therefore, as shown in FIG. 4A, the vibration intensity becomes almost zero over all vibration frequency bandwidth.

As stated earlier, since the vibration frequency bandwidth is widened and also the vibration intensity is enhanced in terms of inducing vibration of the excitation portions 5 provided in the abrasive cloth 1, not only the sensitivity can be improved, but also the vibration can be amplified by resonances of the second grooves 6 of the abrasive cloth 1 and the resonance portions 2a, 3a in the lower surface plate 2 and the upper surface plate 3.

Thereby, it is feasible to detect existence of minute unevenness on the polished surface and to amplify them. A minute unevenness of the polished surface wherein polishing state is less than 0.05 μm can be detected according to change in vibration, and a situation of variation in polishing on the polished surface can be grasped with good precision. By either changing polishing pressure or changing the number of rotation of the upper surface plate 3 or the lower surface plate 2 to reduce the variation, variation in polishing can be corrected by automatic modification. Thus, polishing conditions can be detected with high precision, so that end of polishing can be readily determined and also supplementary polishing can be omitted. Hence, a throughput can be improved.

If spectrum of vibration intensity relative to vibration frequency is integrated by the signal analyzing portion 15, the integral value is reduced gradually with the progress of polishing. Therefore, it is determined that polishing is completed when variation in the integral value with respect to time becomes zero. At that time, the signal analyzing portion 15 sends a polishing terminating signal to the drive controller 17. The drive controller 17 disconnects the semiconductor wafer W from the abrasive cloth 1 by stopping rotation of the shaft 9 or lifting the shaft 9 and terminates polishing operation.

In this case, an average value of vibration intensity over a predetermined frequency bandwidth may be adopted as the integral value.

Figure 4B:
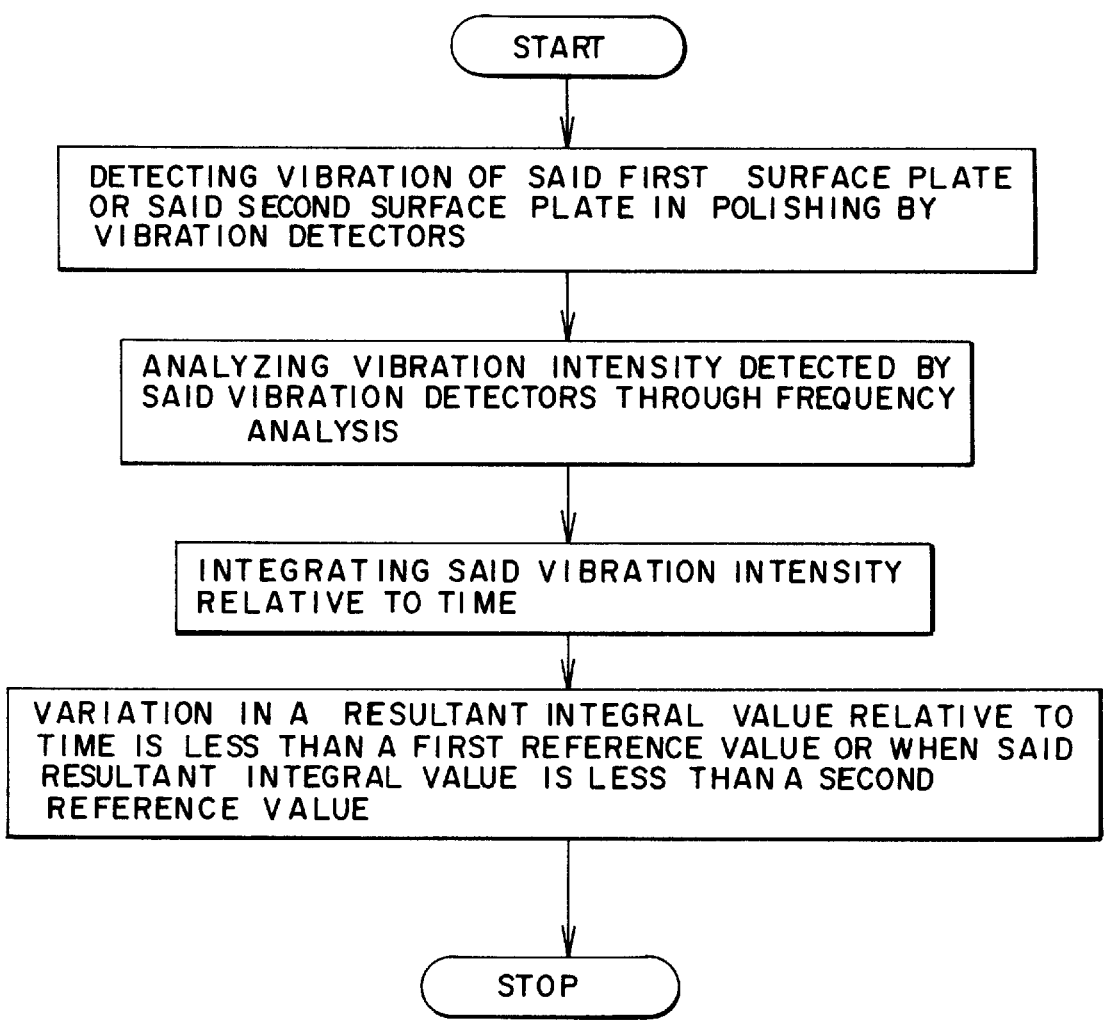
FIG. 4B is a flow chart according to the first embodiment of the present invention.

In the event that the integral value does not become zero completely when the polishing operation is terminated, it may be determined that the polishing operation is finished when the integral value reaches a predetermined reference value or variation in the integral value relative to time becomes smaller than a predetermined reference value, as shown in FIG. 4B.

Meanwhile, if the abrasive cloth 1 is worn away before polishing is terminated, friction between the polishing object W and the excitation portions 5 is reduced to eliminate vibration, and therefore vibration intensity attenuates sharply, thus resulting in the substantially same characteristic as that of the termination of polishing. Such sharp attenuation of vibration intensity is transmitted to the signal analyzing portion 15 via the vibration detecting device 10, the transmitter 13, and the receiver 14 and then is determined as degradation of the abrasive cloth 1 by the signal analyzing portion 15. In this case, the signal analyzing portion 15 makes the drive controller 17 stop polishing, and the dresser 12 is driven to set the abrasive cloth 1. Polishing of the polishing object W is started again after the setting of the abrasive cloth 1 is finished.

When the surface of the abrasive cloth 1 becomes smooth, vibration intensity appears in the vibration frequency range of 0 to several hundreds Hz in the order of several dB. Therefore, it would be understood that abrasion of the abrasive cloth 1 may detected based on information as for appearance of vibration intensity in such vibration frequency range and variation in vibration intensity.

Either the time from start to end of polishing which being shorter than a predetermined time or variation of the integral value relative to time which being decreased in excess of a designated value may be adopted as a degradation criterion of the abrasive cloth 1.

In turn, polishing of an insulating film covering the interconnection of the semiconductor device by the above polishing apparatus will be explained.

Figure 5A:
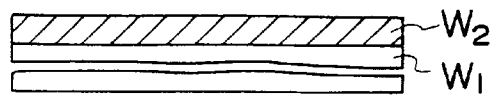
FIGS. 5A and 5B are sectional views showing a part of steps of manufacturing a semiconductor device.
Figure 5B:
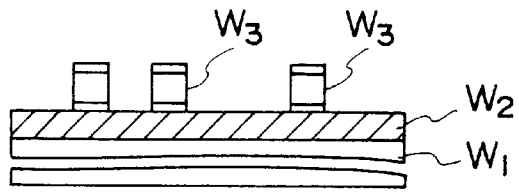
Figure 6A:
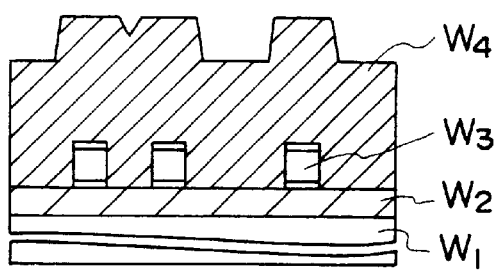
FIGS. 6A and 6B are sectional views showing a first example wherein an insulating film of a semiconductor device is polished by means of the polishing apparatus according to the first embodiment of the present invention.
Figure 6B:
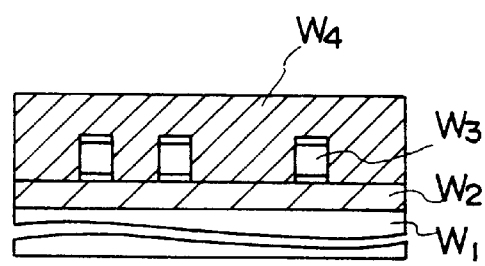

To form the interconnection of the semiconductor device, as shown in FIG. 5A, first a first insulating film $W_2$ is formed on a semiconductor substrate $W_1$, then a metal film is formed on the first insulating film $W_2$, and then as shown in FIG. 5B interconnection patterns $W_3$ are formed by patterning the metal film. Thereafter, as shown in FIG. 6A, a second insulating film $W_4$ is formed to protect the interconnection patterns $W_3$. Differences in level formed between the interconnection patterns $W_3$ and the first insulating film $W_2$ appear as unevenness on the surface of the second insulating film $W_4$. The surface of the second insulating film $W_4$ is polished until an end-point is detected by the above polishing apparatus. As a result, as shown in FIG. 6B, the polished surface becomes flat.

Figure 7A:
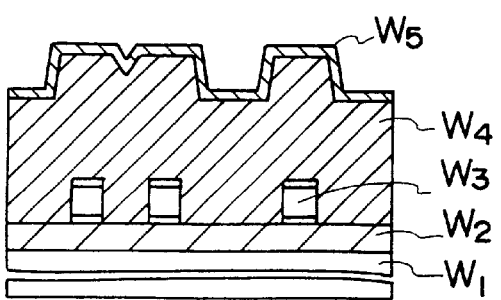
FIGS. 7A and 7B are sectional views showing a second example wherein the insulating film of the semiconductor device is polished by means of the polishing apparatus according to the first embodiment of the present invention.
Figure 7B:
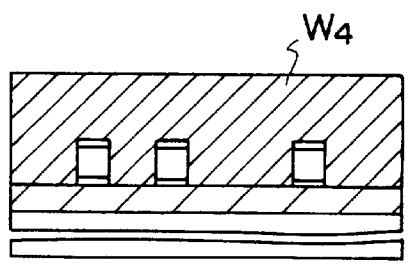

In case the second insulating film $W_4$ is formed of, for example, an $SiO_2$ film employing TEOS, a polishing rate is high. Therefore, as shown in FIG. 7A, there are some cases a silicon nitride film $W_5$ is formed on the second insulating film $W_4$ by CVD. The silicon nitride film W has an uneven surface. The surfaces of the second insulating film $W_4$ and the silicon nitride film $W_5$ are polished until the end-point is detected by the polishing apparatus of the present invention. As a result, as shown in FIG. 7B, the polished surface becomes even. Since the silicon nitride is hard rather than $SiO_2$, an amount of polishing achieved when the silicon nitride film $W_5$ is formed is less than an amount of polishing achieved when the silicon nitride film $W_5$ is not formed.

Figure 8A:
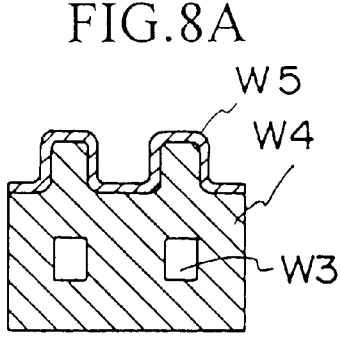
FIGS. 8A to 8C are sectional views showing a first example how to progress polishing of an insulating film of a semiconductor device by means of the polishing apparatus according to the first embodiment of the present invention.
Figure 8B:
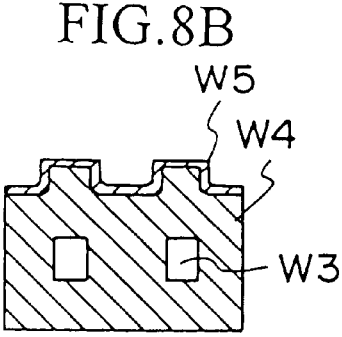
Figure 8C:
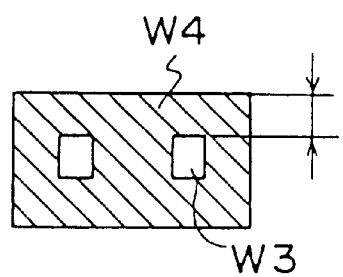

If only the second insulating film $W_4$ has to be polished, the polished surface is varied as shown in FIGS. 8A to 8C. In this case, waveforms of vibration input into the vibration detecting device 10 is reduced, as shown in FIG. 10, with the progress of polishing.

Figure 9A:
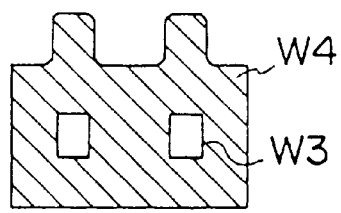
FIGS. 9A to 9C are sectional views showing a second example how to progress polishing of an insulating film of a semiconductor device by means of the polishing apparatus according to the first embodiment of the present invention.
Figure 9B:
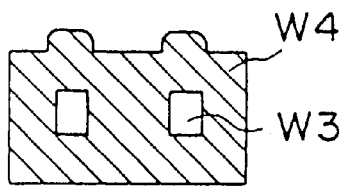
Figure 9C:
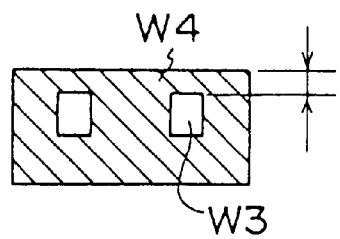

On the other hand, the second insulating film $W_4$ and the silicon nitride film $W_5$ are to be polished, the silicon nitride film $W_5$ covering the entire surface in an initial state is lost partially with the progress of polishing to thus expose the second insulating film $W_4$, as shown in FIGS. 9A and 9B. If the second insulating film $W_4$ and the silicon nitride film $W_5$ are further polished, the end-point of the polishing is detected at the time when the polished surface is planarized, and at that time polishing of the polished surface is ceased. Only the first insulating film $W_4$ is exposed on the polished surface, as shown in FIG. 9C, or the silicon nitride film $W_5$ remains partially on the polished surface.

Figure 10:
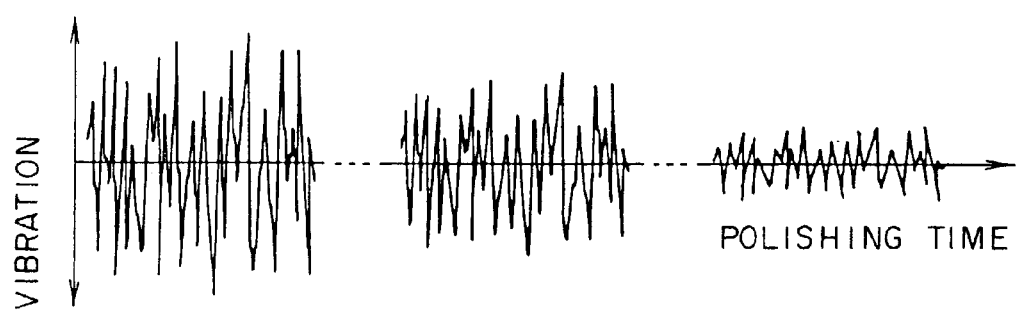
FIG. 10 is a views showing changes in waveform which being output from a vibration detecting device in the polishing apparatus according to the first embodiment of the present invention.

In these polishing, vibration waveforms being input into the vibration detecting device 10 are given as shown in FIG. 10.

Accordingly, as recited in Patent Application Publication (KOKAI) 6-320416, the above polishing apparatus does not detect the situation where the amplitude is increased according to variation in the film quality, but it detects the event where vibration intensity is reduced in proportion to an increase of a flatness of the polished surface. Hence, the polishing apparatus is so constructed that it determines the end-point of polishing in the stage where the reduction of vibration reaches a predetermined criterion and then ceases the polishing operation.

A plurality of foregoing vibration detecting device 10 may be attached to the upper surface plate 3. For instance, polishing states may be detected in more detail by detecting vibrations in the vertical and lateral circumferential directions separatingly. In this case, the integral value of spectrum of vibration intensity may be detected by an average value which being derived from a plurality of the vibration detecting device 10. Vibration of the vibration detecting device 10 may not be vibration in the vertical direction, but vibration in the lateral or circumferential direction. The vibration in the circumferential direction will be explained in detail in eighth and ninth embodiments. The vibration detecting device 10 may be attached the lower surface plate 2 instead of the upper surface plate 3. Similarly, this is true for the following embodiments.

(Second Embodiment)

Figure 11:
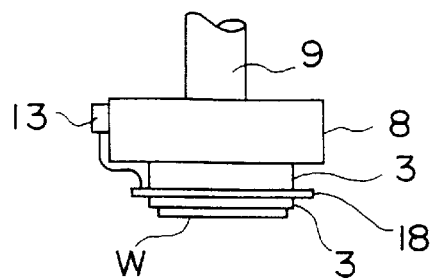
FIG. 11 is a side view showing a head portion of a polishing apparatus according to a second embodiment of the present invention.

FIG. 11 is a side view showing a head portion of a polishing apparatus according to a second embodiment of the present invention.

In the second embodiment, as shown in FIG. 11, a vibration detecting device (acceleration device) 18 made of piezoelectric material such as ceramic or crystal is interposed in an intermediate layer of the upper surface plate 3. As a result, not only vertical vibration to the polished surface of the polishing object W but also friction caused along the polished surface in the torsional direction, i.e., "sliding friction" can be detected. Since the sliding friction is reduced sharply when a part of the polished surface is planarized locally, variation in polishing can be removed by adjusting polishing conditions (e.g., polishing pressure, polishing rate, etc.) not to reduce the sliding friction sharply if an entire surface of the polished surface has to be polished uniformly.

Like the first embodiment, the vibration detecting device 18 is connected to the transmitter 13 in the second embodiment. The vibration detecting device 18 may be applied to the polishing apparatus wherein the excitation portions 5 are not formed in the abrasive cloth 1.

(Third Embodiment)

Figure 12:
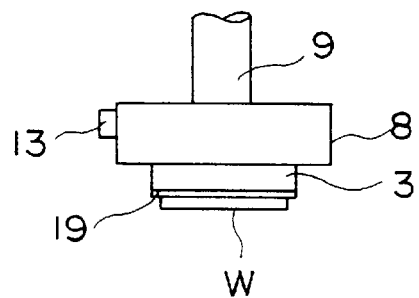
FIG. 12 is a side view showing a head portion of a polishing apparatus according to a third embodiment of the present invention.

FIG. 12 is a side view showing a head portion of a polishing apparatus according to a third embodiment of the present invention.

In the third embodiment, as shown in FIG. 12, a film-like pressure sensor 19 such as a strain gauge is interposed between the polishing object W and the upper surface plate 3. As a result, change in pressure being applied to the polishing object W in the direction vertical to the polished surface can be detected as change in electric resistance, so that vibration frequency and vibration intensity in the vertical direction can be detected. A sensor of the type for detecting pressure distribution may be used as the pressure sensor 19.

The vibration detecting device 18 is connected to the transmitter 13 in the third embodiment, like the first embodiment, and may be applied to the polishing apparatus wherein the excitation portions are not formed in the abrasive cloth.

(Fourth Embodiment)

Figure 13:
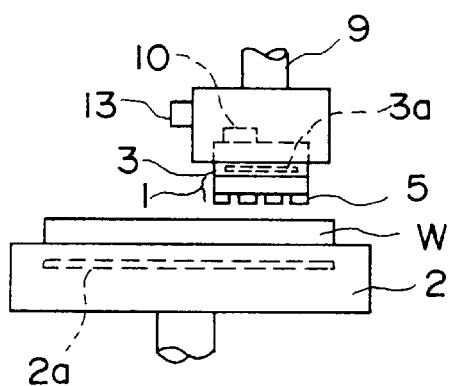
FIG. 13 is a side view showing a head portion of a polishing apparatus according to a fourth embodiment of the present invention.

In the foregoing embodiments, the polishing object has been attached to the upper surface plate while the abrasive cloth has been stuck to the lower surface plate. Conversely, as shown in FIG. 13, the polishing object W may be attached to the lower surface plate 2 while the abrasive cloth 1 may be stuck to the upper surface plate 3.

In the fourth embodiment, the excitation portions 5 are also formed in the abrasive cloth 1, and the vibration detecting device 10 and the transmitter 13 are also attached to the upper surface plate 3.

In the fourth embodiment, the second grooves 6 may be formed in the abrasive cloth 1 and the resonance portions 2a, 3a may be formed as cavities in the upper surface plate 3 and the lower surface plate 2, like the first embodiment.

(Fifth Embodiment)

Figure 14:
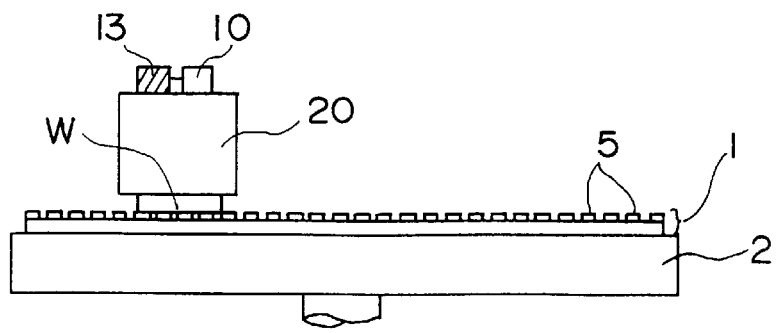
FIG. 14 is a side view showing a head portion of a polishing apparatus according to a fifth embodiment of the present invention.

A mechanism for rotating the upper surface plate by the shaft has been provided in the above embodiments. But, as shown in FIG. 14, the vibration detecting device 10 and the transmitter 13 may be attached to the upper surface plate 20 even if a so-called deadweight type polishing apparatus including the upper surface plate 20 without rotating mechanism is utilized. In this event, the excitation portions 5 may be formed in the abrasive cloth 1 on the lower surface plate 2, and the resonance portions may be formed as cavities in the upper surface plate 3 and the lower surface plate 2.

Note that like reference symbols in FIG. 14 designate identical or corresponding parts in FIG. 1.

(Sixth Embodiment)

Figure 15A:
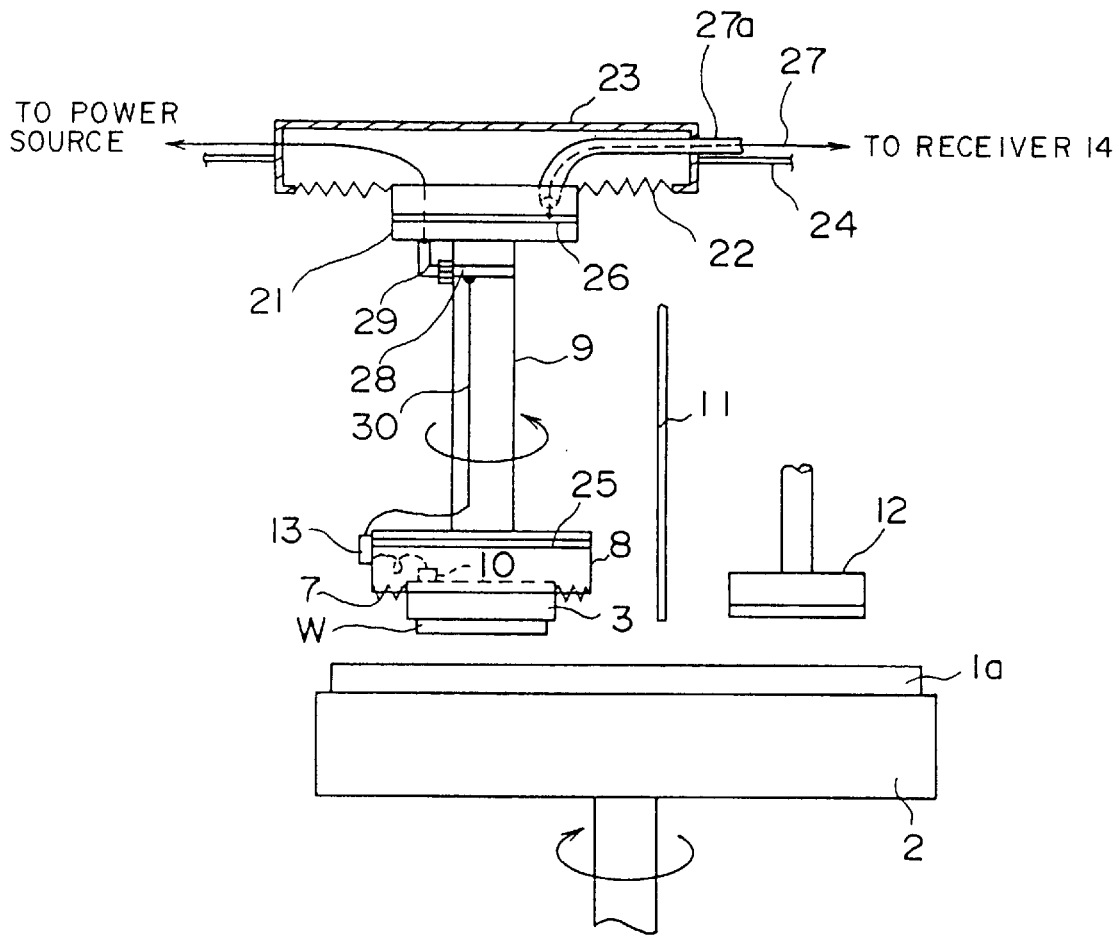
FIG. 15A is a side view showing a polishing apparatus according to a sixth embodiment of the present invention.

Although it can be supposed that a battery is used as a power source of the transmitter in the above polishing apparatuses, polishing will be obstructed if power-supply capability of the battery is decreased during when the polishing apparatus is being driven. In the sixth embodiment, a polishing apparatus is disclosed which includes a structure for supplying power to the transmitter without the battery and a structure for connecting the transmitter with the receiver by radio. FIG. 15A is a side view showing a polishing apparatus according to a sixth embodiment of the present invention. Like reference symbols in FIG. 15 refer to identical or corresponding parts in FIG. 1. Referring to FIG. 15A, a shaft driving portion 21 including a motor is provided on the shaft 9. The shaft driving portion 21 is coupled to a swing apparatus 23 via an elastic substance 22. The swing apparatus 23 is connected to a belt 24 and is arranged movably along the upper surface of the abrasive cloth 1a in the vertical and horizontal directions.

The vibration detecting device (e.g., acceleration sensor) 10 are fixed to the upper surface plate 3 at a location remote from a center of the upper surface plate 3 by a distance of ¼ to ¾ times as long as a radius of the plate 3. At least a coil of the transmitting antenna 25 connected to the transmitter 13 is wound on an outer circumference of the enclosure 8 to which the transmitter 13 is attached. In addition, at least a coil of the receiving antenna 26 is wound on an outer circumference of the swing apparatus, and the receiving antenna 26 is then connected to the receiver 14 shown in FIG. 1 via a signal line 27 which being arranged along the elastic substance 22 and the belt 24. The receiving antenna 26 is surrounded by a shielding line 27a which being grounded.

An annular conductor 28 isolated from the surface is formed around the shaft 9. A conductive brush 29 which is connected to power-supply wiring to be extended outwardly is contacted to the annular conductor 28. An electric wiring 30 is extended from the annular conductor 28 along the internal or external surface of the shaft 9, and is connected to power supply terminal of the transmitter 13. The electric wiring 30 is covered with the insulating substance.

If the elastic substance 7 for fixing the upper surface plate 3 on the enclosure 8 is formed of the insulating substance, the upper surface plate 3 which being formed of conductor or a metal which being evaporated on the surface of the upper surface plate 3 must be connected to an earth line so as to maintain a potential between the upper surface plate 3 and the transmitter 13 at ground potential. Thereby, only one wire will suffice to be the electric wire 30 extended in the longitudinal direction of the shaft 9 which is at ground potential.

According to the above polishing apparatus, even when the upper surface plate 3 is rotated by the shaft 9, the signal output from the transmitter 25 is transmitted through the almost annular transmitting antenna 25 being formed around the upper surface plate 3 by radio. Since the radio signal is input into the receiver 14 shown in FIG. 1 via the almost annular receiving antenna 26 being formed around the shaft driving portion 21, the radio signal is in no way interfered with the shaft 9. In this event, if the swing apparatus 23 is swung, the transmitting antenna 25 and the receiving antenna 26 are swung simultaneously and also the transmitting antenna 25 is rotated. The receiving antenna 26 is not rotated at all.

If one of the transmitting antenna 25 and the receiving antenna 26 is arranged around the shaft 9 in a substantially annular manner, transmission and reception are enabled. But to avoid instability in transmission and reception conditions due to swing of the shaft 9, it is preferable that both the transmitting antenna 25 and the receiving antenna 26 are formed to have an annular shape respectively and are formed by a coaxial arrangement.

Since dissipation power of the transmitter 13 is supplied through the electric wire 30 being arranged along the shaft 9, labor of exchanging the battery for supplying power to the transmitter 13 can be neglected, and in addition interruption of polishing because of insufficient power may be avoided to thus improve a throughput.

The abrasive cloth 1a in which the excitation portions are formed like the first embodiment may be employed. Furthermore, structures shown in the first embodiment other than a power supply system and a signal transmission system may also be adopted.

(Seventh Embodiment)

In case a plurality of polishing objects are to be polished in parallel by using plural polishing apparatuses shown in the first and sixth embodiments, construction of a management system for managing plural polishing apparatuses is requested. Therefore, a seventh embodiment of the present invention for embodying the management system will be explained with reference to FIG. 16.

Figure 16:
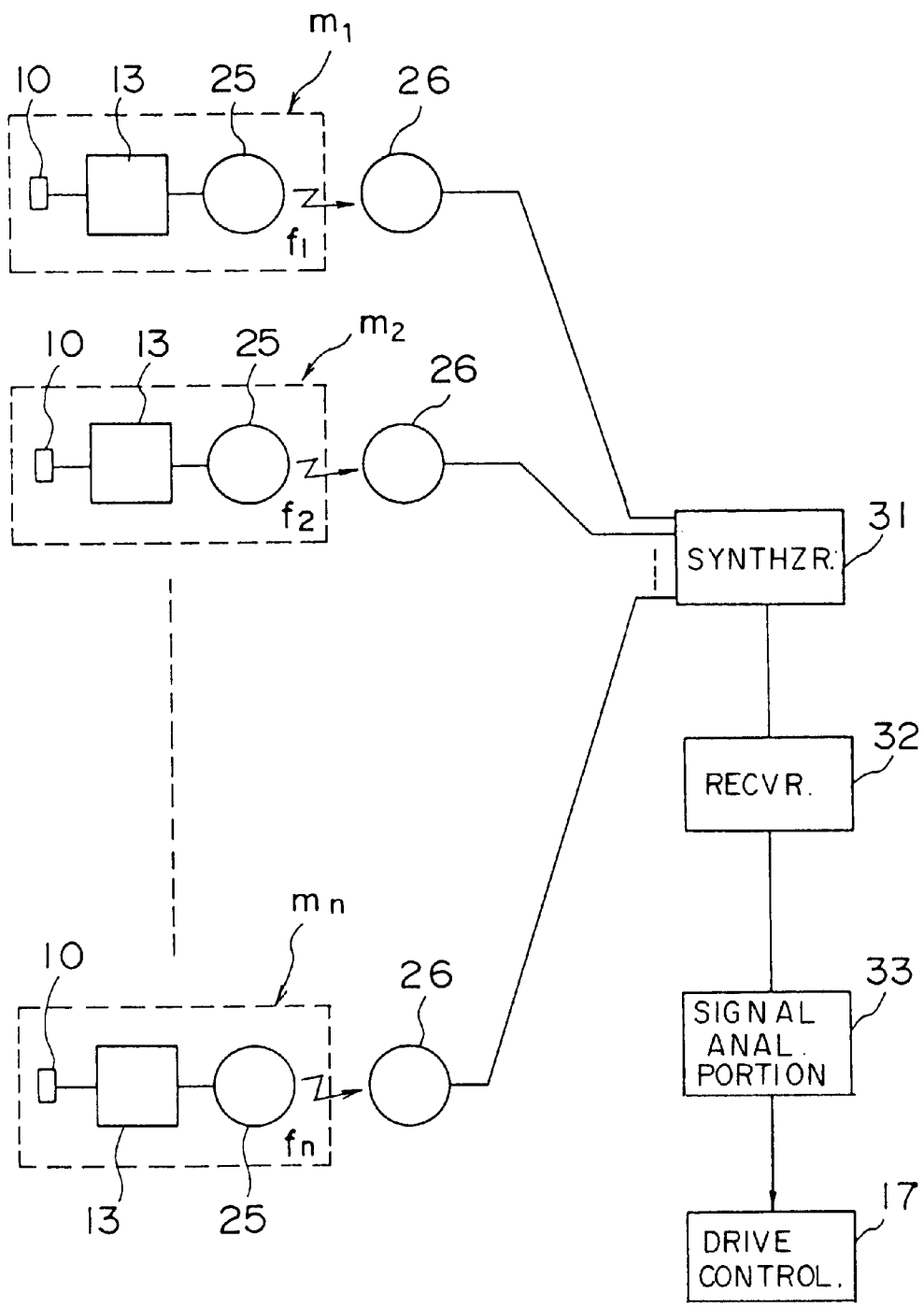
FIG. 16 is a block diagram showing a circuit configuration of a polishing apparatus according to a seventh embodiment of the present invention.

In FIG. 16, the transmitter 13 for transmitting signals $f_1$ to $f_n$ having different frequencies is attached to a plurality of polishing apparatuses $m_1$ to $m_n$ each having the above structure. The above vibration detecting devices 10 are connected respectively to the transmitters 13. The transmitters 13 are so constructed to transmit the signal through only a specific vibration frequency bandwidth by filters.

The signals being output from respective transmitters 13 are propagated via the transmitting antenna 25 and the receiving antenna 26 by radio. Signals $f_1$ to $f_n$ with different frequencies being input into the receiving antennas 26 in the upstream of the transmitting antennas 25 are input into the receiver 32 via a synthesizer 31. The receiver 32 tunes signals $f_1$ to $f_n$ supplied from a plurality of the transmitters 13 in sequence in a time division scheme every time when a signal analyzing portion 33 requests a fixed amount of received data, and transmits the tuned signals to the signal analyzing portion 33. The receiver 32 is equipped with an automatic tuning (automatic frequency control) mechanism. The automatic tuning mechanism holds automatically variation in frequencies of tuned signals within a reference frequency bandwidth, and therefore inconveniences such as impossible reception can be avoided even if frequencies of respective signals $f_1$ to $f_n$ are shifted slightly because of temperature variation or the like. As a result, respective signals $f_1$ to $f_n$ may always be received in the best receiving conditions even when transmitting frequencies of the transmitters 13 are varied because of temperature changes and the like.

The receiver 32 transmits the signals $f_1$ to fn having frequencies identical to or most close to the tuned signals to the signal analyzing portion 33. Therefore, signal processing can be implemented normally in the signal analyzing portion 33.

The signal analyzing portion 33 controls the drive controllers 17 provided in respective polishing apparatuses $m_1$ to $m_n$ based on the signals $f_1$ to $f_n$ treated in a time division scheme so as to drive/suspend the surface plate, control the pressure, adjust the number of rotation of the surface plate, or drive/suspend the dresser.

Tuning is carried out in sequence in the order of magnitude of frequency and is repeated many times.

With the above procedures, a plurality of the polishing apparatuses can be managed effectively and optimally.

(Eighth Embodiment)

Figure 17:
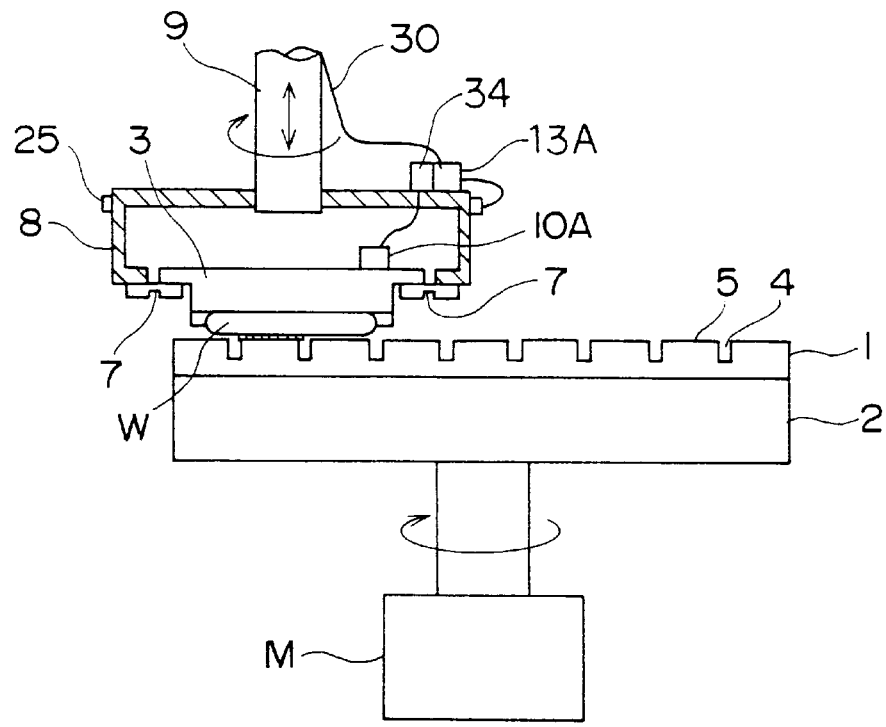
FIG. 17 is a side view showing a polishing apparatus according to an eighth embodiment of the present invention.
Figure 18:
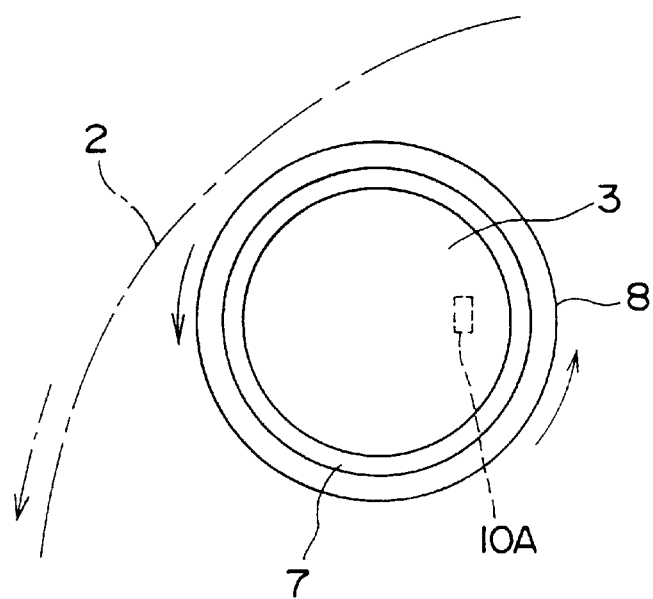
FIG. 18 is a bottom view showing an upper surface plate in the polishing apparatus according to the eighth embodiment of the present invention.

In the eighth embodiment, a polishing apparatus will be explained which controls polishing based on vibration in the circumferential direction (rotational direction) of the polished surface. FIG. 17 is a side view showing the polishing apparatus according to the eighth embodiment of the present invention. FIG. 18 is a bottom view showing the upper surface plate in the polishing apparatus according to the eighth embodiment. Like reference symbols in FIG. 17 designate identical or corresponding parts in FIGS. 1 and 15, and parts not illustrated in FIG. 17 have the same structures as any of those in FIGS. 1 and 15.

In the eighth embodiment, material of the elastic substance 7 for connecting the air-back type enclosure 8 to the upper surface plate 3 is not restricted particularly, but mechanical strength of the elastic substance 7 can be increased if rubber sheets having a multilayered structure in which a cloth is superposed therein or a plurality of stacked rubber sheets is used.

The vibration detecting device 10A is attached on the upper surface plate 3, and is directed so as to detect minute vibration in the circumferential direction of the upper surface plate 3, as shown in FIG. 18. The vibration detecting device 10A is so constructed that it can select the direction of vibration to be detected by changing its direction. The vibration detecting devices 10 in the above first to seventh embodiments have been directed to detect vertical vibration.

The vibration detecting device 10A is connected to a transmitter 13A on the enclosure 8 via a signal line. A signal output terminal of the transmitter 13A is connected to an annular transmitting antenna 25 formed on an outer circumferential surface of the enclosure 8. A power supply terminal of the transmitter 13A is connected to an annular conductor 28 shown in FIG. 15. A mechanism for receiving a radio signal output from the annular transmitting antenna 25 is formed so as to include the annular receiving antenna 26 shown in FIG. 15.

In FIG. 17, a reference numeral 34 denotes an integrated circuit including a first amplifier 34a, a filter 34b, and a second amplifier 34c, which will be described later.

Figure 19:
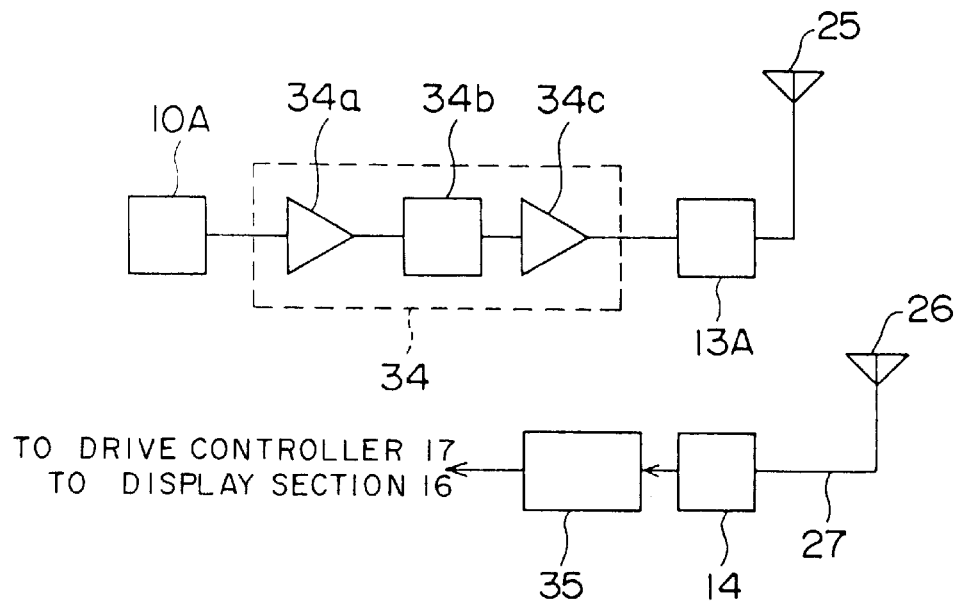
FIG. 19 is a block diagram showing a signal system in the polishing apparatus according to the eighth embodiment of the present invention.

FIG. 19 shows circuit configurations of a transmission system and a reception system in the polishing apparatus according to the eighth embodiment.

The vibration detecting device 10A is connected to the transmitter 13A via the first amplifier 34a, the filter 34b, and the second amplifier 34c by a wire. Such vibration detecting device 10A is used that its sensitivity is equivalent to 50 mV/G (about 50 μV/Gal) or more and its noise level is equivalent to 1 mG (about 1 Gal) or less. If an acceleration sensor is used as the vibration detecting device 10A, either its resonance frequency is more than 20 kHz or the sensor vibrates in resonance with the frequency at which vibration intensity is changed with the progress of polishing.

The first amplifier 34a has an amplification factor of 500, the filter 34b is a bandpass filter over 10 Hz to 30 kHz, and the second amplifier 34c has an amplification factor of 1/50. An FM transmitter is used as the transmitter 13A, for instance.

Figure 20:
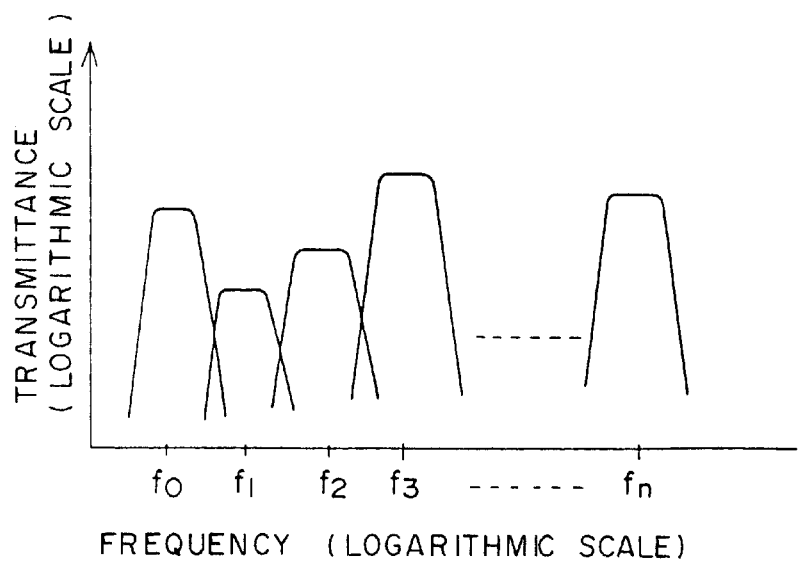
FIG. 20 is a chart illustrating an example of relationship between passing frequency and signal transmittance of plural bandpass filters applied to the polishing apparatus according to the eighth embodiment of the present invention.

Operational amplifiers on the market may be utilized as the first amplifier 34a and the second amplifier 34c. The filter 34b may be formed by employing in combination a plurality of bandpass filter like graphic equalizers with different center frequencies so as to respond immediately to change in vibration mode because of change in polishing conditions, exchange of the polishing object, or reconstruction of the polishing apparatus, otherwise the filter 34b may be formed by employing a programmable bandpass filter so as to modify its transmittance in respective vibration frequency bandwidths. An example of a filter characteristic obtained by graphic equalizers is shown in FIG. 20. It is preferable that the bandpass filters having attenuation rate of more than 34 dB/oct and bandwidths which are equivalent to their center frequencies or less or are about 1 kHz are used.

Meanwhile, in the reception system, the receiver 14 connected to the receiving antenna 26 comprises a processing portion 35 having the signal analyzing portion 15, and the drive controller 17, shown in FIG. 1. The processing portion 35 comprises an FFT analyzer, a CPU board, or a so-called personal computer. The processing portion 35 is composed to receive spectrum of vibration frequency from about 10 Hz to about 30 kHz.

Although the configuration for measuring proper polishing vibration has been explained in the above, other vibrations caused by the motor for rotating the lower surface plate 2 and the upper surface plate 3, for example, are input in actual into the vibration detecting device 10A. Therefore, it is preferable that the polishing apparatus is constructed so as to achieve that vibration of the upper surface plate 3 caused by vibration of the polishing apparatus itself is less than 50 mG (about 50 Gal). As a method of determining whether or not vibration is less than 50 mG, polishing vibrations which influence the upper surface plate 3 may be measured if a flat wafer is used as the polishing object W.

Next, end-point detection of polishing will be explained by employing the above polishing apparatus.

First, polishing of the polishing object W is commenced by rotating the lower surface plate 2 and the upper surface plate 3 and pushing the polishing object W being stuck to a lower surface of the lower surface plate 2 to the abrasive cloth 1. As explained in the first embodiment, the abrasive cloth 1 includes the lattice-like grooves 4 and the vibration portions 5.

Figure 21:
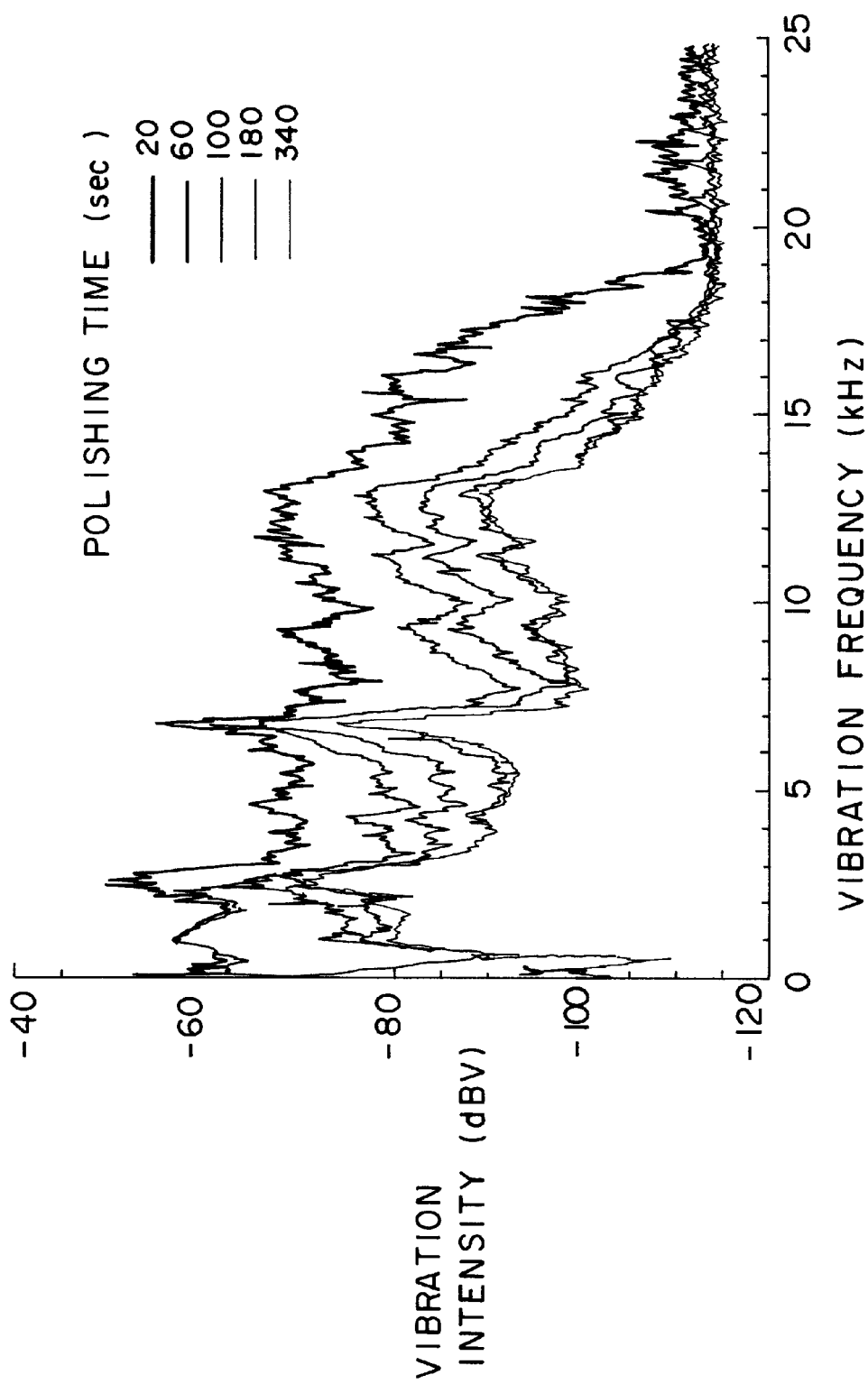
FIG. 21 is a graph illustrative of spectra showing relations between vibration frequency and vibration intensity detected by a vibration detecting device in the polishing apparatus according to the eighth embodiment of the present invention.

It has been investigated how a relation between vibration frequency of 0 to 25 kHz in the circumferential direction of the upper surface plate 3 and vibration intensity is varied with respect to polishing time. As a result, the result shown in FIG. 21 has been derived. It can been seen that vibration intensity is reduced over all vibration frequency bandwidths with the progress of polishing.

Then, a vibration signal detected by the vibration detecting device 10A is input into the processing portion 35 via the transmitter 13A and the receiver 14. The processing portion 35 compares the vibration signal in measuring with reference spectrum as a reference value, and determines that polishing is ended when a ratio of the integral value of vibration intensity in a particular frequency bandwidth against the integral value of reference spectrum is decreased below a predetermined threshold value or when an amount of time variation in the integral value of vibration intensity in a particular frequency bandwidth is reduced below a predetermined threshold value.

Performance of the radio transmitter 13A is largely affected by detection precision of vibration signal. The characteristics required for the first amplifier 34a, the second amplifier 34c and the filter 34b and transmitted vibration signals are determined by carrying out the following procedures.

First, vibration intensity of the upper surface plate 3 is measured by wire. Subsequently, an amplification factor of the first amplifier 34a is decided such that voltage obtained by amplifying the vibration intensity signal does not exceeds an allowable input voltage of the filter 34b. In addition, an amplification factor of the second amplifier 34c is decided such that voltage obtained by amplifying the vibration intensity signal passed through the filter 34b does not exceeds an allowable input voltage of the transmitter 13A.

In turn, a transmittance frequency bandwidth of the filter 34b in the vibration intensity frequency is decided. First, vibration frequency is transmitted by radio while carrying out polishing actually, and vibration frequency not to change vibration intensity is examined even when polishing advances. The transmittance frequency bandwidth not to transmit the vibration frequency is thus determined. Vibration components to which vibration intensity does not change even when polishing proceeds are vibration noises caused by the polishing apparatus itself.

Degradation of the abrasive cloth 1 and density change of the polishing liquid can be known by comparing a profile of spectrum measured beforehand with that of actual spectrum. In case these information are not needed and only end-point of polishing is to be detected, the vibration intensity signal in a particular frequency range may be converted into a DC signal corresponding to the root-mean-square value in the preceding stage of the transmitter 13A and then the DC signal may be transmitted from the transmitter 13A to the receiver 14.

In order to expand the amplitude range upon transmitting the vibration signal by radio, it would be understood that the vibration signal may be amplified by the logarithmic amplifier to be transmitted from the transmitter 13A by radio, then radio signal may be received by the receiver 14, and then the received signal may be restored into the original signal by the inverse logarithmic amplifier.

Figure 15B:
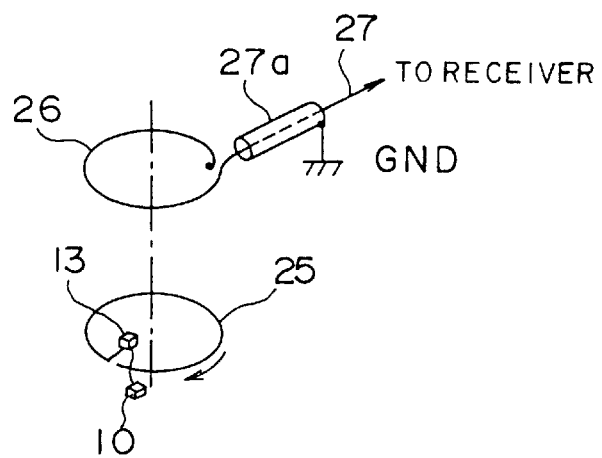
FIG. 15B is a perspective view showing an arrangement relation between a transmitting antenna and a receiving antenna in the polishing apparatus according to the sixth embodiment of the present invention.

Although in the eighth embodiment power is supplied to the oscillator 13A by virtue of the annular conductor 28, as shown in FIG. 15, but the battery may be used. Furthermore, the transmitter 13A may transmit the signal to the receiver 14 by means of an annular signal conductor having the same structure as that of the annular conductor for power supply by wire in place of radio. In addition, although the transmitter 13A is attached to the outside of the enclosure 8, it may be attached to the inner side of the cavity in the enclosure 8 like the vibration detecting device 10.

One upper surface plate 3 has been arranged on one lower surface plate 2 in FIG. 17. But, in the event that a polishing apparatus is employed wherein a plurality of upper surface plates may be displaced on one lower surface plate 2 or plural sets of the lower surface plates 2 and the upper surface plates 3 are provided, proceeding and end of polishing are respectively controlled independently by providing the above structure to every head.

The amplifiers and the filters explained in the eighth embodiment may be applied to the polishing apparatus discussed in the first to seventh embodiments.

(Ninth Embodiment)

Though the case where one vibration detecting device 10A is attached has been explained in the eighth embodiment, a rotation balance of the upper surface plate 3 can be improved to thus stabilize vibration of the upper surface plate 3 in rotating if a weight having the same weight as that of the vibration detecting device 10A or a second vibration detecting device is attached on the upper surface plate 3 in symmetrical to the vibration detecting device 10A.

Figure 22A:
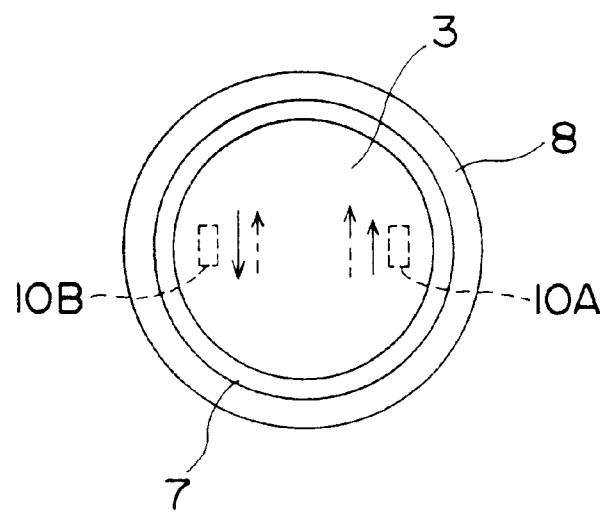
FIG. 22A is a side view showing a polishing apparatus according to a ninth embodiment of the present invention.
Figure 22B:
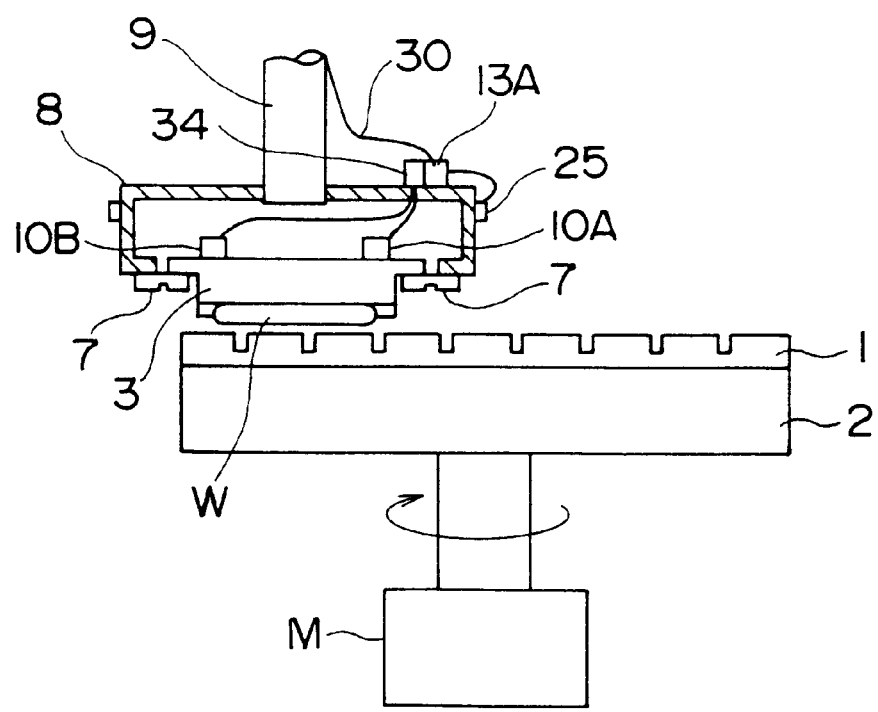
FIG. 22B is a bottom view showing an upper surface plate in the polishing apparatus according to the ninth embodiment of the present invention.

FIG. 22 shows a polishing apparatus to which the second vibration detecting device is attached. In this configuration, vibration noise caused by two vibration detecting devices 10A, 10B can be reduced by employing a circuit configuration discussed hereinbelow.

The vibration noise is caused due to a vibration component in the direction perpendicular to the measuring direction. In general, the vibration detecting devices 10A, 10B has a sensitivity of several % to the vibration component in the direction perpendicular to the measuring direction. In the ninth embodiment, the vibration component in the perpendicular direction is vibration in the vertical direction.

Figure 23A:
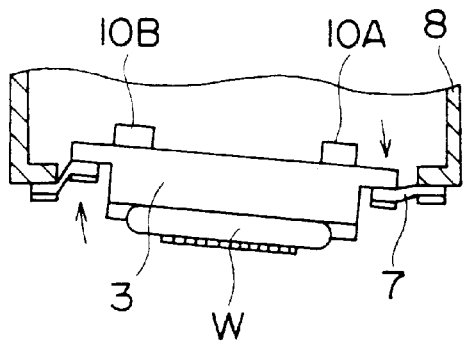
FIGS. 23A and 23B are side views showing a first example of vertical vibration of the upper surface plate in the polishing apparatus according to the ninth embodiment of the present invention.
Figure 23B:
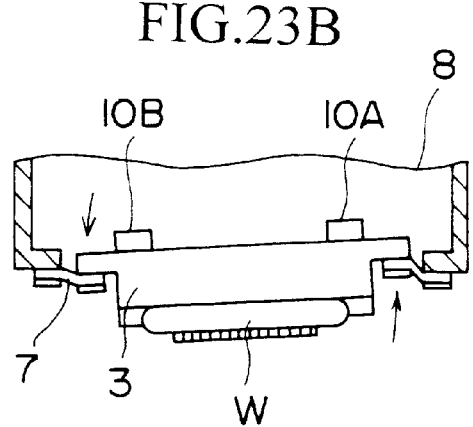
Figure 24A:
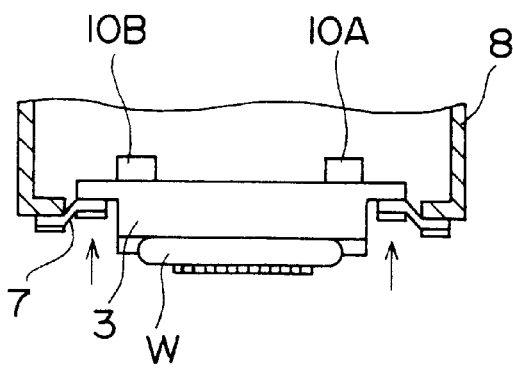
FIGS. 24A and 24B are side views showing a second example of vertical vibration of the upper surface plate in the polishing apparatus according to the ninth embodiment of the present invention.
Figure 24B:
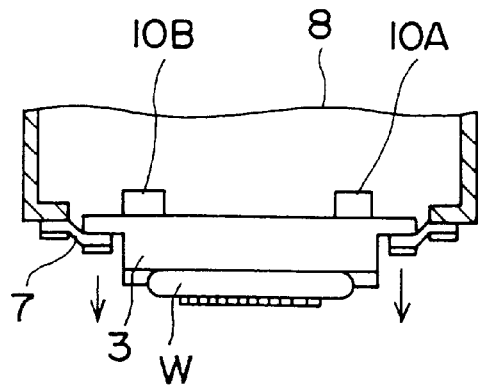

In FIG. 22, there are two cases where two vertical vibration noises being input respectively into two vibration detecting devices 10A, 10B are in the opposite directions, as shown in FIGS. 23A and 23B, and they are in the same directions, as shown in FIGS. 24A and 24B.

In case vertical vibration noises are caused in the opposite direction as shown in FIG. 23, an adder 36 is connected to output terminals of the first amplifiers 34d, 34e being connected to output terminals of the vibration detecting devices 10A, 10B, and thus output terminals of the adder 36 is connected to the filter 34b. In this event, as indicated by an arrow of a solid line in FIG. 22A, two vibration detecting devices 10A, 10B are respectively arranged so as to detect rotational vibration of the upper surface plate 3 in the same circumferential direction.

By arranging two vibration detecting devices 10A, 10B and inserting the adder 36 into the output side of the first amplifiers 34d, 34e, vertical vibration noise can be canceled or reduced. In addition, since vibration intensity in the circumferential direction which being input into the filter 34b is increased two times, an S/N ratio can be improved.

Figure 25A:
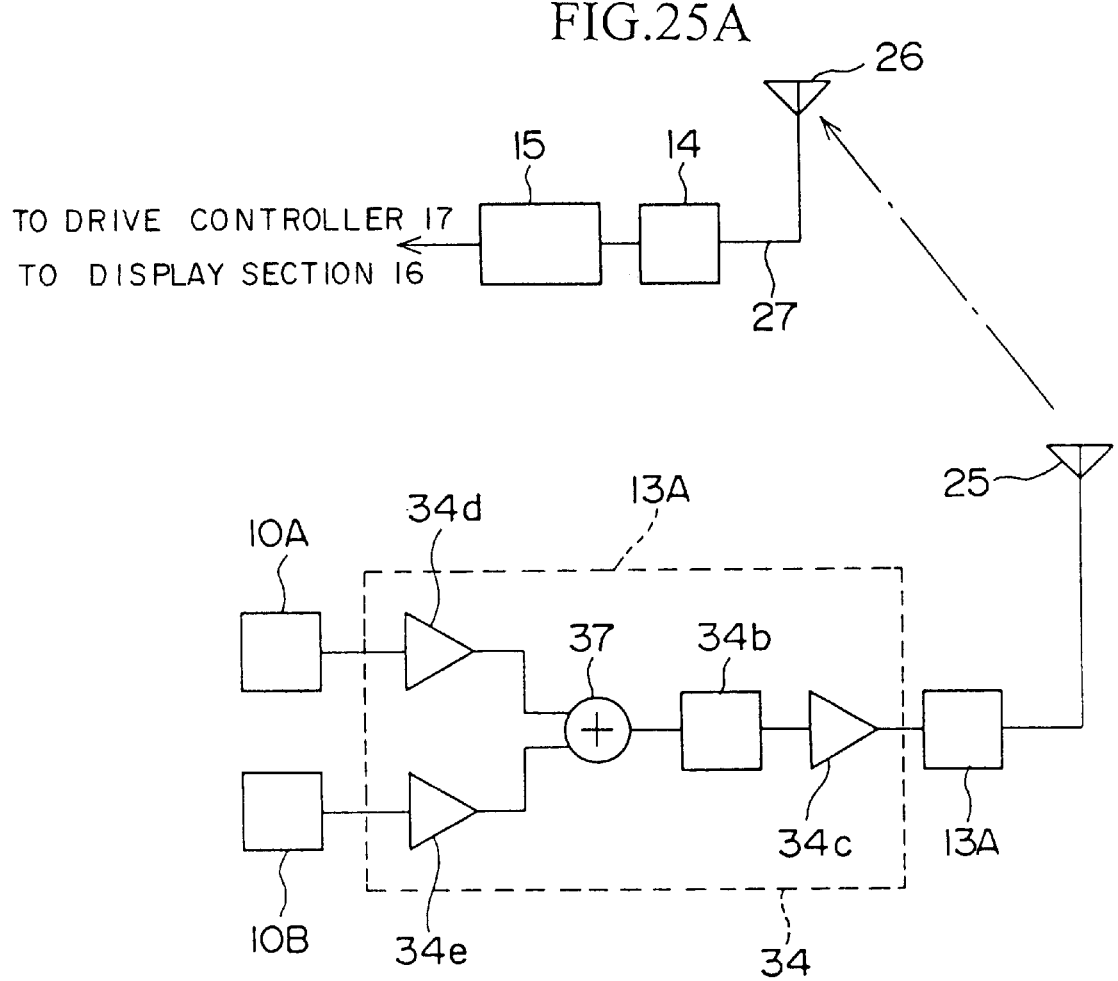
FIGS. 25A and 25B are block diagrams showing respectively examples of the signal system applied to the polishing apparatus according to the ninth embodiment of the present invention.
Figure 25B:
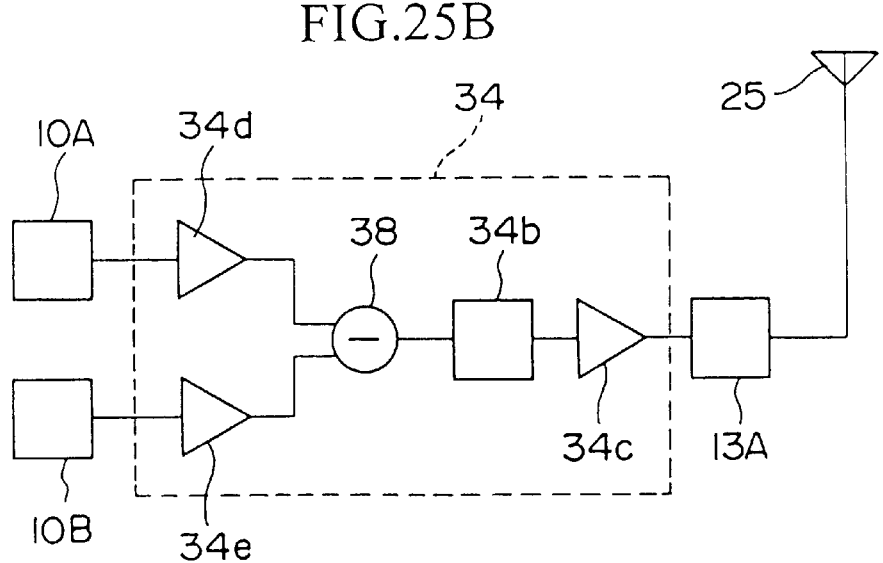

On the other hand, if vertical vibration noises are generated as shown in FIGS. 24A and 24B, a subtractor 38 is connected to output terminals of the first amplifiers 34d, 34e being connected to output terminals of the vibration detecting devices 10A, 10B, as shown in FIG. 25B, and thus output terminals of the subtractor 38 is connected to the filter 34b. In this event, as indicated by an arrow of a broken line in FIG. 22A, two vibration detecting devices 10A, 10B are respectively arranged so as to detect rotational vibration of the upper surface plate 3 in the opposite circumferential direction.

By arranging two vibration detecting devices 10A, 10B and inserting the subtractor 38 into the output side of the first amplifiers 24d, 24e, vibration noise can be reduced by adding opposite vibration noises. In addition, since absolute values of vibration intensity in the circumferential direction which being input into the filter 34b is increased two times by the subtractor 38, an S/N ratio can also be improved.

Depending on the polishing apparatus and the polishing conditions, it can be decided that vertical vibration shown in FIGS. 23A and 23B or vertical vibration shown in FIGS. 24A and 24B is set up in the upper surface plate 3. Therefore, it must be examined beforehand that the upper surface plate 3 takes either of vertical vibrations. Vertical vibrations of this kind may be selected by changing the direction of arrangement of two vibration detecting devices 10A, 10B or by selecting the adder or the subtractor to reduce noises mostly.

In the ninth embodiment, vibration component in the circumferential direction is selected as the detection object and vertical vibration component is neglected. But if vertical vibration component is selected as the detection object, vibration component in the circumferential direction is neglected. In this case, it is necessary to modify directions of two vibration detecting devices 10A, 10B.

(Tenth Embodiment)

Figure 26A:
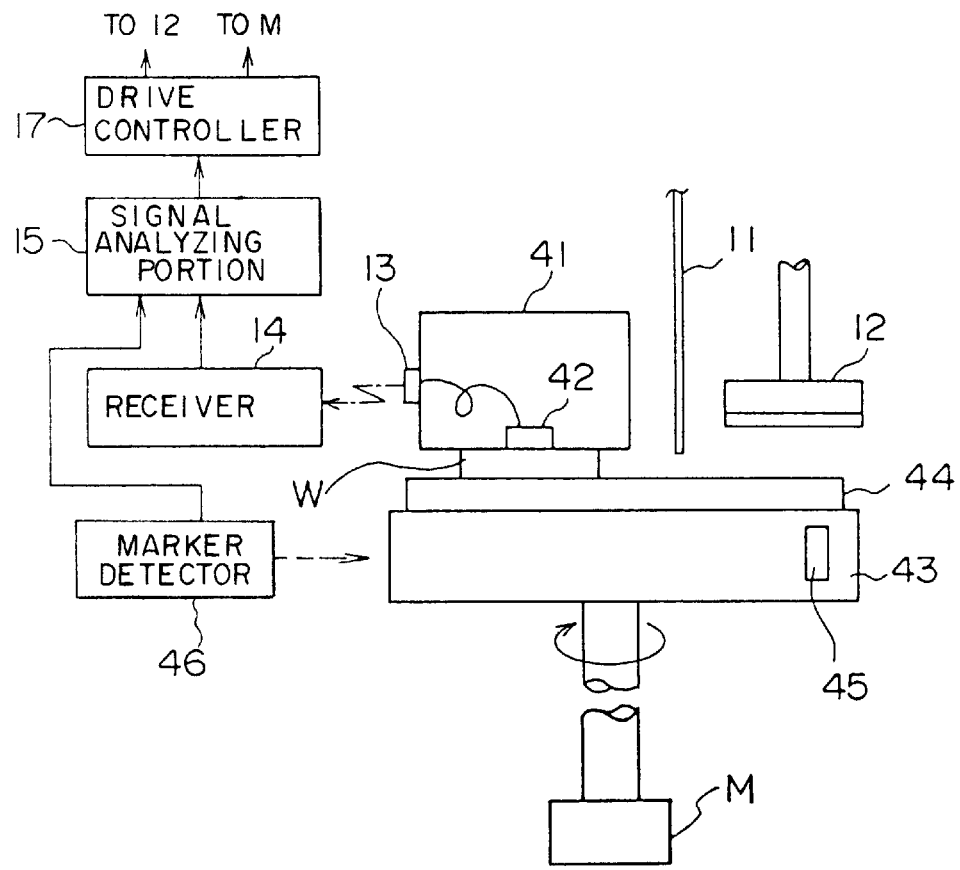
FIGS. 26A and 26B are respectively a side view and a plan view showing a polishing apparatus according to a tenth embodiment of the present invention.
Figure 26B:
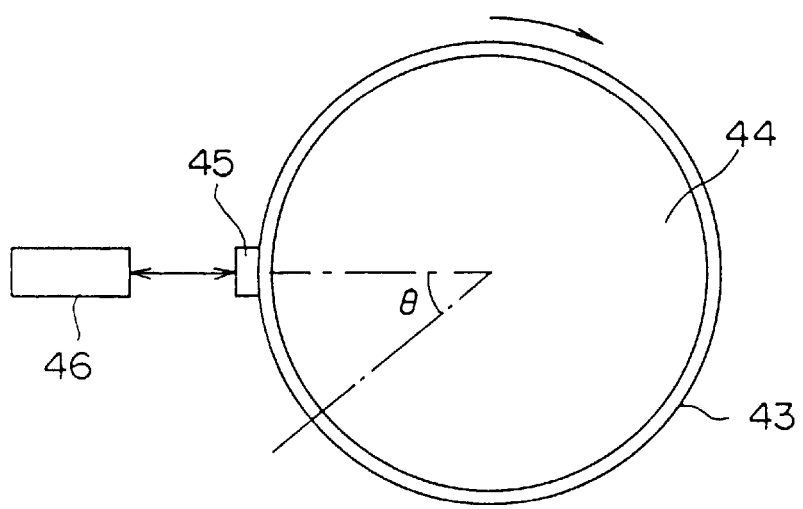

FIG. 26A is a side view showing a polishing apparatus according to a tenth embodiment of the present invention. The tenth embodiment may prevent the polished surface from being scratched by the dust in polishing, and facilitate removing of the dust. As the dust to scratch the polished surface, there are dried and stiffened silicon oxide included in the polishing liquid, fragment of the polishing object, etc.

In FIG. 26A, an acceleration detecting device (vibration detecting device) 42 is arranged on the surface of a dead-weight type upper surface plate 41. The semiconductor wafer as the polishing object W, for example, is pasted up on the lower surface of the upper surface plate 41, which is mounted on an abrasive cloth 44 stuck to a lower surface plate 43.

A marker 45 having a large light reflection factor is fixed to the side surface of the lower surface plate 43. A marker position detector 46 is positioned on the side of the lower surface plate 43 to detect whether or not the marker 45 is positioned at a predetermined location. The marker position detector 46 comprises a light emitting device and a light receiving device and a quantity of received light is increased if it receives a reflected light from the marker 45, and therefore it may detect the existence of the marker 45.

A signal from the acceleration sensor 42 on the upper surface plate 41 is input into the signal analyzing portion 15 via the transmitter 13 and the receiver 14 shown in the first embodiment.

In the above polishing apparatus, the lower surface plate 43 is not rotated but the polishing object W is rotated by the abrasive cloth 44. In this case, the polishing object W is shifted in the fixed direction by an arm not shown. Vibration information of the upper surface plate 41 detected by the acceleration sensor 42 is input into the signal analyzing portion 15 at least a time or continuously via the transmitter 13 and the receiver 14 shown in the first embodiment every time when the marker 45 is rotated.

Figure 27A:
FIGS. 27A and 27B are graphs illustrating respectively a relation between vibration frequency and vibration intensity according to the tenth embodiment of the present invention.
Figure 27B:
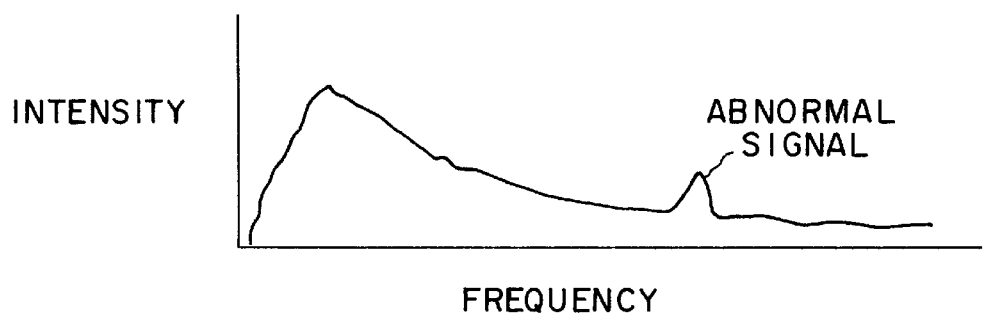

In case polishing is implemented properly, a spectrum between vibration frequency and vibration intensity in FIG. 27A can be derived. Conversely, in case the polished surface of the polishing object W is scratched by the dust on the abrasive cloth 44, vibration intensity is increased in part of the frequency bandwidth, as shown in FIG. 27B. An increased spectrum serving as the decision criterion may be examined previously, otherwise spectrum before scratching may be used as the decision criterion.

If the dust is detected on the polished surface because of change in vibration intensity, the drive controller 17 may carried out such control that it lets the nozzle 11 supply the water to the abrasive cloth 44 and also lets the dresser 12 drive to thus remove the dust on the surface of the abrasive cloth 44 to the outside of the lower surface plate 43, and then restarts polishing.

Figure 28:
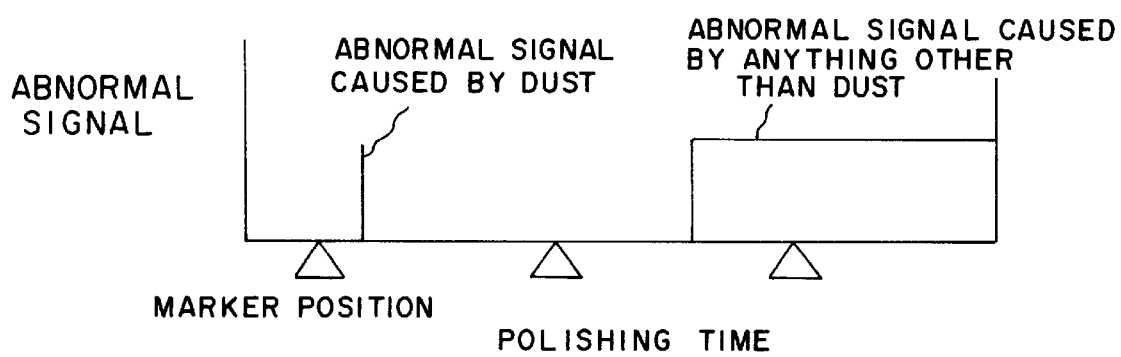
FIG. 28 is a view illustrating spectrum showing abnormal signal caused by dust and abnormal signal caused by anything other than dust in the polishing apparatus according to the tenth embodiment of the present invention.

If a location of the dust is to be identified, the following process will be accomplished. When vibration information of the upper surface plate 41 is input continuously to the signal analyzing portion 15 in polishing, it can be found when the marker 43 is detected by the marker detector 46. Hence, if the period of the marker 43 is recorded on the time axis as a marker location and in addition the abnormal signal is recorded, a characteristic as shown in FIG. 28 can be achieved, for example. Since the marker location appears periodically, generation time of the abnormal signal is recorded on the time axis if the scratch is formed by the dust on the polished surface. From the rate of the time interval between the marker locations to the time elapsed from the marker location to the generation of the abnormal signal, an angle θ indicating location of the dust can be detected readily relative to the line connecting the center of the abrasive cloth 44 with the marker 44.

Hence, the signal analyzing portion 15 outputs the drive signal to the drive controller 17 so as to make the dresser 12 drive. As a result, the surface of the abrasive cloth 44 is swept by the dresser 12 at least along a normal line of the angle θ to remove the dust in a short time.

If the abnormal signal is generated on the same location again and again after sweep is carried out by the dresser 12, or if the abnormal signal is generated on the same location after the polishing object W is exchanged, polishing must be stopped immediately and the abnormal signal is generated to inform the operator of an anomalous state. The operator can then eliminate causes of the abnormal signal. As a result, since next polishing of the polishing object W can be commenced in a normal state, the number of wasted polished object W, e.g., semiconductor wafer can be reduced to thus improve polishing efficiency.

As shown in FIG. 28, if the abnormal signal is halted within one period of the marker, it would be understood that the abnormal signal is generated by the dust. However, if the abnormal signal is continued over more then one periods of the marker, there is a strong possibility that the abnormal signal is generated by the cause other than the dust. In this event, it is requested that the signal analyzing portion 15 issues a stop instruction to stop polishing operation completely and also the abnormal signal sound is generated to inform the operator of the anomalous condition in addition to the stop instruction.

(Eleventh Embodiment)

An apparatus wherein an S/N ratio of the output of the vibration detecting device and an S/N ratio of the vibration input into the vibration detecting device can be improved will be explained with reference to FIGS. 29 to 35 in the eleventh embodiment. Noises in vibration input into the vibration detecting device are vibrations except for the vibration caused by friction between the polishing object W and the abrasive cloth 1 and are generated mainly by the motor. Such noise is referred to as a background noise hereinafter.

In FIGS. 29 to 35, the reason why the vibration detecting device 10 is positioned at the center on the upper surface of the upper surface plate (bottom plate of the head) 3 is that the relative velocity between the polishing object W as the vibration detected object and the abrasive cloth 1 may be stabilized to reduce detection error. A fundamental structure of the apparatus in the eleventh embodiment is similar to those in the first and seventh embodiments. Like reference symbols in the eleventh embodiment are intended to designate the same parts in those embodiments.

Figure 29:
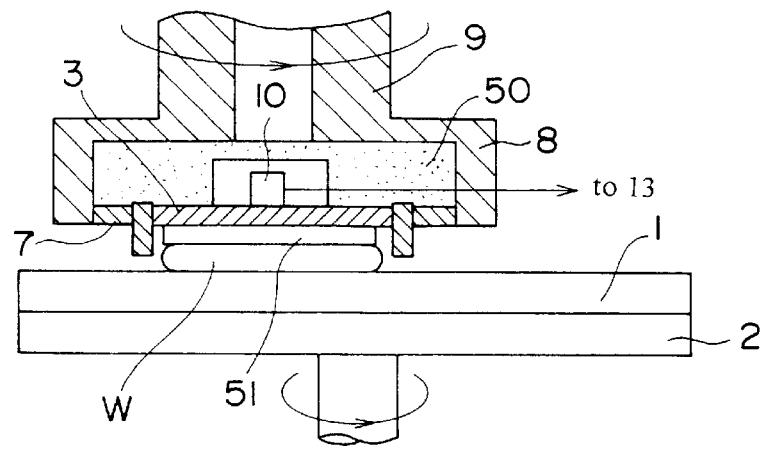
FIG. 29 is a side view, partially in section, showing an example wherein a noise absorbing material is provided in a head in a polishing apparatus according to an eleventh embodiment of the present invention.

In FIG. 29, a structure is adopted wherein the vibration detecting device 10 is surrounded by a sound-proof/sound absorbing material 50 through a clearance in the cavity in the enclosure 8 of the head. The sound-proof/sound absorbing material 50 is formed of an elastic substance such as a bellows type spring, rubber, etc. or porous resin which enables free vibration of the upper surface plate 3.

According to the above structure, a background noise propagated in a space in the enclosure 8 can be prevented and absorbed and therefore an S/N ratio input into the vibration detecting device 10 can be improved. Moreover, since the clearance is formed between the vibration detecting device 10 and the sound-proof/sound absorbing material 50, no new noise due to friction between the vibration detecting device 10 and the sound-proof/sound absorbing material 50 is generated.

When the proper vibration frequency of the upper surface plate 3 is set not to coincide with vibration frequency of the background noise, the S/N ratio can be further improved.

In FIG. 29, a reference 51 denotes an inner sheet which is interposed between the upper surface plate 3 and the polishing object W to absorb variation in thickness of the polishing object W.

Figure 30:
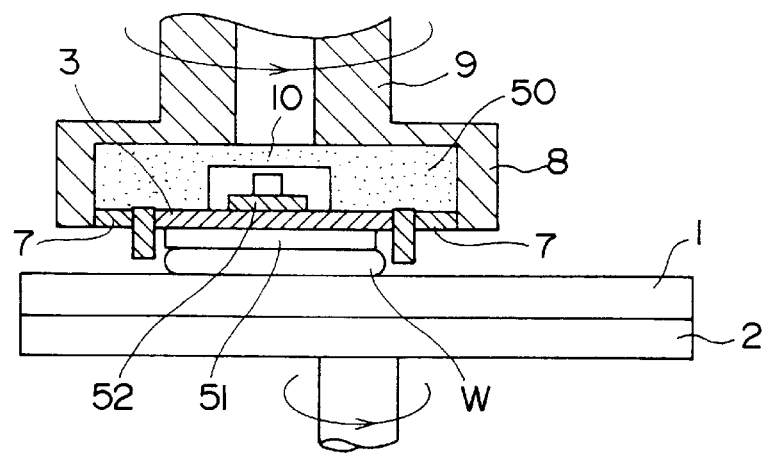
FIG. 30 is a side view, partially in section, showing an example wherein a vibrator is attached to a bottom of a vibration detecting device in the polishing apparatus according to the eleventh embodiment of the present invention.

FIG. 30 shows an apparatus wherein a resonance plate 52 is interposed between the vibration detecting device 10 and the upper surface plate 3 shown in FIG. 29. The resonance plate 52 vibrates in resonance with a particular frequency to be measured, and is formed of a spring coil, for example.

According to the apparatus, a background noise having a frequency being different from that of a resonance frequency of the resonance plate 52 is shielded by the resonance plate 52 and prevented from being input into the vibration detecting device 10. Therefore, the S/N ratio of input into the vibration detecting device 10 can be improved.

Figure 31:
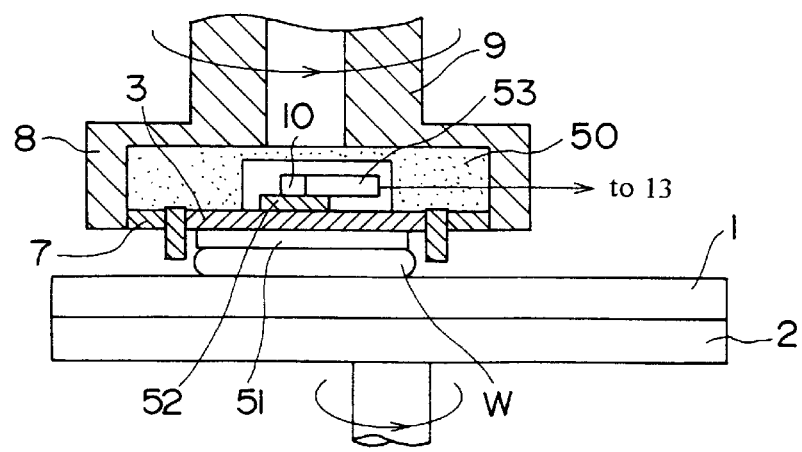
FIG. 31 is a side view, partially in section, showing an example wherein the vibrator is attached to the bottom of the vibration detecting device in the polishing apparatus according to the eleventh embodiment of the present invention.

FIG. 31 shows an apparatus wherein an amplifier 53 is provided on the side of the resonator 10 shown in FIG. 30.

In case an impedance of the vibration detecting device 10 per se is high, the noise is ready to input the output signal of the vibration detecting device 10 if the connection wiring between the amplifier 53 and the vibration detecting device 10 is long. However, the connection wiring is lessened by providing both the resonance 10 and the amplifier 53 on the upper surface plate 3, so that the noise being mixed into the vibration signal can be reduced significantly. As a result, the S/N ratio can also be improved.

Figure 32:
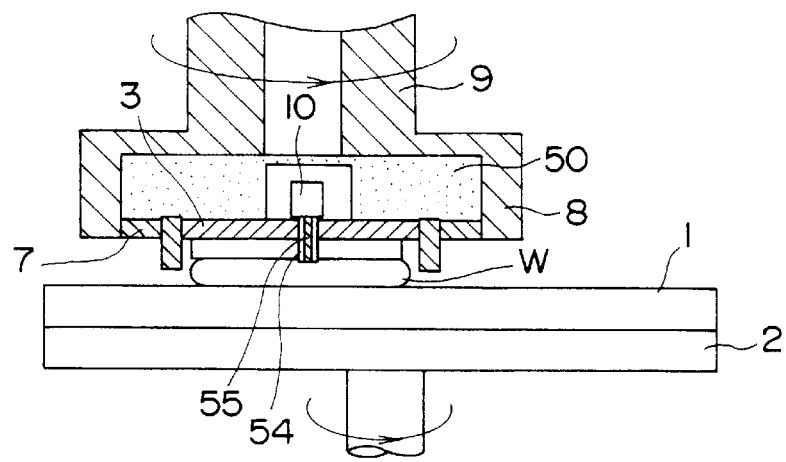
FIG. 32 is a side view, partially in section, showing an example wherein a vibration transmitting needle is interposed between the vibration detecting device and the detected object in the polishing apparatus according to the eleventh embodiment of the present invention.

In the head of the polishing apparatus shown in FIG. 32, a through hole 54 is formed in both the upper surface plate 3 and the inner sheet 51, and a vibration transmitting needle 55 contacting to both the vibration detecting device 10 and the polishing object W is passed through the through hole 54. Vibration caused by friction between the abrasive cloth and the detected object W is not absorbed by the inner sheet 51, but transmitted to the vibration detecting device 10 via the vibration transmitting needle 55. Therefore, vibration intensity being input into the vibration detecting device 10 is enhanced to therefore improve the S/N ratio.

Figure 33:
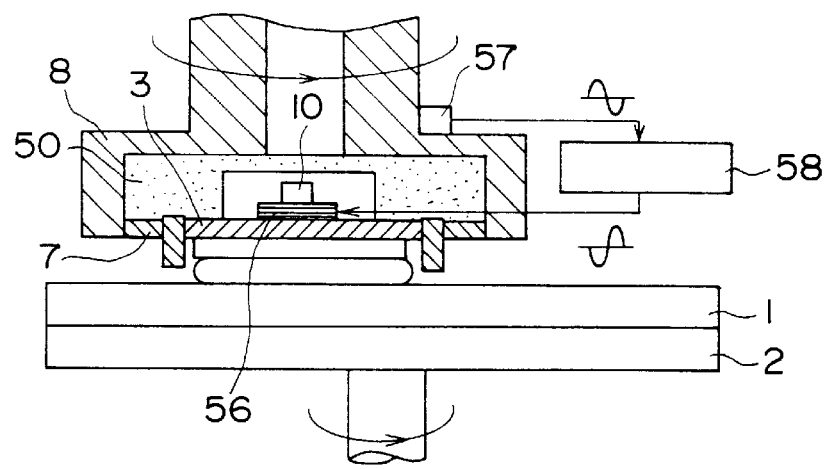
FIG. 33 is a side view, partially in section, showing an example wherein a circuit for removing noise vibration which being input into the vibration detecting device in the polishing apparatus according to the eleventh embodiment of the present invention.

FIG. 33 shows an apparatus wherein a vibration plate 56 is provided between the vibration detecting device 10 and the upper surface plate 3 shown in FIG. 29, and a second vibration detecting device 57 for measuring background noises is mounted on the enclosure 8. The background noise signal being output from the second vibration detecting device 57 is converted in opposite phase by a vibration controller 58, and then the vibration plate 56 is vibrated by the signal having the same waveform as that in opposite phase output from the vibration controller 58. The vibration plate 56 is formed of piezoelectric material such as piezo device.

According to the apparatus, vibration generated in the vibration plate 56 can cancel the background noise being input into the vibration detecting device 10. Hence, vibration caused by friction between the abrasive cloth 1 and the polishing object W can be input selectively into the vibration detecting device 10. Thus, the SIN ratio can be improved extremely.

Figure 34:
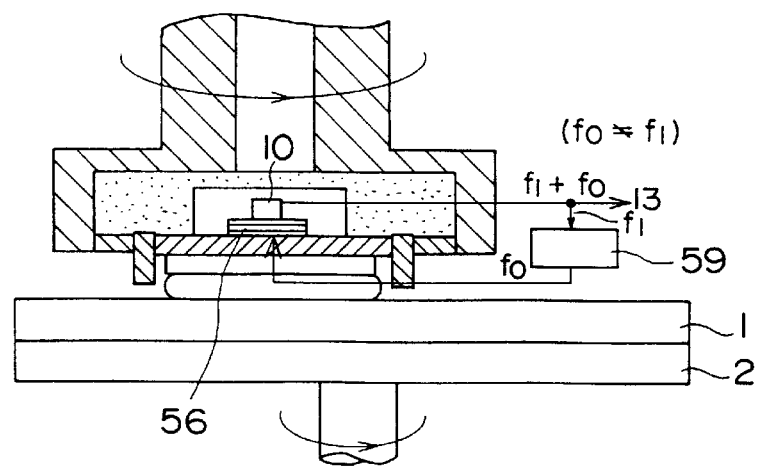
FIG. 34 is a side view, partially in section, showing an example wherein a circuit for changing vibration frequency which being input into the vibration detecting device in the polishing apparatus according to the eleventh embodiment of the present invention.

Meanwhile, the vibration detecting device 10 has the sensitivity to the resonance frequency $f_0$ of 5 to 10 times the sensitivity to other frequencies. However, there is a case where the frequency $f_1$ of vibration to be detected does not coincide with the resonance frequency $f_0$. In this case, as shown in FIG. 34, vibration in the detected frequency $f_1$ is first input into a frequency converting circuit 59 and then the vibration plate 56 is vibrated in the frequency $f_0$ at the same intensity or proportional intensity as that of the vibration frequency $f_1$ detected by the frequency converting circuit 59 so as to feed back vibration in the frequency $f_0$ to the vibration detecting device 10, so that it is feasible to detect vibration in high sensitivity. In this event, vibration in the frequency $f_0$ is processed as discussed the first or sixth embodiments.

Figure 35:
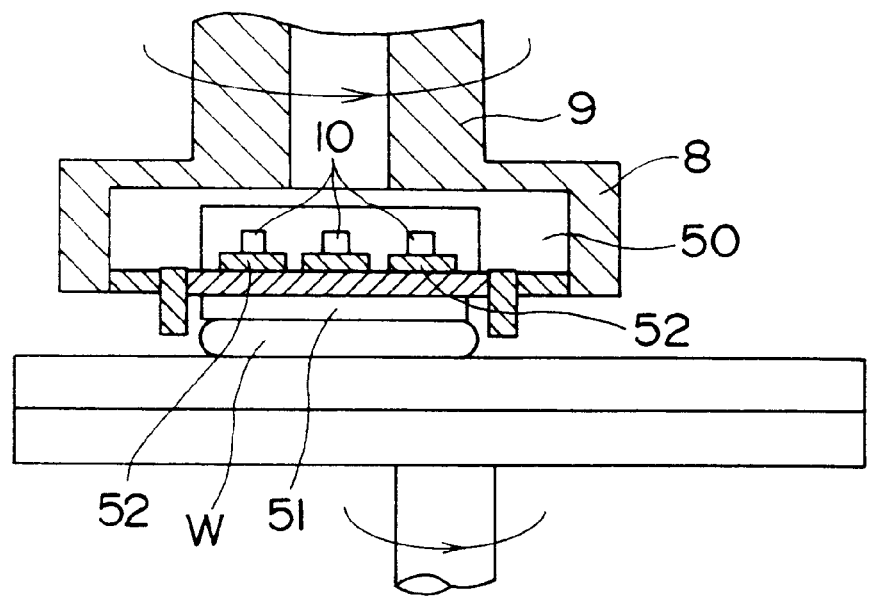
FIG. 35 is a side view, partially in section, showing an example wherein a plurality of vibration detecting devices and a plurality of vibration plates attached to respective bottoms thereof are provided in the polishing apparatus according to the eleventh embodiment of the present invention.

FIG. 35 shows an apparatus wherein a plurality of vibration detecting devices 10 shown in FIG. 29 are arranged on the upper surface plate 3 and a plurality of vibration plates 52 are interposed between the vibration detecting devices 10 and the upper surface plate 3 respectively. Respective sensitivities of the vibration detecting devices 10 are examined by applying a constant signal to respective vibration plates 52. Thereby, the vibration detecting device 10 having the highest sensitivity to vibration frequency to be detected can be selected by a selection circuit (not shown).

Variation in the characteristics of the vibration detecting devices 10 can be prevented, and another vibration detecting devices 10 can be selected by an electric circuit in place of the degraded vibration detecting devices 10. As a result, time and labor required for exchange operation of the vibration detecting devices 10 can be reduced.

As a method of improving the S/N ratio except for the above method, power supply for part or all motors in the polishing apparatus may be stopped in polishing. According to this method, the background noise can be significantly reduced. The stop time is set less than several seconds. Since the head and the lower surface plate 2 is continued to rotate by inertia for several seconds, polishing process can be continued. The time less than several seconds is sufficient to detect vibration and no trouble is caused in vibration detection. Power supply for the motor is stopped by the control signal from the drive controller 17 shown in FIG. 1.

If output from the vibration detecting devices 10 are output to the outside via the amplifier and the filter shown in the eighth embodiment, otherwise output to the outside after A/D conversion, noises generated in a signal transmission system can be reduced. In case A/D converted signal is transmitted by radio, an A/D converter (not shown) is provided between the oscillator 13A and the vibration detecting device 10A shown in FIG. 17.

Furthermore, if the head is being swung, the background noise due to the swing motion is enhanced at the location where the direction of the head is varied. For this reason, vibration detection should be avoided there.

Figure 36:
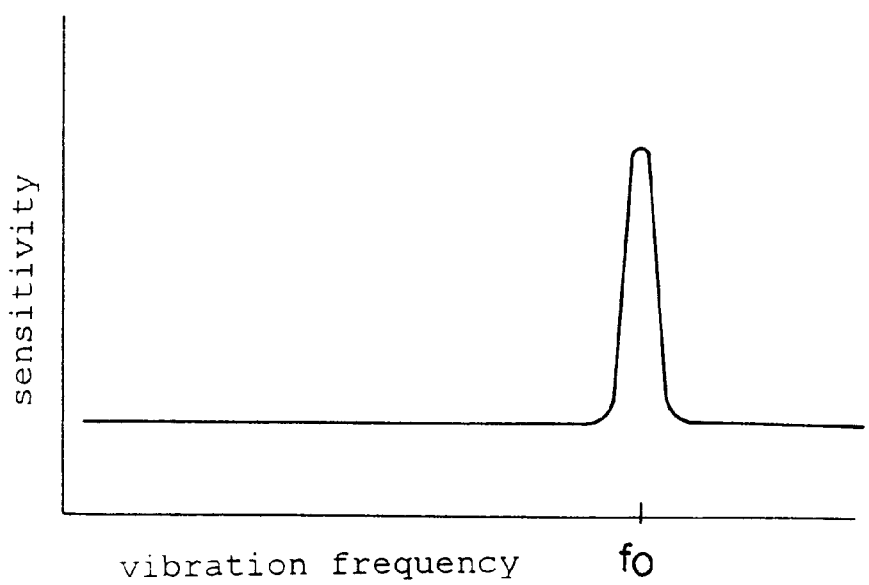
FIG. 36 is a characteristic view illustrating a relation between vibration frequency and sensitivity of the vibration detecting device applied to the polishing apparatus according to the eleventh embodiment of the present invention.

As an example of respective vibration detecting devices, there are piezoelectric device acceleration sensors of the types $CE507M_101$, CE507M301 manufactured by Vibro/meter Corp. in the U.S., and if these sensors are used, as shown in FIG. 36, it is desired that vibration intensity is detected in the resonance frequency to achieve a high sensitivity. This can be applied to the above respective embodiments.

Figure 37:
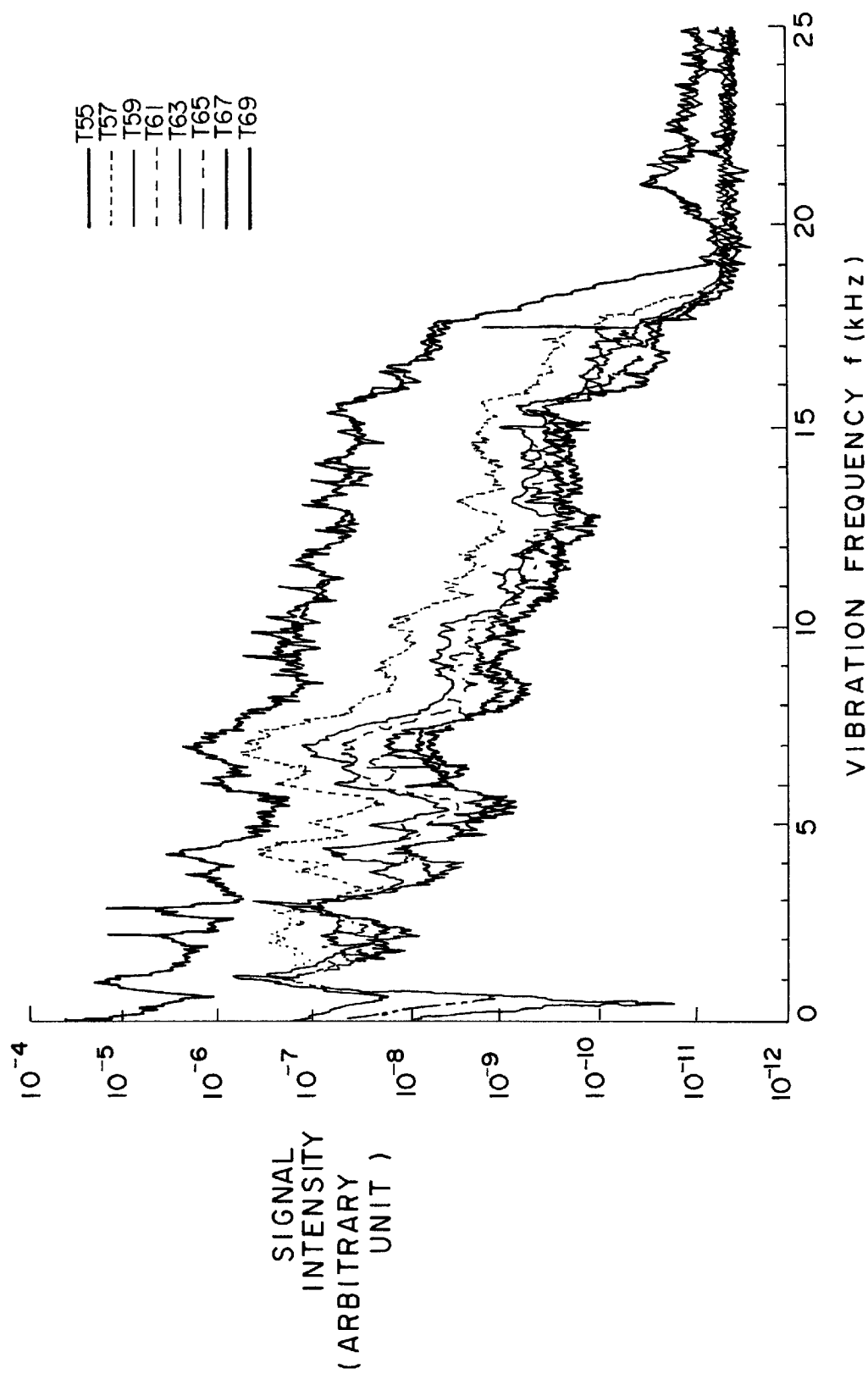
FIG. 37 is a graph illustrative of spectra showing relations between vibration frequency of proper polishing vibration and vibration intensity detected in the polishing apparatus according to the eleventh embodiment of the present invention.
Figure 38:
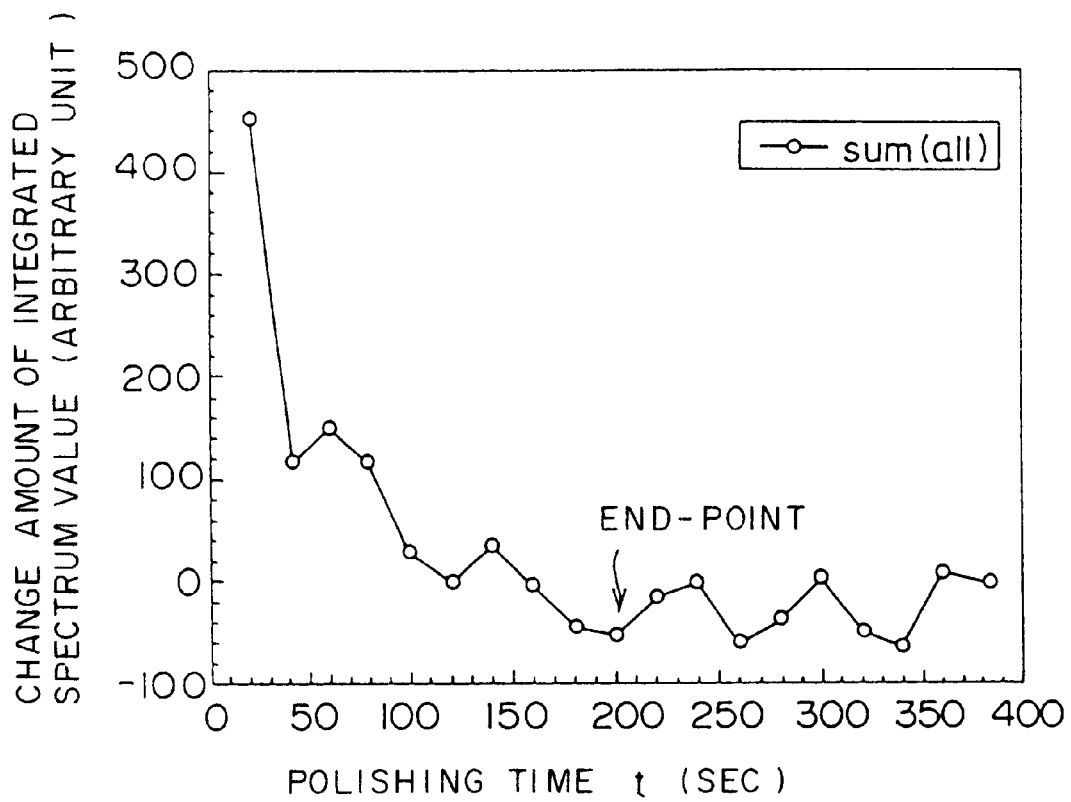
FIG. 38 is a characteristic view illustrating change amount of integrated spectrum value of proper polishing vibration relative to a polishing time in the polishing apparatus according to the eleventh embodiment of the present invention.

Next, measurement results will be shown in FIGS. 37 and 38.

FIG. 37 shows an example illustrating how frequency spectrum of vibration is changed as polishing time advances. According to this result, it can be found that vibration intensity is reduced with the progress of polishing time.

FIG. 38 illustrates that, after spectrum is integrated over a particular frequency range in the spectrum in FIG. 37, a change amount of integrated spectrum value in proper polishing vibration relative to a polishing time in the polishing apparatus. According to this result, it will be understood that a change amount of integral spectrum value is reduced with the progress of polishing time, which result in planalization of the polished surface by virtue of polishing.

An end-point of polishing is detected when there is caused no change in the integral value. This method of judging the end-point of polishing is true for the above embodiments.

In addition, if a structure is adopted wherein the upper surface plate 3 has a first proper vibration frequency identical to vibration frequency to be detected by the vibration detecting device 10 and at least one of motors M for driving the shaft driving portion 21 to drive the upper surface plate 3 and the lower surface plate 2 has a second proper vibration frequency different from the first proper vibration frequency, the background noise being input into the vibration detecting device 10 can be reduced.

(Twelfth Embodiment)

Figure 39A:
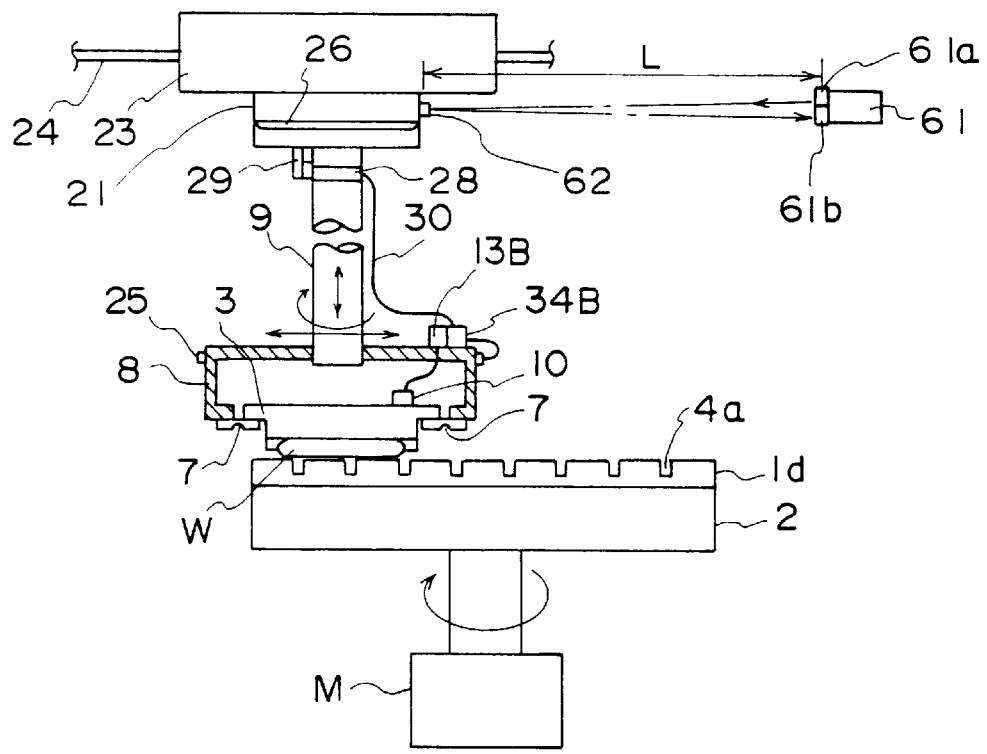
FIG. 39A is a side view showing a polishing apparatus according to a twelfth embodiment of the present invention.
Figure 39B:
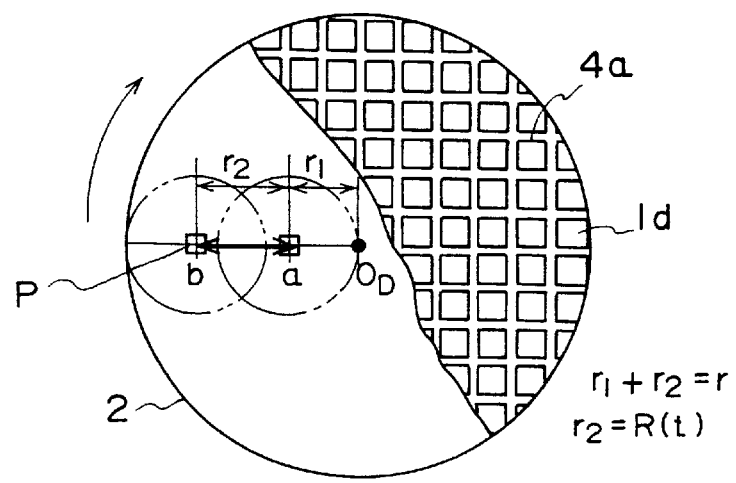
FIG. 39B is a plan view showing a lower surface plate and an abrasive cloth in FIG. 39A.

FIG. 39A is a side view showing mechanical portions in a polishing apparatus according to a twelfth embodiment of the present invention. FIG. 39B is a plan view showing a lower surface plate and an abrasive cloth in FIG. 39A. FIG. 40 is a block circuit diagram showing a signal processing portion in the polishing apparatus according to the twelfth embodiment of the present invention. In FIGS. 39A, 39B and 40, like reference symbols identify the same or corresponding parts in FIGS. 1 and 15.

In FIG. 39A, a location detector 61 for detecting location of the upper surface plate 3 is arranged on the side of the shaft driving portion 21. The location detector 61 comprises a light emitting device 61a for irradiating a light to a detection plate 62 attached to the shaft driving portion 21, and a light receiving device 61b for receiving a reflected light from the detection plate 62. The location detector 61 measures a distance L from the shaft driving portion 21 according to a quantity of incident light into the light receiving device 61b and inputs measured data to a computer 77 described later. For instance, a semiconductor laser may be used as the light emitting device 61a and a photodiode may be used as the light receiving device 61b.

A abrasive cloth 1d in which a plurality of grooves 4a are formed in the vertical and horizontal directions is stuck to the lower surface plate 2. The abrasive cloth 1d as well as the lower surface plate 2 is rotated by the motor M in polishing. The upper surface plate 3 moves between a point a and a point b reciprocally on the abrasive cloth 1d in polishing and is rotated at a constant velocity. Reciprocating movement and rotational movement of the upper surface plate 3 is transmitted from the shaft driving portion 21 via the elastic substance 7, the enclosure 8, and the shaft 9. An operation of the shaft driving portion 21 is controlled by the drive controller 17, like the first embodiment.

A voltage is applied to an output end of the vibration detecting device 10 attached to the upper surface plate 3 via a rectifier 63, as shown in FIG. 40. The output terminal of the vibration detecting device 10 is connected to an FM transmitter 34B via a capacitor 64, an amplifier 65, a lowpass filter 66, and a highpass filter 67. Mechanical and electrical noises are removed by the capacitor 64 from a vibration signal being output from the vibration detecting device 10. The vibration signal is then amplified by the amplifier 65, then is narrowed into a particular vibration frequency bandwidth by the lowpass filter 66 and the highpass filter 67, and then input into the FM transmitter 34B. If, for example, the lowpass filter 66 may remove the vibration signal of more than 18 kHz and the highpass filter 67 may remove the vibration signal of less than 8 kHz, the particular vibration frequency bandwidth ranges over 8 kHz to 18 kHz. The FM transmitter 34B transmits the vibration signal to the FM receiver 69 by virtue of the transmitting antenna 25 provided around the enclosure 8 by radio.

As shown in FIG. 40, the vibration signal being input by the receiving antenna 26 provided around the shaft driving portion 21 is received by the FM receiver 69.

A recording unit 70 is connected to an output terminal of the FM receiver 69. Vibration signal data stored in the recording unit 70 are utilized for generation of data library, frequency analysis, adjustment of processing circuit, etc. An output terminal of the FM receiver 69 is connected to the computer 77 via a 1 kHz highpass filter 71, a first amplifier 72, a rectifier circuit 73, a 0.5 Hz lowpass filter 74, a second amplifier 75, and an A/D converter 76. The highpass filter 71 cuts off a DC component of the vibration signal. The rectifier circuit 73 and the lowpass filter 74 integrates the vibration signal in the particular vibration frequency bandwidth to calculate a root-mean-square (RMS) value of vibration.

Figure 41:
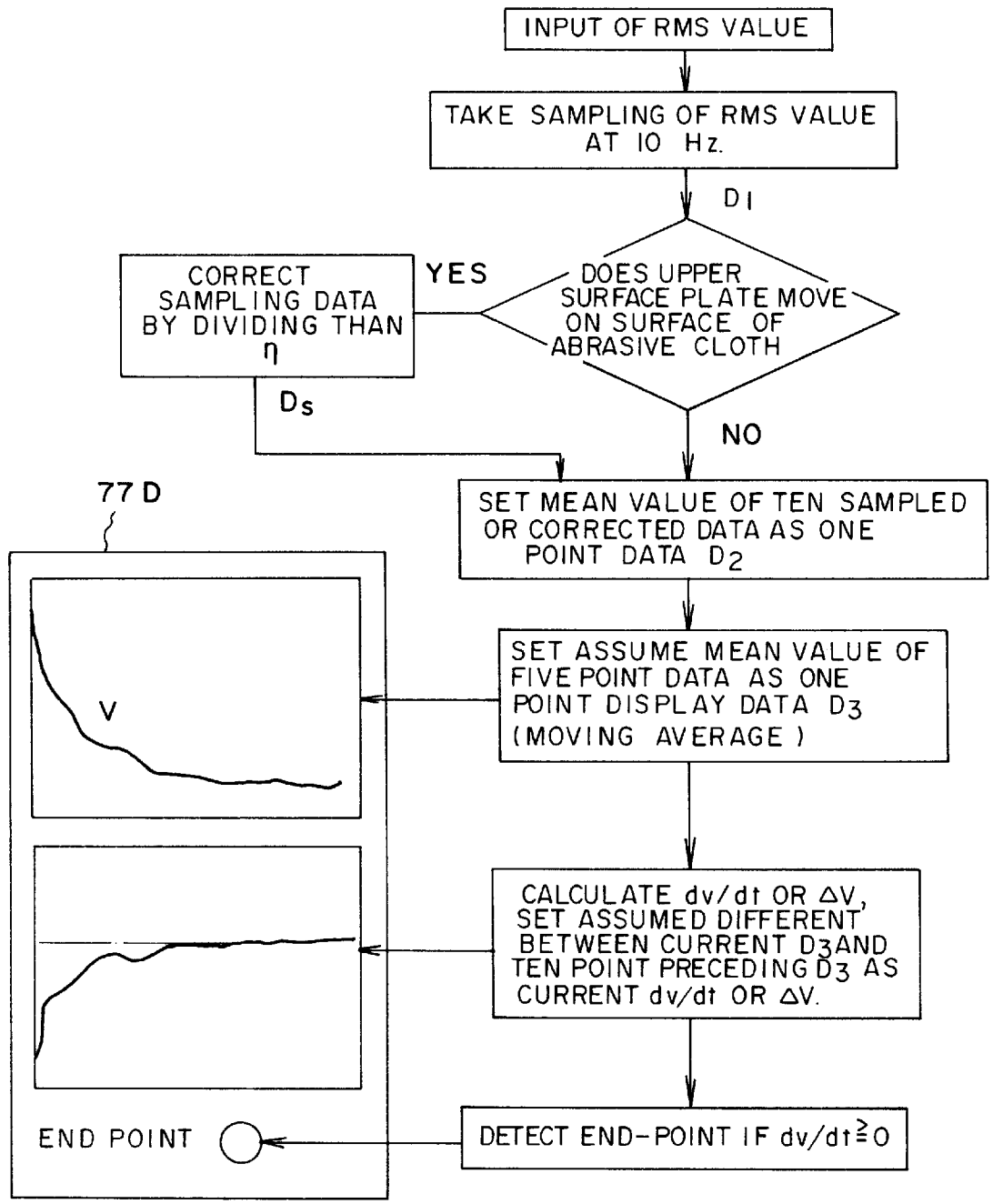
FIG. 41 is a flowchart illustrating signal processing procedure by a computer in the polishing apparatus according to the twelfth embodiment of the present invention.

In the computer 77, arithmetic operations and a display operation are implemented according to a flowchart in FIG. 41.

First, a case will be explained where the polished object W is polished only by virtue of rotation of the upper surface plate 3 while the center of rotation of the upper surface plate 3 does not shift on the surface of the abrasive cloth.

In the computer 77, the RMA value of continuously input vibration signal is sampled sequentially at a rate of 10 time per second (10 Hz), then an average value of sampled 10 data $D_1$ is calculated, and then the average data is set as a point data $D_2$.

In turn, if the point data $D_2$ is displayed with the passage of time as it is, a zigzag line is derived. Thus, to display the line smoothly, a point display data $D_3$ can be derived from an average value of five point data $D_2$. In this event, when an average of five point data $D_2$ is calculated while carrying up the point data $D_2$ one by one in the order of calculation, one point display data $D_3$ can be obtained every second. Such average is called as a moving average.

The point display data derived from this moving average are displayed sequentially on the image display portion 77D. A vibration intensity curve can be obtained by plotting a plurality of point display data.

As can be assumed from the above embodiments, in case the upper surface plate 3 is merely rotated, sampled data $D_1$ is gradually attenuated as polishing advances.

Figure 42A:
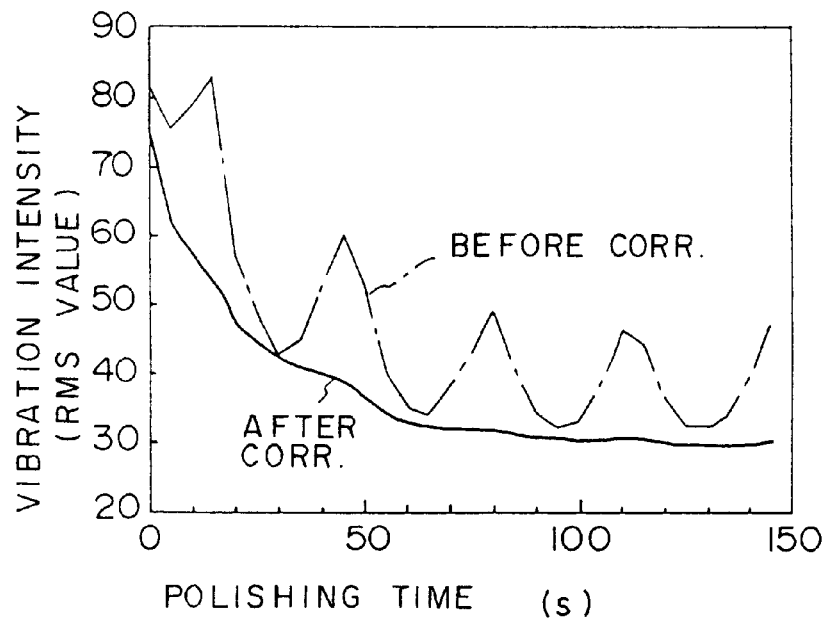
FIG. 42A is a view showing a vibration intensity curve as average sampling data before correction and a vibration intensity curve after correction in the polishing apparatus according to the twelfth embodiment of the present invention.
Figure 42B:
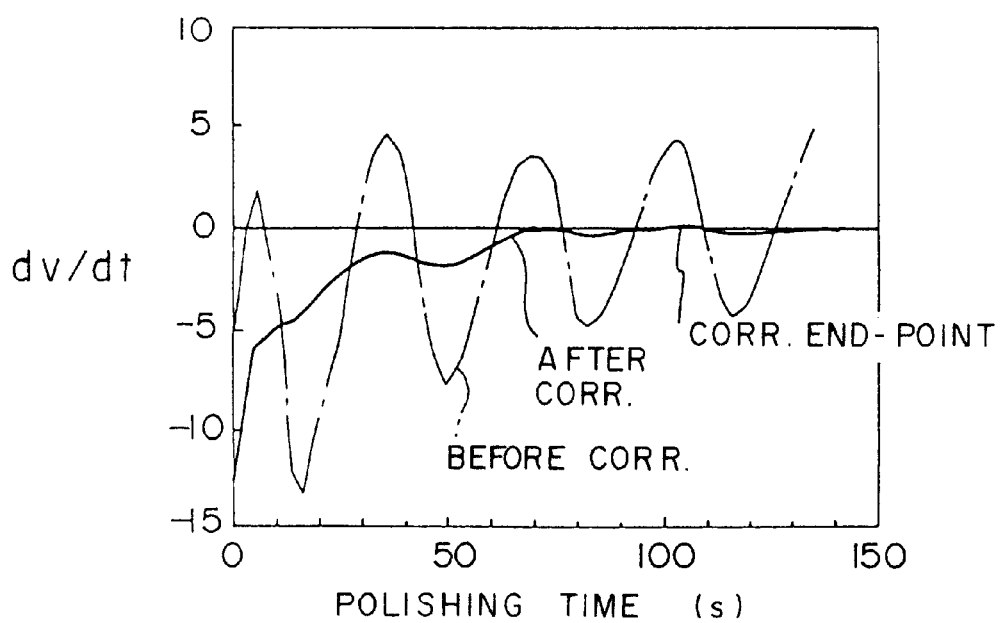
FIG. 42B is a view showing differentiated vibration intensity curves before and after correction in the polishing apparatus according to the twelfth embodiment of the present invention.

However, if the upper surface plate 3 takes an operation other than rotation operation, e.g., reciprocal operation on the abrasive cloth 1d, the point display data $D_3$ includes an AC component as shown by a chain line in FIG. 42A. Therefore, it becomes difficult to detect an end-point of polishing. For example, if the curve of the chain line in FIG. 42A is differentiated, a curve like the chain line in FIG. 42B can be derived. Therefore, a time point when the differential value becomes zero cannot be determined as an end-point of polishing.

Hence, if the upper surface plate 3 takes a reciprocal operation between a point a and a point b on the abrasive cloth 1d, a correction is made by dividing respectively the RMS data $D_1$ being sampled at 10 Hz by a correction factor η, then the point data $D_2$ and the point display data $D_3$ are calculated, and then the point display data $D_3$ is displayed on the image display portion 77D. Thus, a curve shown by a solid line in FIG. 42A can be derived. A curve obtained by differentiating the curve is obtained as a curve shown by a solid line in FIG. 42B. Since a period of the reciprocal operation is usually more than several tens seconds, the point data $D_2$ may be divided by the correction factor η.

Figure 43A:
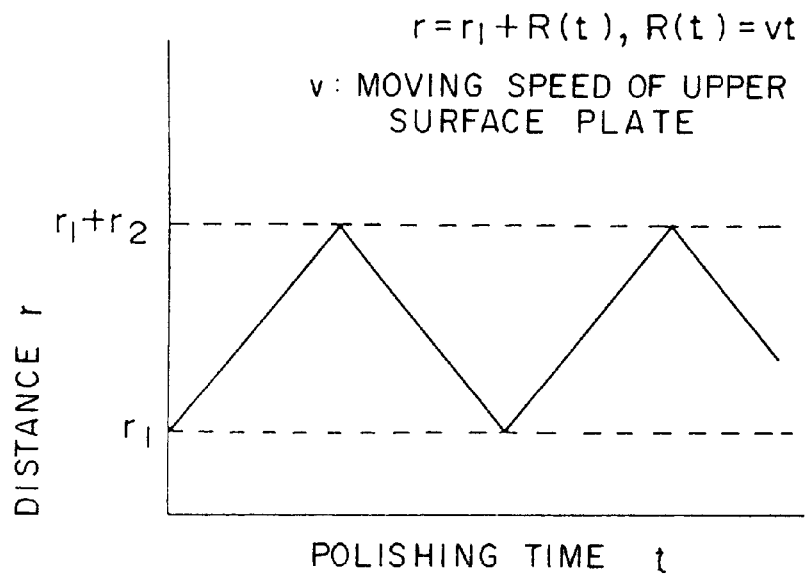
FIG. 43A is a waveform diagram illustrating variation in a distance r between a center of rotation of an upper surface plate and a center of rotation of the abrasive cloth when the upper surface plate is shifted in the diameter direction of the abrasive cloth in the polishing apparatus according to the twelfth embodiment of the present invention.
Figure 43B:
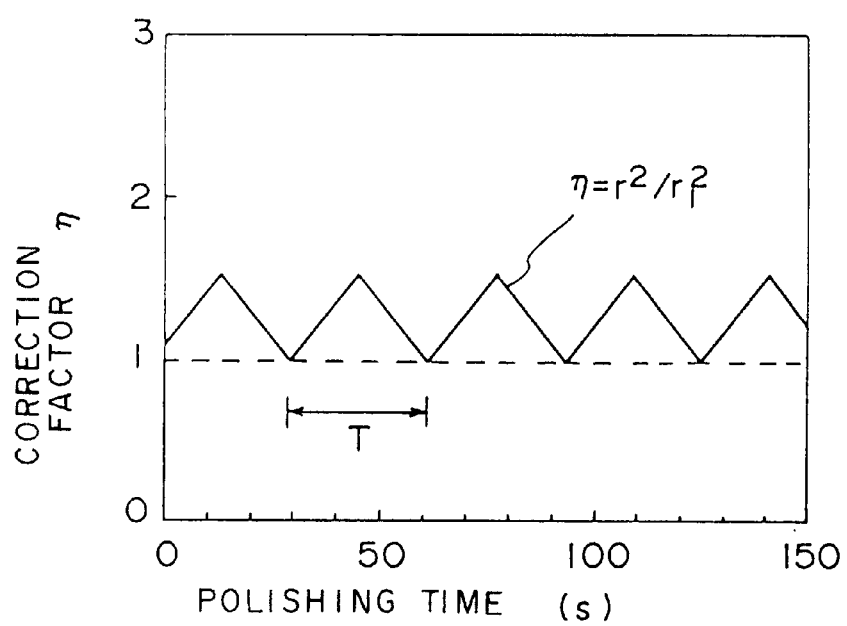
FIG. 43B is a waveform diagram illustrating correction factor expressed by virtue of the distance r in FIG. 43A.

As shown in FIG. 39B, in case the rotating upper surface plate 3 is reciprocated between two points a and b in the diameter direction from the center $O_0$ of revolution of the lower surface plate 2, variation of the distance r in time is shown in FIG. 43A, and the correction factor η is $r^2/r_1^2$ as shown in FIG. 43B. For instance, if a distance between the point a and the point b is 32 mm and moving rate v of the upper surface plate 3 is 2 mm/sec, a period T of a waveform in FIG. 43B is 32 second. In this case, the distance $r_1$ is 134 mm.

The correction factor η is determined as follows.

It is supposed that a minute portion P of the polished surface of the polishing object W which locates at a distance r from the center of rotation of the abrasive cloth 1d is polished by the abrasive cloth 1d which is rotating at a angular velocity ω, a relative velocity between the minute portion P and the abrasive cloth 1d is a function of rω. The distance r can be calculated based on locational data supplied from the location detector 61. The minute portion P is set at the center of rotation of the upper surface plate 3.

Figure 44A:
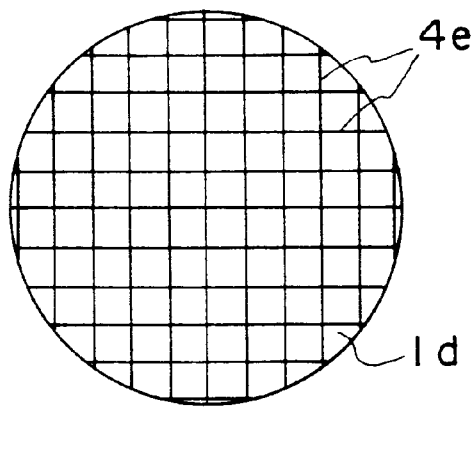
FIGS. 44A to 44D are plan views showing variations of the abrasive cloth used in the polishing apparatus according to the twelfth embodiment of the present invention.
Figure 44B:
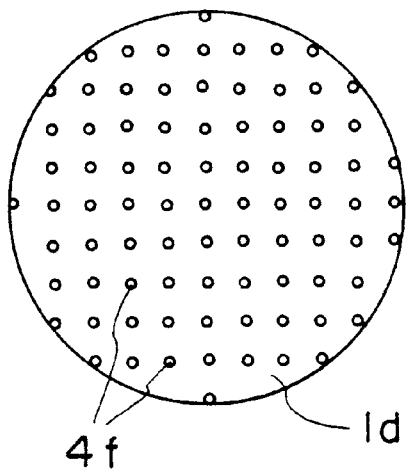
Figure 44C:
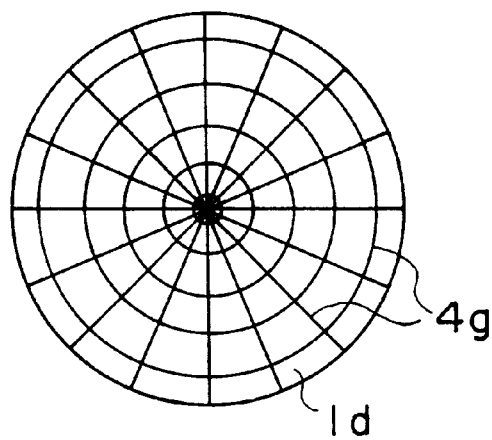
Figure 44D:
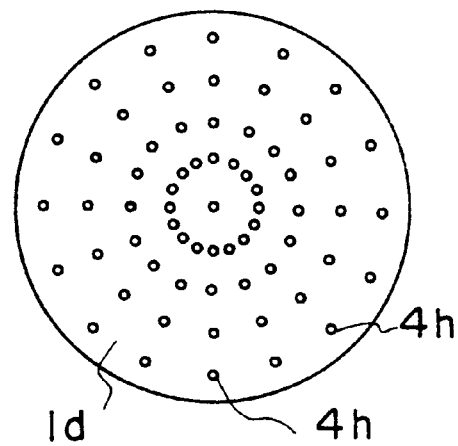

Further, as shown in FIGS. 44A and 44B, sometimes grooves 4e or micropores 4f are formed on the surface of the abrasive cloth 1d at predetermined density. In this case, the contact number of the minute portion P to the grooves 4e or the micropores 4f during one rotation of the abrasive cloth 1d is a function of rω. Furthermore, as shown in FIGS. 44C and 44D, if the grooves 4g or the micropores 4h are spread from the center of rotation of the abrasive cloth 1d in a radial manner, the contact number of the minute portion P to the grooves 4g or the micropores 4h during one rotation of the abrasive cloth 1d is a function of ω. If the abrasive cloth in which no groove or no micropore is formed is used, no influence to the minute portion P by the groove or the micropore is to be considered.

For this reason, a product of the relative velocity r and the contact number is adopted as the correction factor η. Basics of the correction factor η is given in Table I.

Since factors such as kinds of the polishing liquid, materials of the abrasive cloth, etc. may be considered not to scarcely change in polishing, they have not been included in the correction factor η. If the upper surface plate 3 does not takes operations other than the rotation, r is set to 1 since r is constant. The number of rotation of the upper surface plate 3 does not change in general during polishing, and therefore the correction factor η may be defined under the condition ω=1. Furthermore, the correction factor η may include other coefficients. For example, as shown in FIGS. 39B and 43B, the distance r may be divided by the distance $r_1$ (constant).

TABLE I

| | kinds of the polishing liquid | | |
| --- | --- | --- | --- |
| | grooves or micropores at predetermined density | grooves or micropores in a radical manner | without grooves or micropores |
| taking a reciprocal operation η | $r^2ω^2$ | $rω^2$ | $rω$ |
| not taking a reciprocal operation η | $ω^2$ | $ω^2$ | $ω$ |

With the above, as shown in FIG. 41, corrected sampling data Ds is averaged at 10 Hz and then converted into the point data $D_2$, and then converted into the point display data $D_3$. The point display data $D_3$ are displayed as relations between polishing time and vibration intensity, for example, as shown by the solid line in FIG. 42A, on the image display portion 77d.

Differential value (dV/dt) or variation amount relative to time ΔV of a curve being plotted based on the point display data $D_3$ are calculated in the computer 77. The calculation result is displayed as a curve shown in the solid line in FIG. 42B, for example, on the image display portion 77d.

Calculation of variation amount relative to time ΔV of the point display data is displayed by the value obtained by subtracting the point display data $D_3$ being ten data before from current point display data $D_3$. In this example, variation amount relative to time $\Delta V$ is displayed as one data per second.

A time point when differential value (dV/dt) or variation amount relative to time $\Delta V$ becomes zero or more is set as an end-point of polishing, and the result of the end-point detection is displayed on the image display portion 77d.

Since the computer 77 for implementing the above calculation and display serves as the drive controller 17 in the first embodiment, it may instruct halt of polishing to the shaft driving portion 21 at the time of detecting the end-point of polishing.

A reciprocating locus of the upper surface plate 3 between the points a and b on the abrasive cloth 1d is not restricted in the diameter direction from the center $O_0$ of rotation of the abrasive cloth 1d. For example, as shown in FIG. 45A, a locus of the upper surface plate 3 presents as a linear locus perpendicular to the diameter direction, otherwise it presents as a circular arc locus because the upper surface plate 3 is swung by the arm of the robot, as shown in FIG. 46A.

Figure 45A:
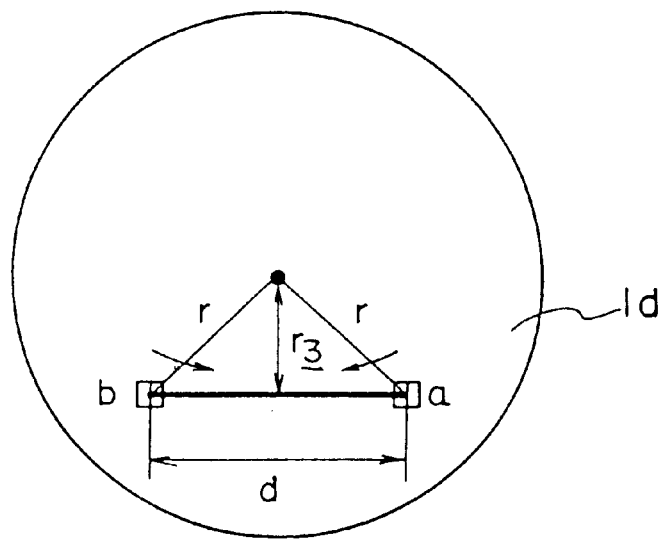
FIG. 45A is a plan view showing a second example of a locus of the upper surface plate in the polishing apparatus according to the twelfth embodiment of the present invention.
Figure 45B:
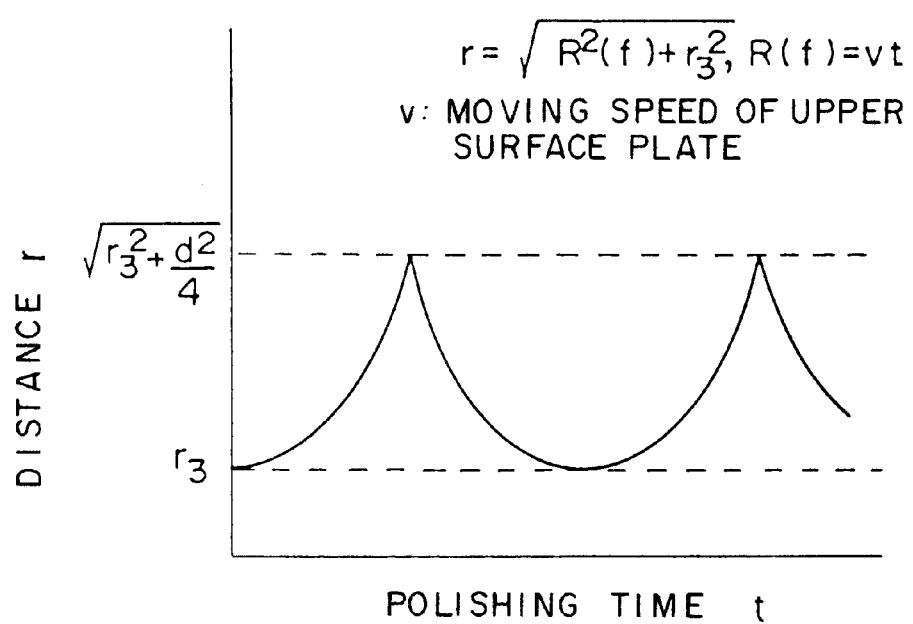
FIG. 45B is a waveform diagram illustrating variation in the distance r between the center of rotation of the upper surface plate and the center of rotation of the abrasive cloth on the locus in FIG. 45A.
Figure 46A:
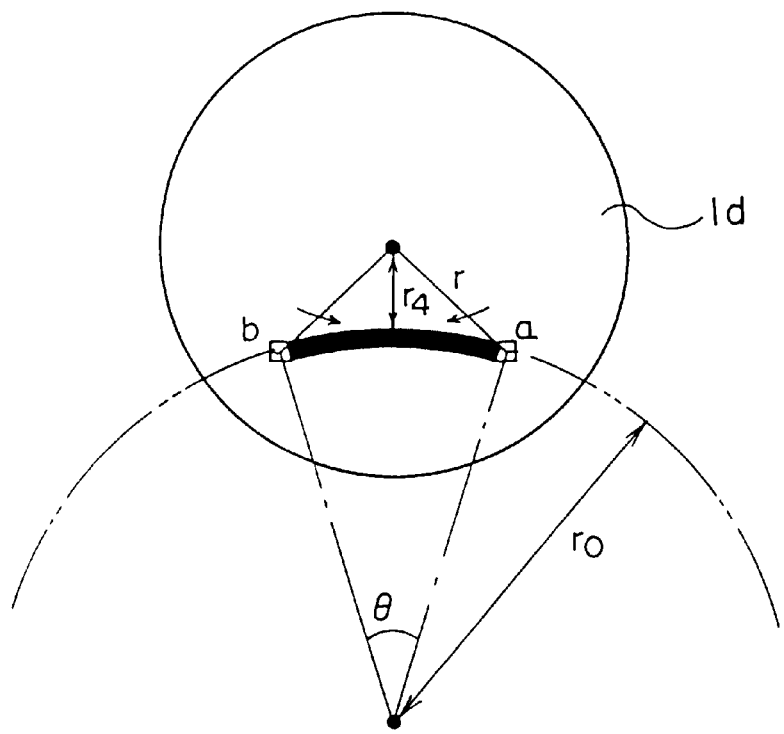
FIG. 46A is a plan view showing a third example of a locus of the upper surface plate in the polishing apparatus according to the twelfth embodiment of the present invention.
Figure 46B:
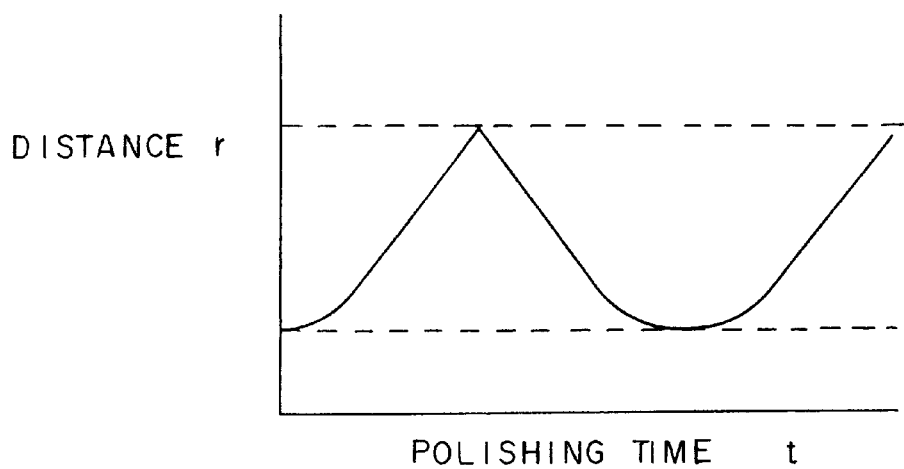
FIG. 46B is a waveform diagram illustrating variation in the distance r between the center of rotation of the upper surface plate and the center of rotation of the abrasive cloth on the locus in FIG. 46A.

In such cases, a distance r between the center of rotation of the upper surface plate 3 and the center $O_0$ of rotation of the abrasive cloth 1d changes with respect to time as shown in FIG. 45B if the locus shown in FIG. 45A is taken, and also it changes with respect to time as shown in FIG. 46B if the locus shown in FIG. 46A is taken.

The distance r used in measuring the RMS value is calculated based on data detected by the location detector 61 in the computer 77, and is utilized as the correction factor $\eta$.

Figure 47A:
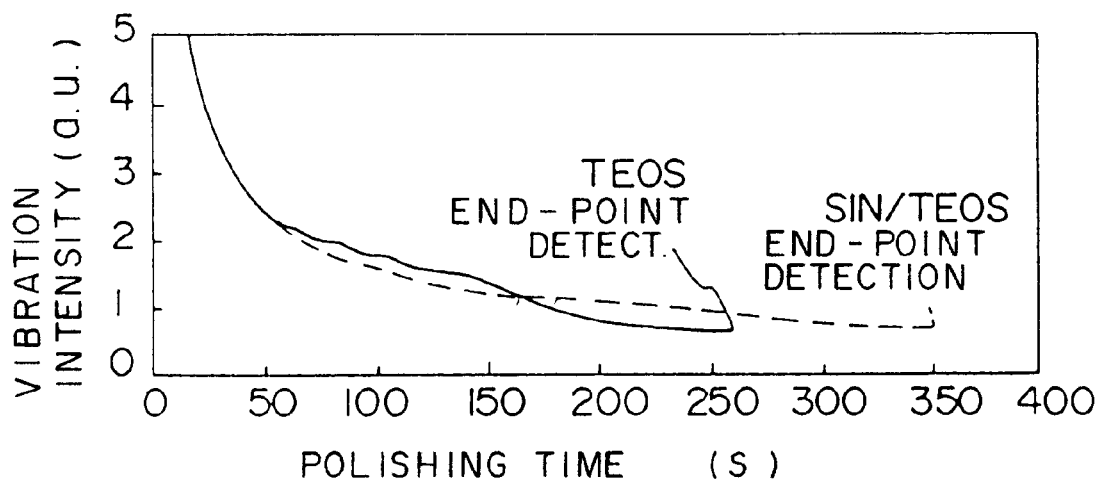
FIG. 47A is a view showing vibration intensity curves relative to a polishing time when the upper surface plate is not shifted on the abrasive cloth in the polishing apparatus according to the twelfth embodiment of the present invention.
Figure 47B:
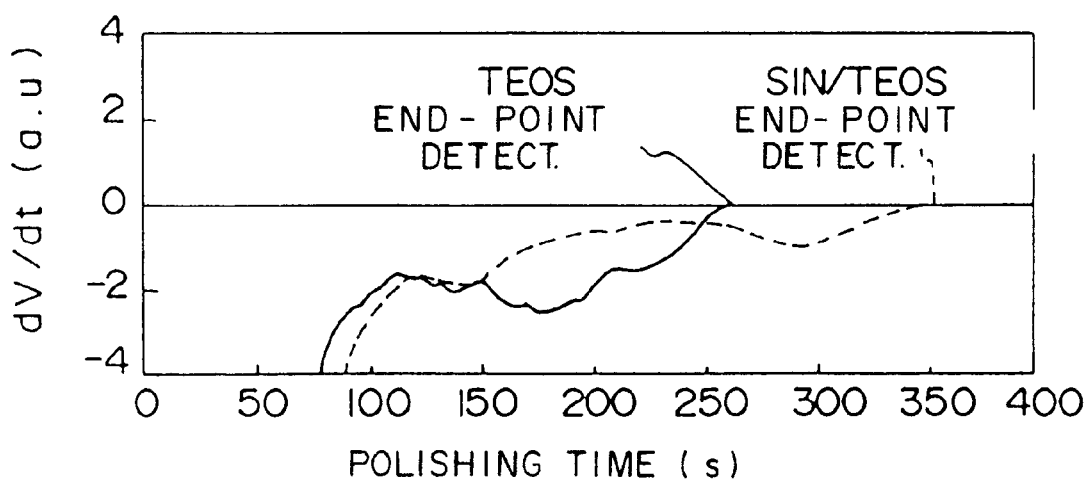
FIG. 47B is a view showing differentiated curves of the vibration intensity curves in FIG. 47A.

Meanwhile, if only the rotation operation is applied to the upper surface plate 3, the correction factor $\eta$ is not needed to be considered. The curve by the point display data is given in FIG. 47A and the curve showing the differential value is given in FIG. 47B. In FIGS. 47A and 47B, the curve A represents a polishing state of the $SiO_2$ film formed with TEOS while the curve B represents a polishing state of the films in which the silicon nitride film is formed on the $SiO_2$ film.

In the foregoing, the end-point detection based on vibration intensity of the upper surface plate 3 has been explained. But the progress state of polishing can be grasped as change in torque of the motor being built in the shaft driving portion 21. Accordingly, after the RMS value is calculated as described above, polishing state can be grasped by a means for sampling or correcting the RMS value, and also the end-point can be detected by the same means.

(Thirteenth Embodiment)

In the thirteenth embodiment, an apparatus will be explained wherein vibration (sound) due to friction between the head and the abrasive cloth is not measured, but polishing state and end-point of polishing is measured on the basis of change in friction force between the head and the abrasive cloth.

Figure 48A:
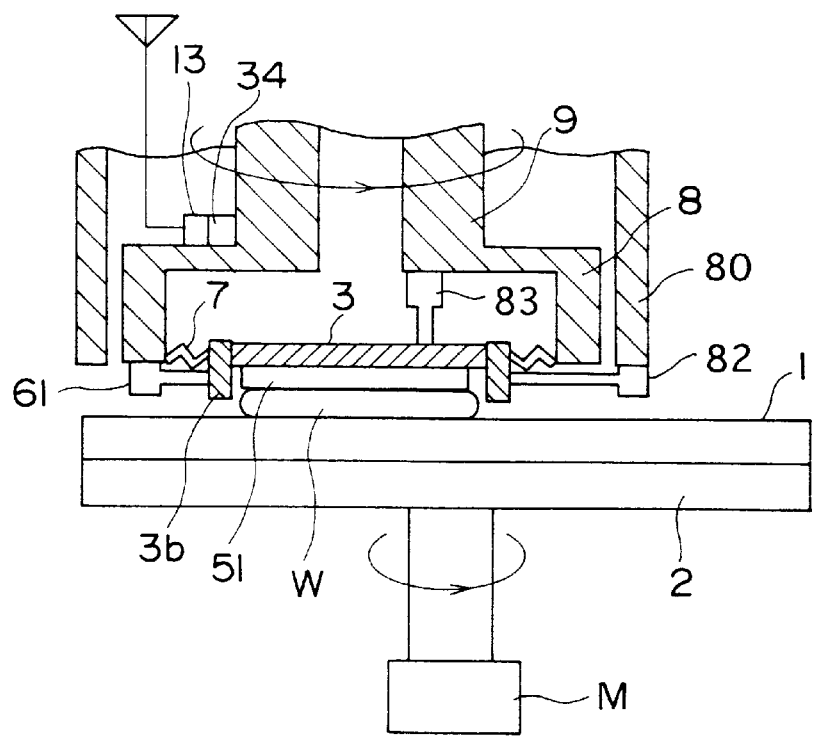
FIGS. 48A and 48B are respectively a sectional view and a bottom view showing a pertinent portion of a polishing apparatus according to a thirteenth embodiment of the present invention.
Figure 48B:
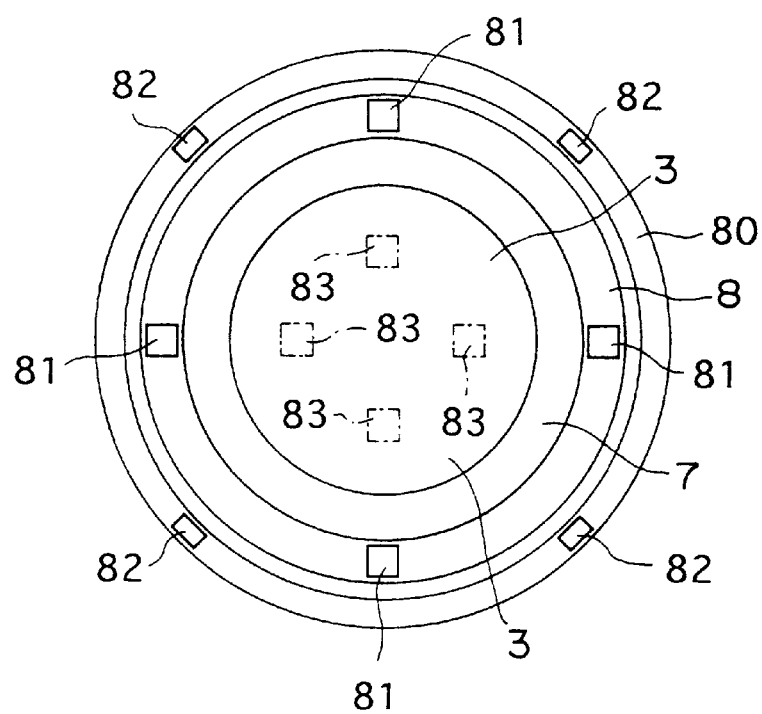

FIGS. 48A and 48B are respectively a sectional view and a bottom view showing a pertinent portion of a polishing apparatus according to the thirteenth embodiment of the present invention. In FIG. 48, like reference symbols identify like parts in FIGS. 1, 15, and 17.

In FIGS. 48A and 48B, the lower surface plate 2 to its upper surface of which the abrasive cloth 1 is stuck is rotated by the shaft driving portion 21 at a predetermined number of rotation. The polished object W which is pushed to the upper surface of the abrasive cloth 1 to be polished is stuck to the lower surface of the metal upper surface plate 3 positioned on the bottom of the air-back type head via the inner pad 51. A side wall 3b is formed around the upper surface plate 3, and the side wall 3b and the enclosure (supporting body) 8 of the head is coupled by the elastic substance 7. A cylindrical shaft 9 for rotating the enclosure 8 is provided in the center of the enclosure 8. A cylindrical head cover 80 not to be rotated is provided around the shaft 9 and the enclosure 8 so as to prevent contamination by the polishing liquid of the head.

A slant face (not shown) for converting a lateral displacement (divergence) amount of the upper surface plate 3 into a vertical displacement amount is formed on the upper surface of the upper surface plate 3.

A first displacement detector 81 for detecting displacement of the side wall 3b of the upper surface plate 3 is provided on the bottom surface of the enclosure 8. A second displacement detector 82 for detecting displacement of the side wall 3b of the upper surface plate 3 is provided on the bottom surface of the head cover 80. In addition, a third displacement detector 83 for detecting displacement of distance from the slant face of the upper surface plate 3 is provided on the ceiling surface of the enclosure 8 which is positioned over the slant face of the upper surface plate 3.

As the first, second and third displacement detectors 81 to 83, a stylus displacement meter for detecting a displacement amount by expansion and contraction of a stylus, a capacitive displacement meter for detecting a displacement amount by change in capacitance because of change in the distance from the side wall 3b of the upper surface plate 3, an eddy current displacement meter for detecting a displacement amount by a change amount in the flux density because of change in the distance from the side wall 3b of the upper surface plate 3, an optical displacement meter for detecting a distance by virtue of reflection of the light, and the like may be utilized.

Such first, second and third displacement detectors 81 to 83 may be arranged either in plural as shown in the bottom view of the head in FIG. 48B or in the singular. Further, all the first, second and third displacement detectors 81 to 83 are not always provided, as shown in FIGS. 48A and 48B, and at least one of them may be provided.

Outputs from the first, second and third displacement detectors 81 to 83 is connected to the transmitter 13b via the amplifier 34a and 34c, and the filter 34b shown in FIG. 19. The detection signal being transmitted from the transmitter 13b is input into the processing portion 35 via the receiver 14. The processing portion 35 determines an end-point of polishing according to change in the displacement signal and modifies the polishing conditions.

Although not shown especially, the polishing liquid supplying nozzle and the dresser are arranged over the abrasive cloth 1 like the above embodiments.

The first and second displacement detectors 81, 82 may be covered by a transparent cover to prevent the polishing liquid or the water. A cover for the third displacement detector 83 may be neglected because the detector 83 is disposed in the enclosure 8.

Subsequently, an end-point detection in polishing by the above polishing apparatus will be explained.

Figure 49A:
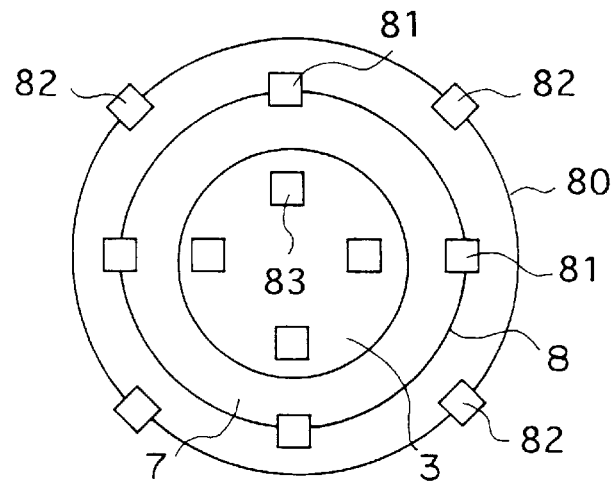
FIGS. 49A to 49C are bottom views showing polished conditions of a bottom surface of a head of the polishing apparatus according to the thirteenth embodiment of the present invention.
Figure 49B:
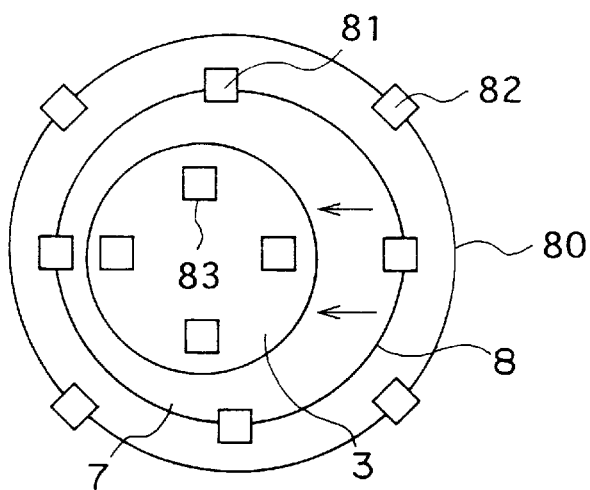
Figure 49C:
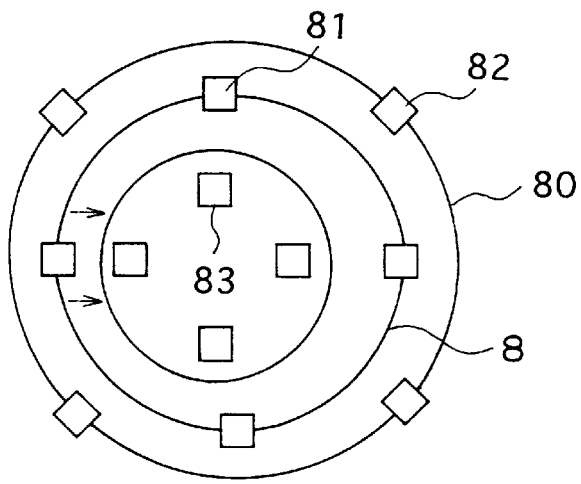

When a flat standard wafer is first positioned on the lower surface of the inner pad 51 and then polishing operation is carried out, location of the upper surface plate 3 is varied as shown in FIGS. 49A to 49C. At this time, displacement signals from the first, second and third displacement detectors 81 to 83 are recorded as reference signals. The standard wafer is removed after the reference signal has been measured.

Next, when a wafer in which an interlayer film is formed as the polishing object W is positioned on the lower surface of the inner pad 51 and then polishing operation is carried out, the upper surface plate 3 positioned at a location in FIG. 49A is displaced like FIG. 49B accompanying to move of the enclosure 8. The cause why displacement of the upper surface plate 3 occurs is that stress applied to the elastic substance 7 around the upper surface plate 3 is biased since friction between the polishing object W and the abrasive cloth 1 is great. For this reason, the upper surface plate 3 is inclined to be pulled toward the moving direction of the enclosure 8. This state is set to be an initial state, and at this time the displacement amount detected by the first, second and third displacement detectors 81 to 83 are assumed as the maximum values.

Figure 50:
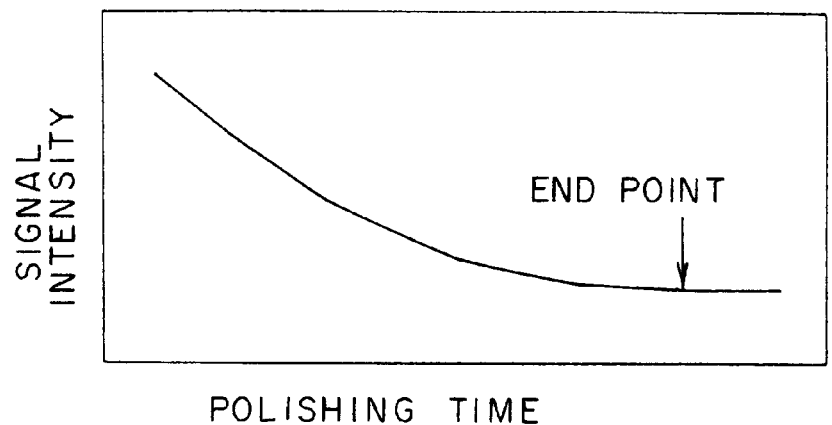
FIG. 50 is a view showing a change amount in displacement of the upper surface plate according to progress of polishing in the polishing apparatus according to the thirteenth embodiment of the present invention.

If polishing is continued still further, friction between the polishing object W and the abrasive cloth 1 is decreased gradually with the progress of time, and the upper surface plate 3 is located near the center of the enclosure 8, as shown in FIG. 49C. Displacement of the upper surface plate 3 is also reduced. As shown in FIG. 50, change amount in displacement detected by the first, second and third displacement detectors 81 to 83 are also gradually decreased and finally the change amount become zero or almost zero. In this state, polishing is ended. End of polishing is carried out by reducing polishing pressure or separating the polishing object W from the abrasive cloth 1 by lifting the enclosure 8.

Figure 51:
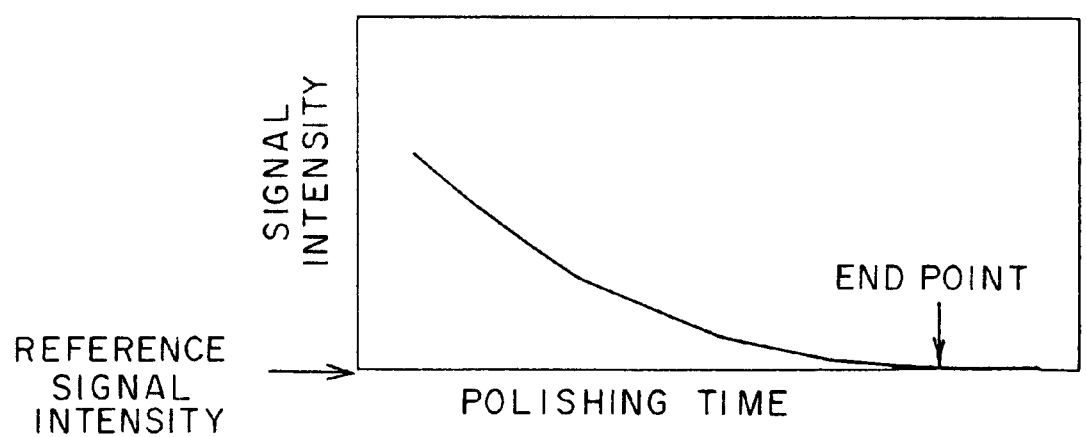
FIG. 51 is a view showing comparison of a change amount in displacement of the upper surface plate according to progress of polishing with a reference signal in the polishing apparatus according to the thirteenth embodiment of the present invention.

If it is difficult to detect an end-point of polishing according to change amount in displacement of the upper surface plate 3, a time point when the change amount coincide with the reference signal or difference between them is substantially eliminated may be assumed as an end-point of polishing, as shown in FIG. 51. As a different example of end-point detection, in case, for example, different material used to detect the end-point is formed in the polishing object W, displacement is increased still more when the different material is exposed with the progress of planarization.

To check displacement of such surface plate, change in the output signal from the displacement detectors 81 to 83 is gentle and therefore may be measured as a DC component. According to rotation of the enclosure 8, the upper surface plate 3 and the abrasive cloth 1, if the detection signals from the displacement detectors 81 to 83 are low frequency signals of several tens Hz, only the low frequency component may be extracted as the detection signal. Since the high frequency signal such as background noise is removed by the filter, sensitivities of the displacement detectors 81 to 83 becomes high in contrast to that of the vibration detecting device 10. Like this, if the detection signal is the DC signal or if the frequency bandwidth is narrow such as almost 0 to 100 Hz, the signal may be transmitted with good precision to the detector rather than the high frequency signal. Therefore, high-sensitivity measurement can be accomplished in comparison with the above vibration measurement.

Since the first displacement detector 81 is rotated in synchronous with the head, a measuring range of the upper surface plate 3 is not varied. Therefore, measurement is not subjected by variation in profiles of the upper surface plate 3. However, in the first displacement detector 81, since a distance between the detector 81 and the upper surface plate 3 is varied during one rotation of the upper surface plate 3, intensity of the displacement signal and displacement direction change periodically in accordance with the rotation frequency. Because this rotation frequency is about 100 Hz at maximum and is synchronous with the rotation of the head, the S/N ratio is not degraded.

According to the second displacement detector 82, though the displacement signal is not changed periodically and change amount of the upper surface plate 3 can be detected linearly, it is readily subjected by variation in profiles of the enclosure 8 and the upper surface plate 3.

According to the third displacement detector 83, the detected object is vertical movement of the slant face formed on the upper surface plate 3. But vertical movement of the upper surface of the upper surface plate 3 may be used as the detected object W without such slant face.

According to a plurality of such displacement detectors 81 to 83, total abundant information content can be obtained by measuring front and rear movement, right and left movement, and up and down movement of the enclosure 8 and/or the upper surface plate 3. Therefore, by putting various forces together, a plenty of information as to falling-off of the wafer, injury of the wafer, polishing conditions (supply of the polishing liquid, abnormal of the abrasive cloth, change of pressure, change of rotation number, etc.) can be acquired.

Figure 52A:
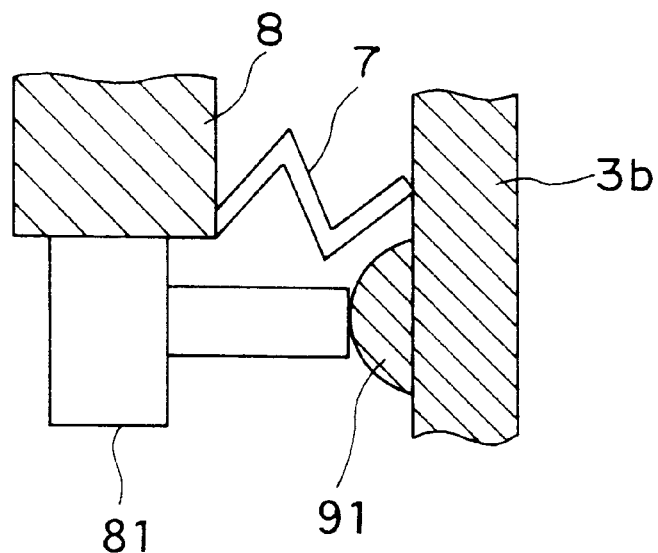
FIGS. 52A and 52B are side views, partially in section, respectively showing a head in which a projection is formed in vibration detecting area in the polishing apparatus according to the thirteenth embodiment of the present invention.
Figure 52B:
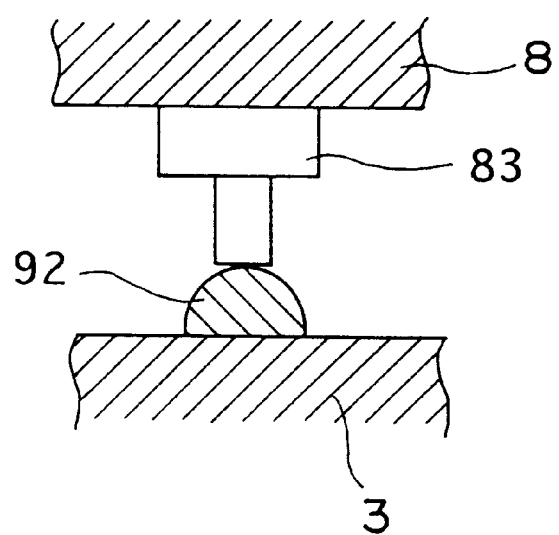

If hemispherical projections 91, 92 shown in FIGS. 52A and 52B or depressions (not shown) are formed at detection location on the side wall 3b of the upper surface plate 3, displacement at the same location can be detected in the multi-direction.

In case a plurality of the polishing objects W are polished concurrently, a plurality of heads shown in FIG. 39 may be simultaneously started. If variations in polishing detected by respective heads are less than ten %, the end-point detection by all heads is not required. In such event, the displacement detectors 81 to 83 or the vibration detecting device 10 in the above embodiments may be provided to only part of the heads (only one head is possible). In this case, when the head having the displacement detectors 81 to 83 or the vibration detecting device 10 comes to the end-point, polishing by all heads may be terminated to thus achieve the good result. After reaching the end-point, polishing may be done excessively for a predetermined time interval.

If vibration detecting devices or displacement detectors are provided to all heads, the heads (upper surface plate 3) may be lifted in the order of detecting the end-point of polishing to halt polishing operation, and be waited until entire polishing are finished.

Halt instructions to a plurality of heads are issued by the controllers 17, 35 shown in FIGS. 1 and 19.

What is claimed is:

1. A polishing apparatus comprising:

a first surface plate for supporting an object to be polished;

a first driving mechanism for rotating said first surface plate;

a second surface plate arranged so as to oppose to said first surface plate;

an abrasive cloth stuck to said second surface plate;

a vibration detector attached to said first surface plate or said second surface plate, for detecting vibration in polishing;

a controlling portion for controlling polishing operation of at least one of said first surface plate and said second surface plate; and signal analyzing means for analyzing vibration intensity detected by said a vibration detector through frequency analysis, integrating said vibration intensity relative to time, and transmitting a polishing stop signal to stop polishing operation of at least one of said first surface plate and said second surface plate to said controlling portion when variation in a resultant integral value relative to time is less than a first reference value or when said resultant integral value is less than a second reference value.

2. A polishing apparatus according to claim 1, wherein an elastic substance is formed around said first surface plate.

3. A polishing apparatus according to claim 1, wherein grooves or micropores are formed on a surface of said abrasive cloth, and cavities being vibrated in resonance with vibration of said surface of said abrasive cloth are formed in said abrasive cloth.

4. A polishing apparatus according to claim 1, wherein a plurality of bandpass filters each having a different center frequency are connected in combination on an output terminal side of said vibration detector.

5. A polishing apparatus according to claim 1, further comprising:
a signal analyzing portion for determining whether or not conditions of start of polishing, stop of polishing, or polishing are satisfied;
a transmitting portion for transmitting vibration information in polishing detected by said vibration detector by radio;
a receiving portion for receiving radio signal output from said transmitting portion, for having an automatic frequency control mechanism which controls automatically variation in tuning frequency of said radio signal within a reference frequency range, and for letting said automatic frequency control mechanism receive an oscillation frequency from said transmitting portion every time when said signal analyzing portion requests to receive data.

6. A polishing apparatus according to claim 1, wherein said a vibration detector is device for detecting vibration in a vertical direction or a circumferential direction.

7. A polishing apparatus according to claim 1, wherein a plurality of said vibration detector are attached in symmetrical to a center of rotation of said first surface plate, and a calculator for calculating sum or difference of output signals from said plurality of said vibration detector is connected to output terminals of said plurality of said vibration detector.

8. A polishing apparatus according to claim 1, further comprising vibration converting means connected to said vibration detector, for converting vibration frequency detected by said vibration detector into respective resonance frequencies of said vibration detector.

9. A polishing apparatus according to claim 1, wherein said polishing object is supported on said first surface plate via an inner sheet, and a through hole is formed in said first surface plate and said inner sheet and a vibration propagating substance which is contacted to said polishing object and said vibration detector through said through hole.

10. A polishing apparatus according to claim 1, further comprising a second driving mechanism connected to said second surface plate for rotating said second surface plate, wherein said first surface plate has a first proper vibration frequency identical to vibration frequency to be detected by said a vibration detector, and at least one of said first surface plate and said second surface plate has a second proper vibration frequency which is different from said first proper vibration frequency.

11. A polishing apparatus comprising:
a first surface plate for supporting a polishing object;
a second surface plate arranged so as to oppose to said first surface plate and having cavities therein to amplify vibrations in said second surface plate;
an abrasive cloth stuck to said second surface plate;
a vibration detector attached to said first surface plate or said second surface plate, for outputting vibration signals caused in polishing; and
a controlling portion, receiving the output of said vibration detector, for controlling polishing operation of at least one of said first surface plate and said second surface plate as a function of said vibrating signals output by said vibration detector.

12. A polishing apparatus comprising:
a first surface plate for supporting an object to be polished;
a second surface plate arranged to oppose to said first surface plate;
an abrasive cloth stuck to said second surface plate;
a vibration detector attached to said first surface plate or said second surface plate;
a driving mechanism for driving at least one of said first surface plate and said second surface plate;
a transmitting portion attached to said first surface plate or said second surface plate to which said vibration detector is attached, for transmitting vibration information detected by said vibration detector by radio;
a receiving portion for receiving radio signal output from said transmitting portion;
a signal analyzing portion connected to said receiving portion, for analyzing said radio signal received;
a controlling portion for outputting a signal indicating a stopping of polishing or a change of polishing conditions to at least said driving mechanism based on a signal from said signal analyzing portion;
an annular transmitting antenna formed around a rotating axis of said first surface plate or said second surface plate to which said vibration detector is attached, and connected to said transmitting portion; and
a receiving antenna provided on a prolonged line of said rotating axis and connected to said receiving portion.

13. A polishing apparatus according to claim 12, further comprising:
a logarithmic amplifier for expanding an amplitude range of vibration signal according to outputs of said vibration detector; and
an inverse logarithmic amplifier connected to the output side of said receiving portion, for converting an output signal from said receiving portion.

14. A polishing apparatus comprising:
a first surface plate for supporting an object to be polished;
a second surface plate arranged to oppose to said first surface plate;
an abrasive cloth stuck to said second surface plate;
driving means for shifting said first surface plate periodically in a predetermined area on said abrasive cloth; and
polishing end-point detecting means for dividing vibration intensity of said first surface plate or driving torque of said driving means by a function of location information of said first surface plate so as to set a resultant value as a polishing state signal, differentiating change of said polishing state signal by time, and detecting end-point of polishing based on a differential value.

15. A polishing method of employing a first surface plate for supporting an object to be polished, a second surface plate arranged to oppose to said first surface plate, and an abrasive cloth stuck to said second surface plate so as to polish said polishing object by said abrasive cloth, comprising the steps of:

detecting vibration of said first surface plate or said second surface plate in polishing by a vibration detector; and analyzing vibration intensity detected by said vibration detector through frequency analysis, integrating said vibration intensity relative to time, and stopping a polishing operation when variation in a resultant integral value relative to time is less than a first reference value or when said resultant integral value is less than a second reference value.

16. A polishing method according to claim 15, wherein said resultant integral value is an average value of said vibration intensity.

17. A polishing method according to claim 15, wherein a film being formed on said polishing object and having unevenness on its surface is planarized by said abrasive cloth.

18. A polishing method according to claim 15, wherein degradation of said abrasive cloth is detected when either a time from a starting of polishing to a stopping of polishing is shorter than a preset time or variation of said resultant integral value relative to time is decreased in excess of a designated value.

19. A polishing method according to claim 15, wherein polishing conditions are modified in polishing by detecting that a decreasing factor of vibration intensity in particular vibration frequency is larger than that of vibration intensity in other vibration frequency.

20. A polishing method according to claim 15, wherein a polishing state is analyzed in real time to detect an end-point of polishing or a modification of polishing conditions based on change in vibration intensity signal or vibration spectrum being output from said vibration detector.

21. A polishing method of employing a polishing apparatus including a first surface plate for supporting an object to be polished, a second surface plate arranged to oppose to said first surface plate, and an abrasive cloth stuck to said second surface plate, comprising the steps of:

shifting said first surface plate periodically in a predetermined area on said abrasive cloth by driving means; and dividing vibration intensity of said first surface plate or driving torque of said driving means by a function of location information of said first surface plate so as to set a resultant value as a polishing state signal, differentiating change of said polishing state signal by time, and terminating polishing operation based on a differential value.

22. A polishing method according to claim 21, wherein said dividing is proportional to a distance from a center of rotation of said abrasive cloth.

23. A polishing method according to claim 21, wherein said dividing is proportional to the square of a distance from a center of rotation of said abrasive cloth if grooves or micropors are formed in a substantially uniform density in said abrasive cloth.

24. A polishing method according to claim 21, wherein said dividing is a function of the number of rotations of said second surface plate.

25. A polishing method of employing a first surface plate for supporting an object to be polished, a second surface plate arranged to oppose to said first surface plate, and an abrasive cloth stuck to said second surface plate so as to polish said object to be polished by said abrasive cloth, comprising the steps of:

detecting vibration of said first surface plate or said second surface plate in polishing by a vibration detector;

detecting an abnormal vibration intensity of vibration detected by said vibration detector, and controlling drive of said first surface plate and said second surface plate if an abnormal detection time in said abnormal vibration intensity is shorter than a rotational period of said second surface plate.

* * * * *